US006970552B1

(12) United States Patent
Hahn et al.

(10) Patent No.: US 6,970,552 B1
(45) Date of Patent: Nov. 29, 2005

(54) WEB-BASED NETWORK MONITORING TOOL

(75) Inventors: Douglas Alan Hahn, Chicago, IL (US); Bruce Lee Leatherman, Lemont, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 09/532,208

(22) Filed: Mar. 22, 2000

(51) Int. Cl.$^7$ ............................................. H04M 3/00
(52) U.S. Cl. ................. 379/265.02; 379/133; 379/136; 379/246; 379/247
(58) Field of Search ............................ 379/265.02, 133, 379/136, 246, 247, 88.13, 88.15, 88.17, 170, 217.01, 265.09, 900, 112.01, 112.08, 112.1; 345/733, 734, 436

(56) References Cited

U.S. PATENT DOCUMENTS

| | | | | |
|---|---|---|---|---|
| 4,510,351 A | * | 4/1985 | Costello et al. | 379/265.01 |
| 5,153,909 A | * | 10/1992 | Beckle et al. | 379/265.03 |
| 5,285,494 A | | 2/1994 | Sprecher et al. | |
| 5,530,744 A | * | 6/1996 | Charalambous et al. | 379/266.08 |
| 5,533,116 A | | 7/1996 | Vesterinen et al. | |
| 5,546,455 A | | 8/1996 | Joyce et al. | |
| 5,555,297 A | | 9/1996 | Ochy P. et al. | 379/265.03 |
| 5,590,188 A | * | 12/1996 | Crockett | 379/265.02 |
| 5,734,831 A | | 3/1998 | Sanders et al. | |
| 5,742,762 A | | 4/1998 | Scholl et al. | |
| 5,768,552 A | * | 6/1998 | Jacoby | 345/441 |
| 5,819,028 A | | 10/1998 | Manghirmalani et al. | |
| 5,870,558 A | | 2/1999 | Branton, Jr. et al. | |
| 5,917,485 A | * | 6/1999 | Spellman et al. | 715/500.1 |
| 6,229,538 B1 | * | 5/2001 | McIntyre et al. | 345/734 |
| 6,490,350 B2 | | 12/2002 | McDuff et al. | 379/265.06 |
| 6,542,156 B1 | * | 4/2003 | Hong et al. | 345/440 |
| 6,628,304 B2 | * | 9/2003 | Mitchell et al. | 345/734 |
| 6,633,640 B1 | * | 10/2003 | Cohen et al. | 379/265.03 |

OTHER PUBLICATIONS

Vista: Interactive Communications Software Platform (http://www.syntellect.com/vista.html) 1998.
"Syntellect Release New Interactive Communications Management Software Platform Based on Open Standards" (http://www.syntellect.com/pr051298.html) May 1998.

* cited by examiner

Primary Examiner—Bing Q. Bui
(74) Attorney, Agent, or Firm—Baker Botts L.L.P.

(57) ABSTRACT

A monitoring tool for use with one or more automatic call distributors (ACD) which automatically and continuously polls or queries the ACDs to monitor not only alarm conditions but other conditions, such as agent staffing levels, call answering time, call routing and traffic conditions. Such continuous and automatic monitoring and querying of the ACD in accordance with the present invention is thus able to improve the overall efficiency of such ACDs by improving the service response time of such ACDs. In accordance with one aspect of the invention, the status records of the ACDs may be directed to a website, for example, on an enterprise Intranet website to enable any of the company representatives with access rights to access the performance of the ACD network from any location. Other data, such as the trunk inventory record keeping system (TIRKS) may also be displayed on the website to facilitate troubleshooting of alarm conditions. Another aspect of the invention is the ability to provide automatic paging for predetermined alarm status condition.

27 Claims, 20 Drawing Sheets

*Fig. 5a*

11:ACI TROY

| TGN | OE | CKT ID | ALARM STATUS | CSU_A | CSU_Z | MISC |
|---|---|---|---|---|---|---|
| 011 | 003A19 | HCGS 324230 | NONE | N/A | N/A | TROY TGN 623 |
| | 004A18 | HCGS 324330 | NONE | N/A | N/A | |
| | 002A13 | HCGS 324331 | NONE | N/A | N/A | |
| | 004A11 | HCGS 324332 | NONE | N/A | N/A | |
| | 001A09 | HCGS 324333 | NONE | N/A | N/A | |

13:ACI TROY

| TGN | OE | CKT ID | ALARM STATUS | CSU_A | CSU_Z | MISC |
|---|---|---|---|---|---|---|
| 013 | 005E15 | HCGS 324339 | NONE | N/A | N/A | TROY TGN 626 |
| | 006E15 | HCGS 324340 | NONE | N/A | N/A | |
| | 005E11 | HCGS 324341 | NONE | N/A | N/A | |
| | 006E11 | HCGS 324342 | NONE | N/A | N/A | |
| | 007E10 | HCGS 324343 | NONE | N/A | N/A | |

15:ACI TROY

| TGN | OE | CKT ID | ALARM STATUS | CSU_A | CSU_Z | MISC |
|---|---|---|---|---|---|---|
| 015 | 003A17 | HCGS 324349 | NONE | N/A | N/A | TROY TGN 627 |
| | 004A17 | HCGS 324350 | NONE | N/A | N/A | |
| | 004A12 | HCGS 324351 | NONE | N/A | N/A | |
| | 005A12 | HCGS 324352 | NONE | N/A | N/A | |
| | 006A12 | HCGS 324353 | NONE | N/A | N/A | |

17:ACI TROY

| TGN | OE | CKT ID | ALARM STATUS | CSU_A | CSU_Z | MISC |
|---|---|---|---|---|---|---|
| 017 | 004E17 | HCGS 324483 | NONE | N/A | N/A | TROY TGN 629 |
| | 005E17 | HCGS 324484 | NONE | N/A | N/A | |
| | 006A17 | HCGS 324485 | NONE | N/A | N/A | |
| | 007A17 | HCGS 324486 | NONE | N/A | N/A | |
| | 007E17 | HCGS 324487 | NONE | N/A | N/A | |

18:ACI TROY

| TGN | OE | CKT ID | ALARM STATUS | CSU_A | CSU_Z | MISC |
|-----|--------|-------------|--------------|-------|-------|-------------|
| 018 | 004E18 | HCGS 324488 | NONE | N/A | N/A | TROY TGN 624 |
|     | 005E18 | HCGS 324489 | NONE | N/A | N/A | |
|     | 006E18 | HCGS 324490 | NONE | N/A | N/A | |
|     | 007A18 | HCGS 324491 | NONE | N/A | N/A | |
|     | 007E18 | HCGS 324492 | NONE | N/A | N/A | |

158

19:ACI TROY

| TGN | OE | CKT ID | ALARM STATUS | CSU_A | CSU_Z | MISC |
|-----|--------|-------------|--------------|-------|-------|-------------|
| 019 | 004E19 | HCGS 324493 | NONE | N/A | N/A | TROY TGN 634 |
|     | 005E19 | HCGS 324494 | NONE | N/A | N/A | |
|     | 004E13 | HCGS 324495 | NONE | N/A | N/A | |
|     | 005E13 | HCGS 324496 | NONE | N/A | N/A | |
|     | 006E14 | HCGS 324497 | NONE | N/A | N/A | |

CALL ACI, CHOOSE OPTION 2 FOR TROUBLE REFERRALS.

```
                            CIRCUIT DETAILS
CKT S  /HCGS/324230    /MB                       A TROYMIUOWOO Z DTRTMIBL6CD
CLO MIS123927001       DV    ACT IE IND  PRQ SSP TSP    MSC N MCO DTRTMIBHSHC
CAC SVF2BP3   CUST AMERITECHCOMMUNICATI  PULS -- MW B EML OBJ      PG 01 OF 04
M SEQ A  LOCATION    SV EQPT/FAC   RR/TYPE    UNIT   A TLP Z    SBDV/MISC     TP
  002  E                   THIS IS  A PRO-CDS DESIGN                          N
  004  I                   MODEL =  8589  DESI GN = 2                         N
  006  X  TROYMIUOWOO      LINE  C ODE=B8Z                                N
  008  X  TROYMIUOWOO      **SIGNAL   CODE=ESF* *                             N
  010  I    PROCESSED BY FLOWTHRU  ID:HICAP-A  VERS : 002   STAMP : 041295 130406 N
  012     TROYMIUOWOO      04DS6/   44 /                                      NI
  014                      HCG-                                               NC
  016                                                        STA ADDR         N
  018                      TROY                              EU CITY          N
  020                      MI                                EU STATE         N
  022  W  TROYMIUOWOO      DEMARC                                             S
  024     TROYMIUOWOO      PO!                                                XA
  026  W              X4 806     T3         2                IC               X#
  028                                                        OWNER=B-BX       XX
  030                                                        E=DTRTMIBLK07    XX
  032                              MB   0094.5               MI    0094.5 ZL  D#
  034     DTRTMIBLK07      EE31F                             F07/07    /0397  XZ
  036     DTRTMIBLK06      T3MAE412 040473.11    1916        F66/13    /08 /4 XM
CKT S  /HCGS/324230    /MB                       A TROYMIUOWOO Z DTRTMIBL6CD
CLO MIS123927001       DV    ACT IE IND  PRQ SSP TSP    MSC N MCO DTRTMIBHSHC
CAC SVF2BP3   CUST AMERITECHCOMMUNICATI  PULS -- MW B EML OBJ      PG 02 OF 04
M SEQ A  LOCATION    SV EQPT/FAC   RR/TYPE    UNIT   A TLP Z    SBDV/MISC     TP
  038     DTRTMIBLK07      T1MBDX01 040483.02B  ACSA                          XH
  040     DTRTMIBLK07      T1MBDY01 040482.02C  CSSA2                         XH
  042     DTRTMIBLK07      T1MBDZ01 040482.02B  ESSA2                         XH
  044     DTRTMIBLK07      T1MBD901 040480.12A  1                             XH
  046     DTRTMIBLK07      T1MBD901 040480.12A  1-17                          XH
  048     DTRTMIBLK07               DCS55NNNSC                                XF
  050     DTRTMIBLK07      T1MBD9Y1 040482.02B  0397         F66/12    /07 /4 XM
  052     DTRTMIBLK07                                        F07/07    /0397  EX
```

*Fig. 6a*

```
054 E  DTRTMIBLK07      /K07       /FE/DAB/  01/                              N1
056 E  DTRTMIBLK07      035-16                                                N2
058 E  DTRTMIBLK07      T1  /                                                 N3
060    DTRTMIBLK07      T1MBDX01 040483.02B ACSA                              EH
062    DTRTMIBLK07      T1MBDY01 040482.01C CSSA1                             EH
064    DTRTMIBLK07      T1MBDZ01 040482.01B ESSA1                             EH
066    DTRTMIBLK07      T1MBD801 040481.03A 1                                 EH
068    DTRTMIBLK07      T1MBD831 040481.03A 1-27                              EH
070    DTRTMIBLK07               DCS5NNNF7                                    F#
072 W  DTRTMIBLK07      T1MBD8S1 040482.01B 035-16         F93/03  /02 /44    EU
```

CKT S   /HCGS/324230     /MB                      A TROYMIUOWOO  Z DTRTMIBL6CD
CLO MIS123927001         DV    ACT IE IND   PRQ SSP TSP    MSC N MCO DTRTMIBHSHC
CAC SVF2BP3 .CUST AMERITECHCOMMUNICATI PULS -- MW B EML OBJ      PG 03 OF 04
M SEQ A    LOCATION    SV EQPT/FAC    RR/TYPE    UNIT   A TLP Z    SBDV/MISC    TP

```
074    DTRTMIBLK07                                         F07/07   /035     EX
076    DTRTMIBLK07      SD=TSLS- 5500                                        EX
078    DTRTMIBLK07      $FEPMTYP E=ANSI403;  FEPM=                           EX
080    DTRTMIBLK07      ON;DS1 F ORMAT MUST =ESF;                            EX
082    DTRTMIBLK07      NEPM=OFF                                             EX
084    DTRTMIBL                  NCT2YGEEE                                   F#
086 W  DTRTMIBL         T1ML1971 11CAB1      0114           F93/07  /06 /14  EM
088 W  DTRTMIBL         T1IUJ222 IP03191235                                  P
090    DTRTMIBL         $PM SM ARTJACK   S1=NA                           PX
092    DTRTMIBL         ,S2-1=DI SABLE,S2-2  =DISA                           PX
094    DTRTMIBL         BLE,S2-3 =DISABLE, S 2-4=E                           PX
096    DTRTMIBL         NABLE,S2 -5=ESF, S3= 7.5D.                           PX
098    DTRTMIBL         B, S4=SHO RT, S5=DISA BLE,S                          PX
100    DTRTMIBL         6=ON, S7= ENABLE                                     PX
102 W  DTRTMIBL6CD      DEMARC                                               S
104                                                         STA ADDR         N
106                     11                                  EU FLR           N
108                     1129                                EU ROOM          N
```

CKT S   /HCGS/324230     /MB                      A TROYMIUOWOO  Z DTRTMIBL6CD
CLO MIS123927001         DV    ACT IE IND   PRQ SSP TSP    MSC N MCO DTRTMIBHSHC
CAC SVF2BP3  CUST AMERITECHCOMMUNICATI PULS -- MW B EML OBJ      PG 04 OF 04
M SEQ A    LOCATION    SV EQPT/FAC    RR/TYPE    UNIT   A TLP Z    SBDV/MISC    TP

```
110                     DETROIT                             EU CITY          N
112                     MI                                  EU STATE         N
114    DTRTMIBL6CD      04DU9/   1SN/                                        NI
116    DTRTMIBL6CD      DTRTMIBL 6CD CONSUM ER                               NX
```

*Fig. 6b*

EPN: BETHUNE (IT)

| EPN | HOST PORT | CKT ID | ALARM STATUS | CSU_A | CSU_Z | REMOTE PORT |
|---|---|---|---|---|---|---|
| 14 | 001 C 12 A | DHDZ 791565 | NONE | 144.151.178.37 | N/A | 008 A 02 A |
|  | 001 C 12 B | DHDZ 791566 | NONE | 144.151.178.38 | N/A | 008 A 02 B |
|  | 001 C 12 C | DHDZ 791567 | NONE | 144.151.178.39 | N/A | 008 A 02 C |
|  | 001 C 12 D | DHDZ 791568 | NONE | 144.151.178.40 | N/A | 008 A 02 D |

EPN: KALAMAZOO

| EPN | HOST PORT | CKT ID | ALARM STATUS | CSU_A | CSU_Z | REMOTE PORT |
|---|---|---|---|---|---|---|
| 25 | 001 C 11 A | DHDZ 708222 | NONE | 144.151.178.57 | N/A | 020 A 02 A |
|  | 001 C 11 B | DHDZ 708223 | NONE | 144.151.178.58 | N/A | 020 A 02 B |
|  | 001 C 11 C | DHDZ 708224 | NONE | 144.151.178.59 | N/A | 020 A 02 C |
|  | 001 C 11 D | DHDZ 708225 | NONE | 144.151.178.60 | N/A | 020 A 02 D |
| 26 | 001 E 01 A | DHDZ 708226 | NONE | 144.151.178.149 | N/A | 021 A 02 A |
|  | 001 E 01 B | DHDZ 708227 | NONE | 144.151.178.150 | N/A | 021 A 02 B |
|  | 001 E 01 C | DHDZ 708228 | NONE | 144.151.178.151 | N/A | 021 A 02 C |
|  | 001 E 01 D | DHDZ 708229 | NONE | 144.151.178.152 | N/A | 021 A 02 D |
| 27 | 002 B 11 A | DHDZ 708230 | NONE | 144.151.178.153 | N/A | 022 A 02 A |
|  | 002 B 11 B | DHDZ 708231 | NONE | 144.151.178.154 | N/A | 022 A 02 B |
|  | 002 B 11 C | DHDZ 708232 | NONE | 144.151.178.155 | N/A | 022 A 02 C |
|  | 002 B 11 D | DHDZ 708233 | NONE | 144.151.178.156 | N/A | 022 A 02 D |

EPN: SAGINAW

| EPN | HOST PORT | CKT ID | ALARM STATUS | CSU_A | CSU_Z | REMOTE PORT |
|---|---|---|---|---|---|---|
| 28 | 002 E 01 A | DHDZ 708234 | NONE | 144.151.178.25 | N/A | 023 A 02 A |
|  | 002 E 01 B | DHDZ 708235 | NONE | 144.151.178.26 | N/A | 023 A 02 B |
|  | 002 E 01 C | DHDZ 708236 | NONE | 144.151.178.27 | N/A | 023 A 02 C |
|  | 002 E 01 D | DHDZ 708237 | NONE | 144.151.178.28 | N/A | 023 A 02 D |
| 29 | 002 E 21 A | DHDZ 708238 | NONE | 144.151.178.41 | N/A | 024 A 02 A |
|  | 002 E 21 B | DHDZ 708239 | NONE | 144.151.178.42 | N/A | 024 A 02 B |
|  | 002 E 21 C | DHDZ 708240 | NONE | 144.151.178.43 | N/A | 024 A 02 C |
|  | 002 E 21 D | DHDZ 708241 | NONE | 144.151.178.44 | N/A | 024 A 02 D |
| 30 | 003 E 01 A | DHDZ 708242 | NONE | 144.151.178.121 | N/A | 025 A 02 A |
|  | 003 E 01 B | DHDZ 708243 | NONE | 144.151.178.122 | N/A | 025 A 02 B |
|  | 003 E 01 C | DHDZ 708244 | NONE | 144.151.178.123 | N/A | 025 A 02 C |
|  | 003 E 01 D | DHDZ 708245 | NONE | 144.151.178.124 | N/A | 025 A 02 D |
| 31 | 003 E 21 A | DHDZ 708246 | NONE | 144.151.178.137 | N/A | 026 A 02 A |
|  | 003 E 21 B | DHDZ 708247 | NONE | 144.151.178.138 | N/A | 026 A 02 B |
|  | 003 E 21 C | DHDZ 708248 | NONE | 144.151.178.139 | N/A | 026 A 02 C |
|  | 003 E 21 D | DHDZ 708249 | NONE | 144.151.178.140 | N/A | 026 A 02 D |

*Fig. 7a*

EPN: SOUTHFIELD

| EPN | HOST PORT | CKT ID | ALARM STATUS | CSU_A | CSU_Z | REMOTE PORT |
|---|---|---|---|---|---|---|
| 17 | 001 D 10 A | DHDZ 708302 | NONE | 144.151.178.17 | N/A | 013 A 02 A |
|  | 001 D 10 B | DHDZ 708303 | NONE | 144.151.178.18 | N/A | 013 A 02 B |
|  | 001 D 10 C | DHDZ 708304 | NONE | 144.151.178.19 | N/A | 013 A 02 C |
|  | 001 D 10 D | DHDZ 708305 | NONE | 144.151.178.20 | N/A | 013 A 02 D |
| 18 | 001 D 11 A | DHDZ 708306 | NONE | 144.151.178.33 | N/A | 014 A 02 A |
|  | 001 D 11 B | DHDZ 708307 | NONE | 144.151.178.34 | N/A | 014 A 02 B |
|  | 001 D 11 C | DHDZ 708308 | NONE | 144.151.178.35 | N/A | 014 A 02 C |
|  | 001 D 11 D | DHDZ 708309 | NONE | 144.151.178.36 | N/A | 014 A 02 D |
| 19 | 002 A 11 A | DHDZ 708310 | NONE | 144.151.178.49 | N/A | 015 A 02 A |
|  | 002 A 11 B | DHDZ 708311 | NONE | 144.151.178.50 | N/A | 015 A 02 B |
|  | 002 A 11 C | DHDZ 708312 | NONE | 144.151.178.51 | N/A | 015 A 02 C |
|  | 002 A 11 D | DHDZ 708313 | NONE | 144.151.178.52 | N/A | 015 A 02 D |
| 20 | 002 B 10 A | DHDZ 708314 | NONE | 144.151.178.113 | N/A | 016 A 02 A |
|  | 002 B 10 B | DHDZ 708315 | NONE | 144.151.178.114 | N/A | 016 A 02 B |
|  | 002 B 10 C | DHDZ 708316 | NONE | 144.151.178.115 | N/A | 016 A 02 C |
|  | 002 B 10 D | DHDZ 708317 | NONE | 144.151.178.116 | N/A | 016 A 02 D |
| 21 | 003 A 10 A | DHDZ 708318 | NONE | 144.151.178.129 | N/A | 017 A 02 A |
|  | 003 A 10 B | DHDZ 708319 | NONE | 144.151.178.130 | N/A | 017 A 02 B |
|  | 003 A 10 C | DHDZ 708320 | NONE | 144.151.178.131 | N/A | 017 A 02 C |
|  | 003 A 10 D | DHDZ 708321 | NONE | 144.151.178.132 | N/A | 017 A 02 D |
| 22 | 003 A 11 A | DHDZ 708322 | NONE | 144.151.178.145 | N/A | 018 A 02 A |
|  | 003 A 11 B | DHDZ 708323 | NONE | 144.151.178.146 | N/A | 018 A 02 B |
|  | 003 A 11 C | DHDZ 708324 | NONE | 144.151.178.147 | N/A | 018 A 02 C |
|  | 003 A 11 D | DHDZ 708325 | NONE | 144.151.178.148 | N/A | 018 A 02 D |

*Fig. 7b*

LATEST (TIMES) ALARM MESSAGE...                                    -MIC1 ALARM LOG-

```
12/29 13:30 (1) 12/29 13:29 ->03E12 SNC-LINK MINOR
12/21 21:29 (6) 12/19 14:02 ->05A0401 PGATE-PT MINOR
12/21 04:35 (6) 12/21 01:27 ->37_A-PNC FIBER-LK MINOR
12/21 04:34 (6) 12/21 01:35 ->35_A-PNC FIBER-LK MAJOR
12/21 04:34 (6) 12/21 01:35 ->37_A-PNC FIBER-LK MAJOR
12/21 04:34 (6) 12/21 01:26 ->25A0101 SYS-LINK MINOR (@EPN 30-SAGINAW)
12/21 04:34 (4) 12/21 01:37 ->38_A-PNC FIBER-LK MAJOR
12/21 04:34 (3) 12/21 01:35 ->26A0101 SYS-LINK MINOR (@EPN 31-SAGINAW)
12/21 04:21 (7) 12/21 01:26 ->36_A-PNC FIBER-LK MINOR
12/21 04:21 (6) 12/21 01:26 ->38_A-PNC FIBER-LK MINOR
12/21 04:21 (6) 12/21 01:26 ->35_A-PNC FIBER-LK MINOR
12/21 04:20 (5) 12/21 01:40 ->03E21C DS1-FAC MINOR (@EPN 31-SAGINAW)
12/21 04:20 (5) 12/21 01:27 ->PN_28 EXP-PN MAJOR
12/21 04:20 (5) 12/21 01:35 ->36_A-PNC FIBER-LK MAJOR
12/21 04:20 (4) 12/21 01:26 ->23A0101 SYS-LINK MINOR (@EPN 28-SAGINAW)
12/21 04:20 (3) 12/21 01:39 ->PN_31 EXP-PN MAJOR
12/21 04:20 (3) 12/21 01:41 ->03E20 SN-CONF MAJOR (EPN 31-SAGINAW)
12/21 04:20 (4) 12/21 01:35 ->PN_30 EXP-PN MAJOR
12/21 04:20 (2) 12/21 01:40 ->02E20 SN-CONF MAJOR (EPN 29-SAGINAW)
12/21 04:18 (2) 12/21 01:26 ->26A01 EXP-INTF MINOR (@EPN 31-SAGINAW)
12/21 04:18 (2) 12/21 01:29 ->24A0101 SYS-LINK MINOR (@EPN 29-SAGINAW)
12/21 02:15 (4) 12/21 01:40 ->02E01A DS1-FAC MINOR (EPN 28-SAGINAW)
12/21 02:15 (3) 12/21 01:35 ->03E03 SN-CONF MAJOR (EPN 30-SAGINAW)
12/21 02:10 (3) 12/21 01:37 ->PN_29 EXP-PN MAJOR
12/21 02:10 (3) 12/21 01:39 ->03E21D DS1-FAC MINOR (EPN 31-SAGINAW)
12/21 02:05 (2) 12/21 01:44 ->25A01 EXP-INTF MINOR (@EPN 30-SAGINAW)
12/21 02:03 (2) 12/21 01:39 ->02E21A DS1-FAC MINOR (EPN 29-SAGINAW)
12/21 02:01 (2) 12/21 01:42 ->02E03 SN-CONF MAJOR (EPN 28-SAGINAW)
12/21 02:01 (2) 12/21 01:39 ->02E21B DS1-FAC MINOR (EPN 29-SAGINAW)
12/21 02:01 (2) 12/21 01:39 ->02E21D DS1-FAC MINOR (EPN 29-SAGINAW)
```

*Fig. 8*

- MIC1 AGENT STATUS -
(AS OF THU DEC 30 08:35:25 1999 CDT)

| SPLIT/SKILL | AGENTS ACTIVE | QUEUED CALLS | LONGEST WAIT | GATE NAME |
|---|---|---|---|---|
| 99 | 2 | 0 | 0:00 | SYSTEM PORTS |
| 200 | 115 | 57 | 3:44 | STHFLD UNIV 200 |
| 204 | 1 | 0 | 0:00 | MI CSST |
| 231 | 3 | 0 | 0:00 | HOTC INBOUND |
| 256 | 4 | 0 | 0:00 | MI ASST COACH |
| 260 | 1 | 0 | 0:00 | KALAMAZOO ACE |
| 263 | 1 | 0 | 0:00 | SOUTHFIELD ACE |
|  | 127 | 57 | 3:44 | ** TOTALS ** |

*Fig. 9*

BETHUNE-EPN 14
(CABINET 8)

| PORT\CARD | 08A03 | 08A04 | 08A05 | 08A06 |
|---|---|---|---|---|
| 1 | 59400 | 59424 | - - | - - |
| 2 | 59401 | 59425 | - - | - - |
| 3 | 59402 | 59426 | - - | - - |
| 4 | 59403 | 59427 | - - | - - |
| 5 | 59404 | 59428 | - - | - - |
| 6 | 59405 | 59429 | - - | - - |
| 7 | 59406 | 59430 | - - | - - |
| 8 | 59407 | 59431 | - - | - - |
| 9 | 59408 | 59432 | - - | - - |
| 10 | 59409 | 59433 | - - | - - |
| 11 | 59410 | 59434 | - - | - - |
| 12 | 59411 | 59435 | - - | - - |
| 13 | 59412 | 59436 | - - | - - |
| 14 | 59413 | 59437 | - - | - - |
| 15 | 59414 | 59438 | - - | - - |
| 16 | 59415 | 59439 | - - | - - |
| 17 | 59416 | 59440 | - - | - - |
| 18 | 59417 | 59441 | - - | - - |
| 19 | 59418 | 59442 | - - | - - |
| 20 | 59419 | - - | - - | - - |
| 21 | 59420 | - - | - - | - - |
| 22 | 59421 | - - | - - | - - |
| 23 | 59422 | - - | - - | - - |
| 24 | 59423 | - - | - - | - - |

*Fig. 10*

– MIC1 TRAFFIC LOAD –
(PAST HOUR / PEAK FOR THU DEC 30 08:35:25 1999 CDT)

Fig. 11

| PORT NETWORK | NAME | TDM OCC | PN OCC | ........20........40........60........80........100 |
|---|---|---|---|---|
| 1 | HOST CABINET 1 | 16 | 5 | |
| 2 | HOST CABINET 2 | 10 | 6 | |
| 3 | HOST CABINET 3 | 6 | 4 | |
| 4 | HOST CABINET 4 | 6 | 4 | |
| 5 | HOST CABINET 4 | 7 | 5 | |
| 6 | HOST CABINET 5 | 2 | 1 | |
| 7 | HOST CABINET 5 | 9 | 6 | |
| 8 | HOST CABINET 6 | 3 | 2 | |
| 9 | HOST CABINET 6 | 6 | 4 | |
| 10 | HOST CABINET 7 | 3 | 2 | |
| 11 | HOST CABINET 7 | 3 | 2 | |
| 23 | HOST CABINET 19 | 0 | 0 | |
| 24 | HOST CABINET 19 | 2 | 2 | |
| 32 | HOST CABINET 27 | 3 | 2 | |
| 12 | HOST CABINET 28 | 6 | 4 | |
| 13 | HOST CABINET 29 | 8 | 5 | |
| 14 | BETHUNE | 0 | 0 | |
| 25 | KALAMAZOO | 2 | 7 | |
| 26 | KALAMAZOO | 4 | 11 | |
| 27 | KALAMAZOO | 2 | 7 | |
| 28 | SAGINAW | 3 | 8 | |
| 29 | SAGINAW | 4 | 11 | |
| 30 | SAGINAW | 2 | 6 | |
| 31 | SAGINAW | 1 | 2 | |
| 17 | SOUTHFIELD | 2 | 6 | |
| 18 | SOUTHFIELD | 2 | 5 | |
| 19 | SOUTHFIELD | 3 | 10 | |
| 20 | SOUTHFIELD | 2 | 7 | |
| 21 | SOUTHFIELD | 2 | 5 | |
| 22 | SOUTHFIELD | 2 | 7 | |

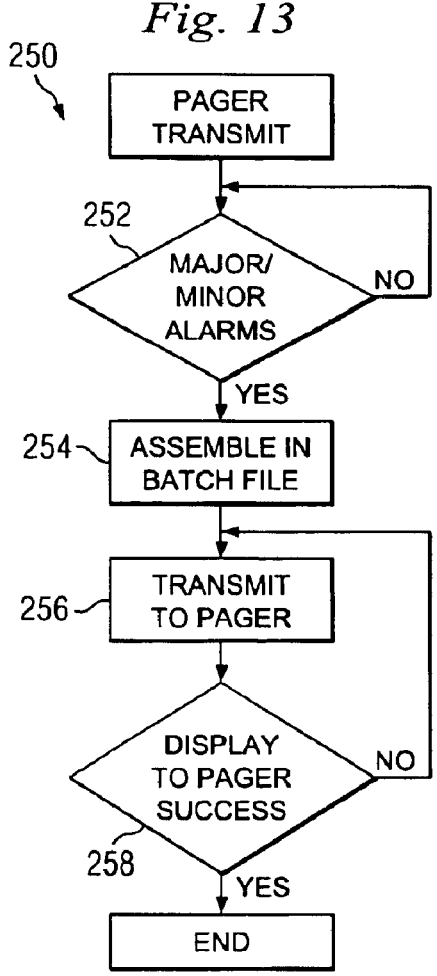
*Fig. 13*
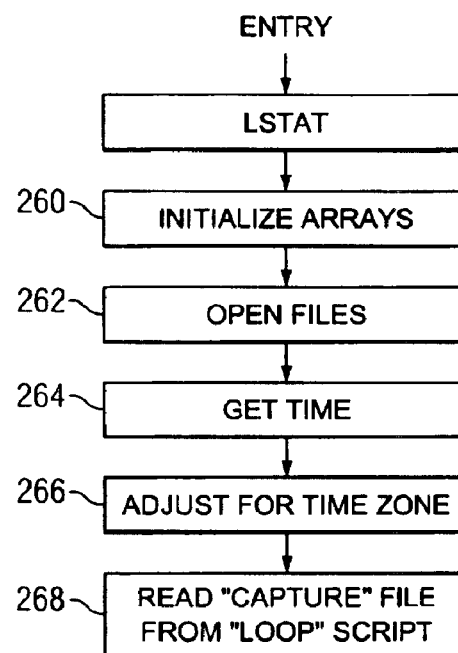
*Fig. 14a*
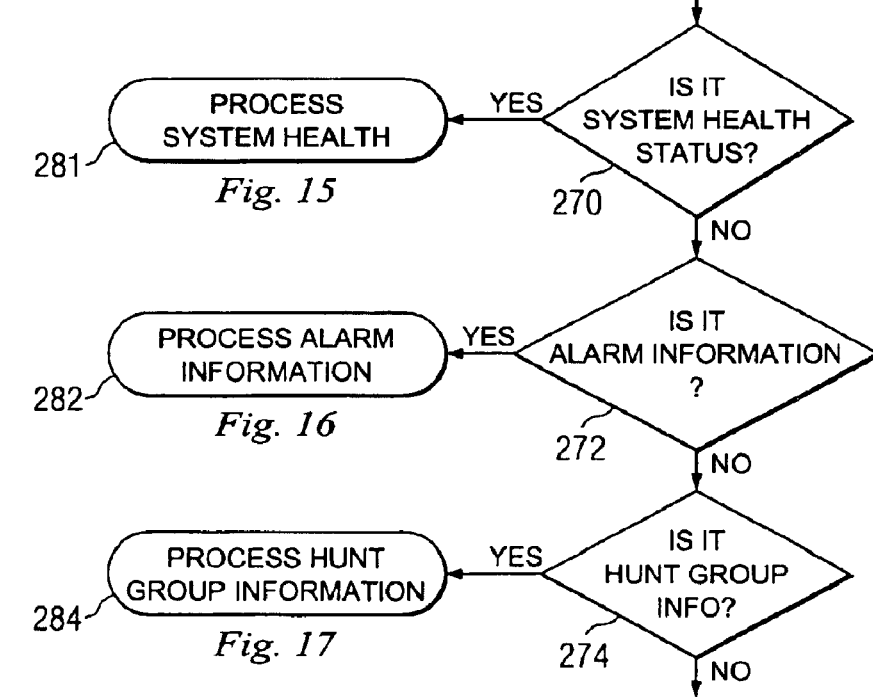

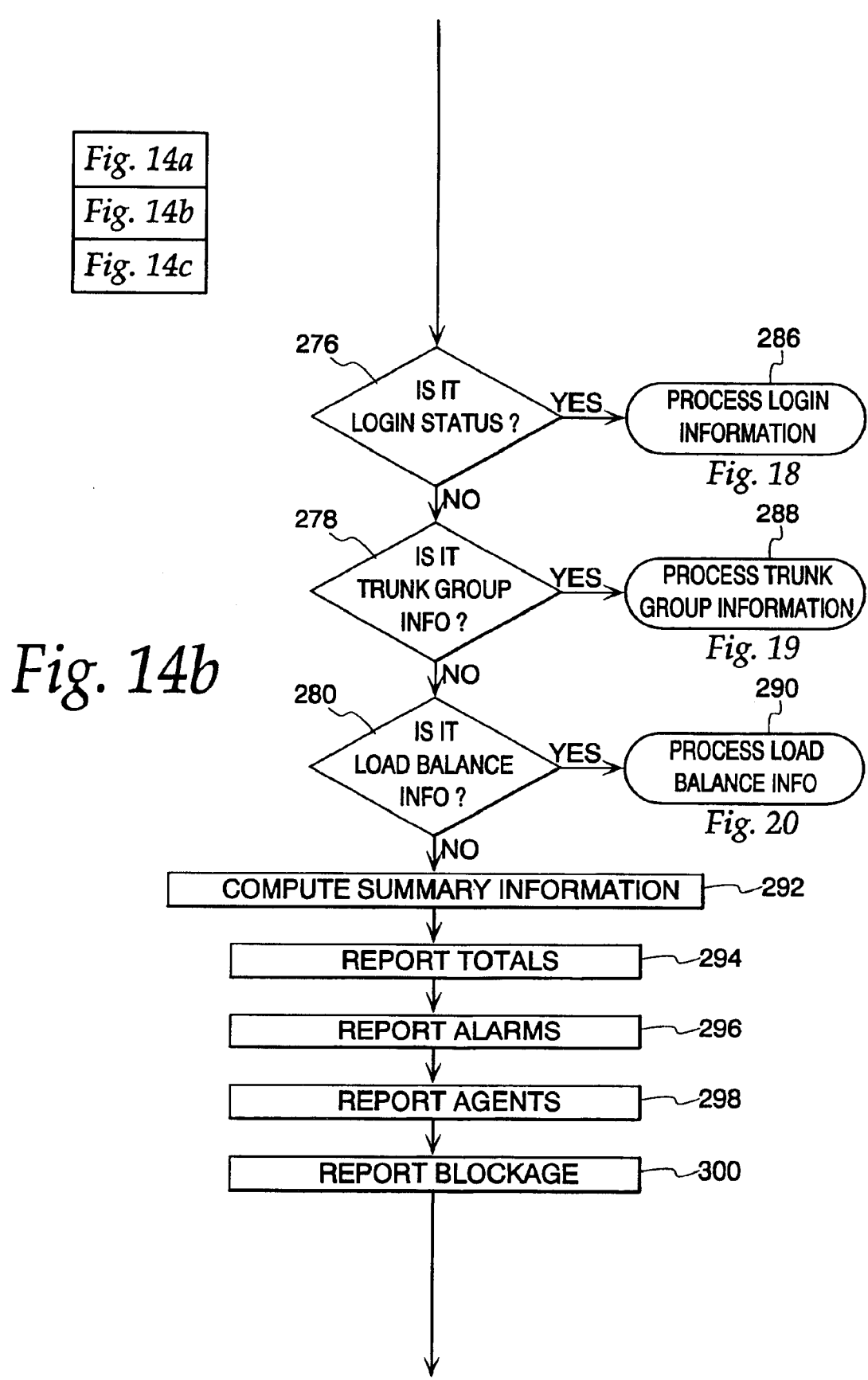

WEB-BASED NETWORK MONITORING TOOL

BACKGROUND OF THE INVENTION

1. Field of the Invention

The present invention relates to a monitoring tool for use in a telecommunications system which automatically monitors one or more automatic call distributors (ACD) and provides an indication of the status of such ACDs in essentially real time.

2. Description of the Prior Art

Automatic call distributors (ACD) are known in the art. Such ACDs are telecommunications devices, used by various manufactures and service providers, to handle a relatively huge volume of calls and distribute them among a relatively few agents. Such ACDs are known to be networked and interconnected with interactive voice response units (IVR). As such, calls to a company's customer service telephone are provided with menu options by the IVR depending on the type of service required. The caller's selection is then used to route the call to the appropriate ACD in the network. One or more agent groups are normally affiliated with each of the ACDs in the network. The call is routed to an agent group and held until one of the agents is available to take the call. The calls are normally distributed to the agents according to various criteria. For example, the call may be routed to the agent in the agent group that has been idle the longest. Alternatively, the call may be routed to the agent based on the caller's telephone number or the number dialed by the caller. If all of the agents are busy, the call may be held in queue or routed to another agent group, for example, for a predetermined time period or the caller may be requested to leave a voice mail message for later call back.

Such ACDs are known to be provided by a number of manufacturers. For example, Lucent Technologies, Rockwell, Toshiba and STE are all known manufacturers of ACDs. An important aspect of such ACDs is the efficiency by which the incoming service calls are handled. As such, all of the providers of such ACDs are known to provide online monitoring of the ACDs. Unfortunately, such systems are monitored manually on a query basis. In other words, service techniques must manually query or poll each of the ACDs to determine its status, which can be time consuming. Once an alarm condition is detected, a service technician is subsequently dispatched to correct the problem. Unfortunately, with such a system, an ACD can be out of service for several hours and perhaps days depending on the location of the service technician relative to the ACD and the severity of the problem. While such ACDs are out of service, the call answering time potentially increases, perhaps leading many customer calls unanswered, potentially causing customer ill will toward the company and increased call traffic when the ACD is returned to service. Thus, there is a need for a monitoring system which lowers the response time and provides continuous and automatic monitoring of the various conditions in order to reduce the amount of time such ACDs are out of service.

BRIEF DESCRIPTION OF THE DRAWINGS

Various objects and advantages of the present invention will be realized upon consideration of the following specification and attached drawing wherein:

FIGS. 5A, 5B represents an exemplary web page, linked to the web page illustrated in FIG. 4, illustrating the status of incoming trunk groups coupled to the ACD illustrated in FIG. 4.

FIGS. 6A, 6B represents an exemplary web page, linked to the web page illustrated in FIGS. 5A, 5B, illustrating the trunk inventory record keeping system (TIRKS) for a selected trunk group illustrated in FIGS. 5A and 5B.

FIGS. 7A, 7B represents an exemplary web page, linked to the exemplary home web page illustrated in FIG. 4 illustrated the status of the various expansion port network (EPN) connected to the ACD illustrated in FIG. 4.

FIG. 8 represents an exemplary web page linked to the home web page illustrated in FIG. 4, illustrating an alarm log for the ACD illustrated in FIG. 4.

FIG. 9 is an exemplary web page, linked to the ACD home web page illustrated in FIG. 4 illustrating the ACD agent status.

FIG. 10 is an exemplary web page, linked to the EPN web page illustrated in FIGS. 7A, &B which illustrates the EPN cabinet stations and port assignments.

FIG. 11 is an exemplary web page, linked to the home web page illustrated in FIG. 4, which illustrates the traffic or load of all customer care centers (CCC) and inbound traffic to the ACD in FIG. 4.

FIG. 13 is a flow diagram of the paging software in accordance with the present invention.

DETAILED DESCRIPTION OF THE INVENTION

The present invention relates to a monitoring tool for use with one or more automatic call distributors (ACD) which automatically and continuously polls or queries the ACDs to monitor not only alarm conditions but other conditions, such as agent staffing levels, call answering time, call routing and traffic conditions. Such continuous and automatic querying of the ACD in accordance with the present invention is thus able to improve the overall efficiency of such ACDs by improving the service response time of such ACDs. In accordance with one aspect of the invention, the status of the ACDs may be directed to a website, for example, on an enterprise Intranet website to enable any of the company representatives with access rights to access the real time performance of the ACD network from any location. Another aspect of the invention is the ability to provide automatic paging for predetermined alarm status condition.

Although the present invention is illustrated and described relative to Lucent Definity G3R ACDs, the principles of the present invention are applicable to virtually any ACD or other telecommunications equipment which stores status data.

Figure 1:
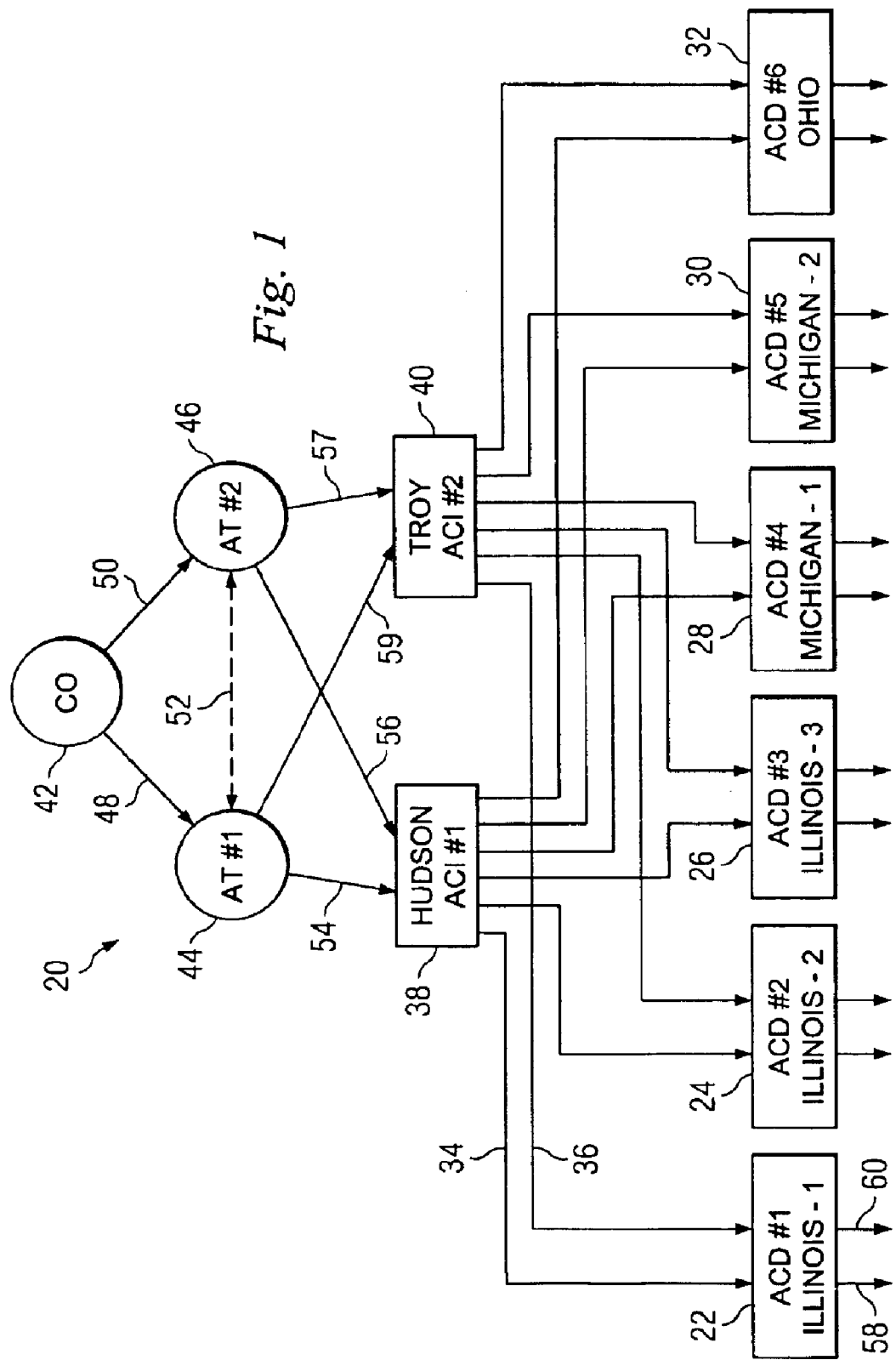
FIG. 1 is a block diagram of an inbound and outbound distribution system for a network of automatic all distributors (ACD) in accordance with the present invention.

An exemplary block diagram illustrating the inbound and outbound trunks for an exemplary network of ACDs is illustrated in FIG. 1. As shown, the exemplary network, generally identified with the reference numeral 20, is shown with, for example, six (6) exemplary ACDs 22, 24, 26, 28, 30 and 32. As shown, the exemplary ACD network 20 may contain ACDs in different states in different regions in the country. For example, as shown in FIG. 1, three ACDs 22, 24 and 26 may be located in Illinois, designated as Illinois-1; Illinois-2 and Illinois-3, while two ACDs 28 and 30 are located in Michigan and designated as Michigan-1 and Michigan-2. The sixth ACD may be located in Ohio and Designated Ohio.

Each ACD 22, 24, 26, 28, 30 and 32 may include two inbound trunk groups and two outbound trunk groups. For example, the ACD 22 may include two inbound trunk groups 34 and 36 from independent long distance carrier switches 38 and 40. In order to improve the inbound reliability of the system, calls placed to a central office 42 may be routed to two different access tandems 44 and 46 by way of a plurality of trunks 48 and 50. The access tandems 44 and 46 may also be tied together by tied together by way of intermachine trunks (IMT) 52. Separate trunk groups 54, 56, 57 and 59 from each of the access tandems 44 and 46 are applied to each of the long distance carrier switches 38 and 40. In particular, each access tandem is connected to both of the long distance carrier switches 38 and 40 by way of a plurality of trunk groups. For instance, the access tandem 46 may be connected to the long distance carrier switches 38 and 40 by way of a plurality of trunk groups 56 and 57. With such a configuration, should one of the access tandems 44 or 48 fail, calls can be routed through the other access tandem since both access tandems feed each of the long distance carrier switches 38 and 40; and the access tandems 44 and 46 are tied together by way of the IMT 52. The exemplary in bound distribution system may also be configured to minimize service loss upon failure of one of the long distance carrier switches 38 and 40. In particular, as mentioned above, each of the ACDs 22, 24, 26, 28, 30 and 32 has two incoming trunk groups 34 and 36; one from each of the long distance carrier switches 38 and 40 respectively. Thus, should one of the long distance carrier switches 38, 40 fail, calls can be routed to the appropriate ACD 22, 24, 26, 28, 30 and 32 by the other long distance carrier switch. Similarly, should problems develop with one of the trunk inbound trunk groups 34 or 36, calls to the ACD can be re-routed by way of the other trunk groups to provide improved overall reliability of the system.

Each of the ACDs 22, 24, 26, 28, 30 and 32 may also provided with, for example, two outgoing trunk groups. For example, the ACD 22 may be provided with the outgoing trunk groups 58 and 60. These outbound trunk groups enable outbound calls from the ACDs 22, 24, 26, 28, 30 and 32 to be directed to central offices (not shown). In order to provide reliability of outgoing calls from each of the ACDs 22, 24, 26, 28, 30 and 32, each of the outgoing trunk groups 58 and 60 are directed to a separate central office (not shown).

Figure 2:
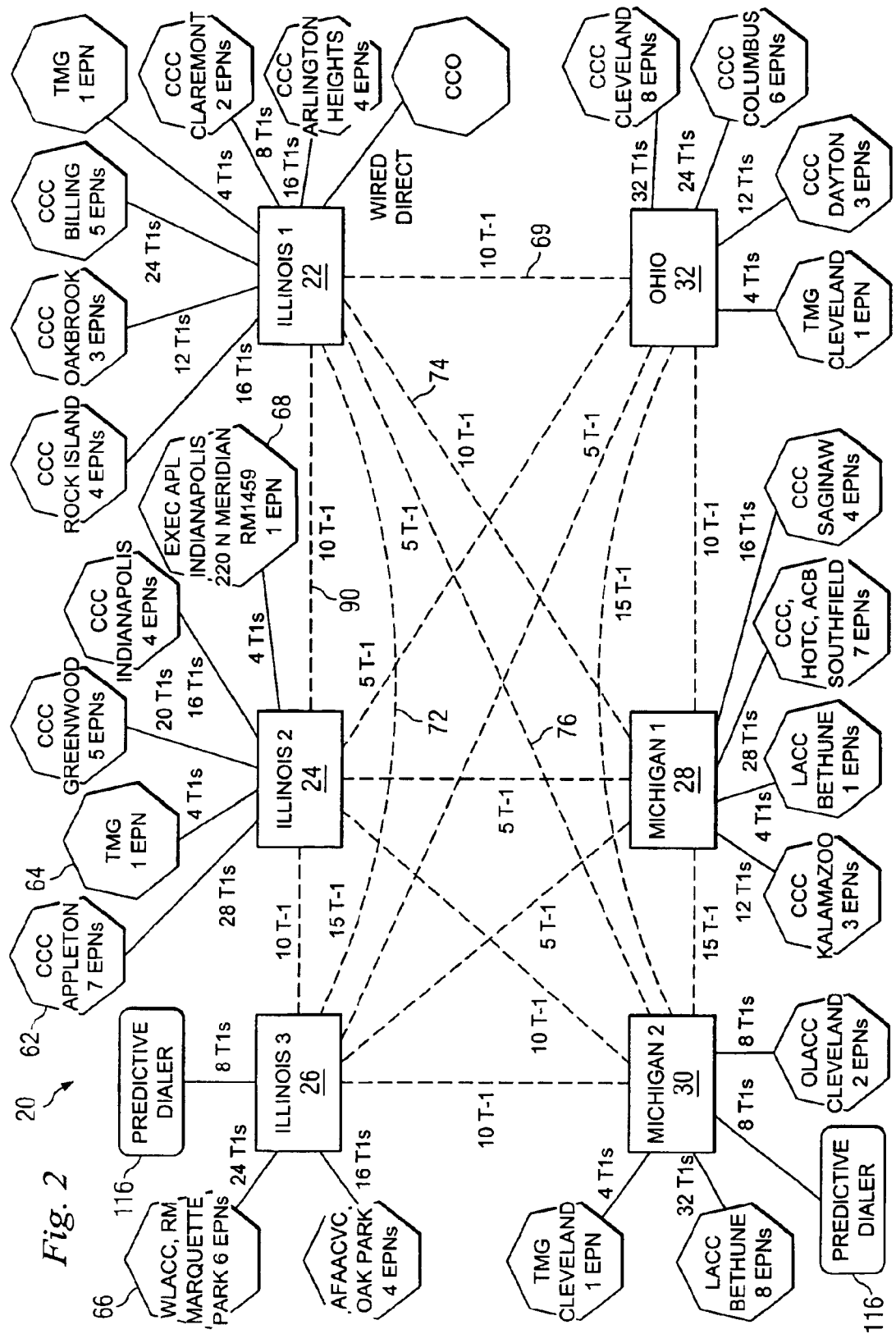
FIG. 2 is an exemplary block diagram of a network of ACDs with exemplary agent groups associated with each of the ACDs according to the present invention.

FIG. 2 illustrates a block diagram of an exemplary ACD network 20. As mentioned above, the ACD network in accordance with an exemplary embodiment of the invention includes six ACDs 22, 24, 26, 28, 30 and 32. The exemplary ACD network 20 may be configured to route calls, for example, to approximately 6,000 agents, distributed in one or more regions around the country. Each ACD 22, 24, 26, 28, 30 and 32 may include one or more customer care centers (CCC) for handling various customer services, generally identified with the reference numeral 62. Each CCC 62 may include one or more expansion port networks (EPN). Each EPN may be used to route calls to a plurality of agents, for example, 90 agents. In addition to the CCCs 62, each ACD 22, 24, 26, 28, 30 and 32 may utilize EPNs for special purpose applications, such as training, generally identified with the reference numeral 64, collections, generally identified with the reference numeral 66 and, for example, executive applications, generally identified with the reference numeral 68.

As discussed above, each of the ACDs 22, 24, 26, 28, 30 and 32 is fed with two incoming trunk groups 34 and 36 (FIG. 1) and two outgoing trunk groups 58 and 60. The outgoing trunk groups may be used for customer call back or transferring calls to different ACDs or CCC. In addition, each of the ACDs 22, 24, 26, 28 and 30 may be connected to the other five ACDs by a number of trunk groups. For example, the ACD 22 may be connected to the ACD 32 by way of an intermachine trunk group (IMT) 69. Similarly, the ACD 22 may be connected to the ACDs 24, 26, 28 and 30 by way by way of IMT groups 70, 72, 74 and 76. As such, should one of the ACDs or trunk groups fail, calls can be routed by way of the IMTs to other ACDs in the network.

Figure 3:
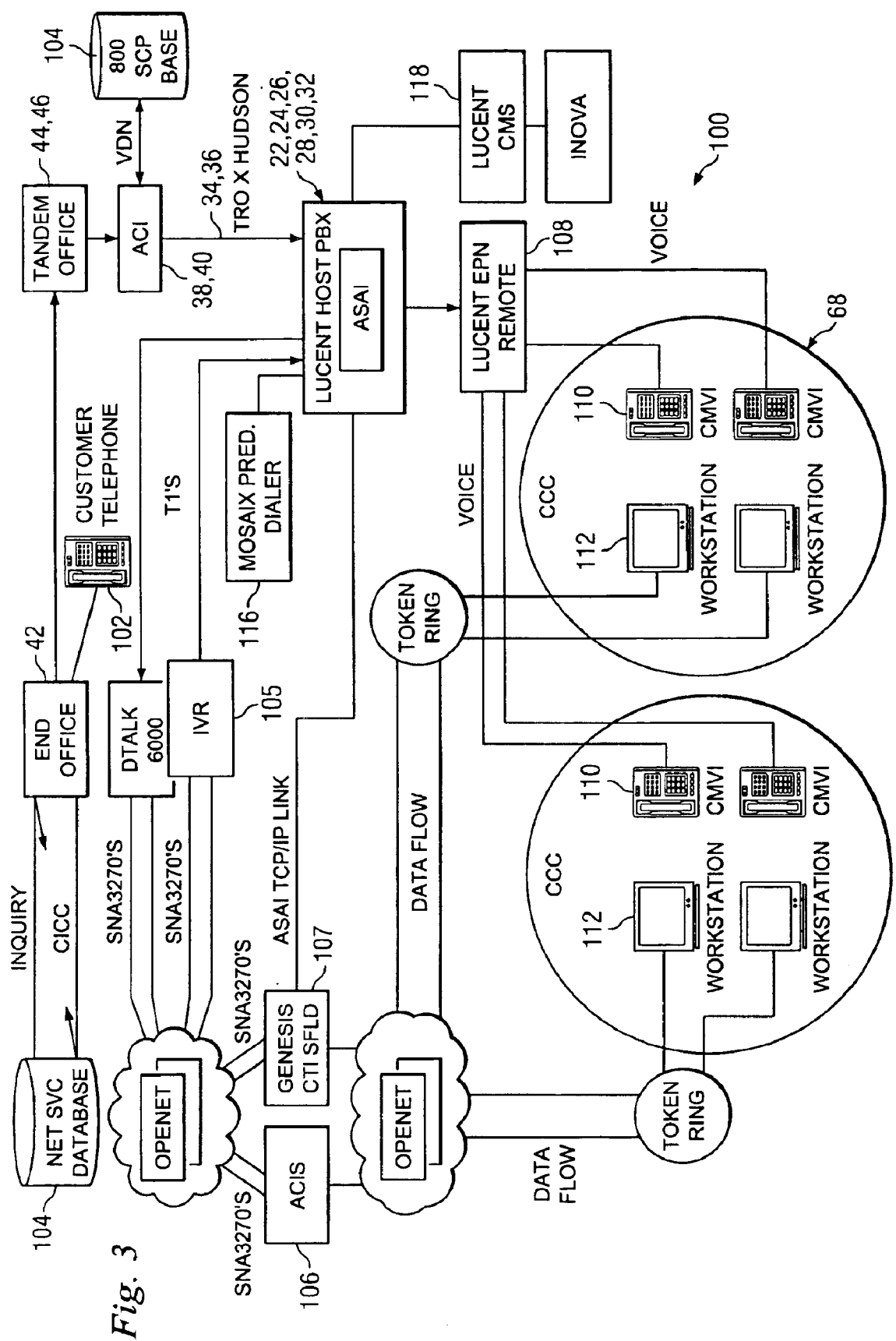
FIG. 3 is a detailed block diagram of a single ACD in accordance with the present invention.

FIG. 3 is a block diagram of an exemplary block diagram of a consumer voice network, generally identified with the reference numeral 100. For example, 800 number calls placed from a telephone 102 are directed to a central office, for example, the central office 42. The network service database 104 at the central office 42 determines the responsible organization for handling the call. In particular, the 800 number is looked up in the database 104, and an appropriate carrier identification code (CIC) is returned. In this example, since the call is directed to an 800 number, the network service database 104 will return a CIC directing that the calls be directed to an access tandem 44, 46 and a long distance carrier switch, for example, the long distance carrier switches 38 and 40. Each long distance carrier switch 38 and 40 includes a service control point (SCP) data base 104 to look up the 800 number and direct the call to one of the ACDs 22, 24, 26, 28, 30 and 32 by way of one of two incoming trunk groups 34 and 36.

Initially the call is routed to an interactive voice response unit 105, for example, an IBM Direct Talk 6000, where the caller may be given various voice menu options in which the customer is directed to respond by way of the touch-tone telephone 102. In addition, the customer may be required to key in a telephone number. The information input by the customer is then looked up on a database, such as an Ameritech Customer Information System (ACIS) data base 106 containing customer records. The customer record information may then be provided to a server 107, used to provide the information back to the ACD 22, 24, 26, 28, 30 and 32 and display the information on the screen of the next available agent. The call and the above-mentioned information are then routed to an appropriate CCC 68. In particular, the calls are routed to an EPN 108, which, in turn, routes the calls to the next available agent. Each agent is provided with a work station 112. All the work stations may be connected together in a network, for example a token ring network. The customer records may then be "screen popped" onto the agents work stations 112, when the agent picks up the call.

Other options may be provided with the ACDs 22, 24, 26, 28, 30 and 32. For example, a predictive dialer 116 may be provided and connected to the ACD 22, 24, 26, 28, 30 and 32. The predictive dialer, 116 may be used for automatic dialing for various purposes, such as collections. As shown in FIG. 2, the ACDs 26 and 30 are provided with predictive dialers. In addition, a call management system (CMS) 118 may be provided with each ACD 22, 24, 26, 28, 30 and 32. The CMS 118 collects data from the ACD 22, 24, 26, 28, 30 and 32 and stores the data for 24 hours. The data collected by the CMS 118 is available by way of a dial-up modem.

As mentioned above, each ACD 22, 24, 26, 28, 30 and 32 may be used to route calls to one or more EPNs 108 (FIG. 3). A typically single EPN may be used to direct calls to, for example, 90 customers service agents. Thus, any time there is an outage related to one of the ACDs 22, 24, 26, 28, 30 and 32, several problems can result. Such an outage causes an interruption of customer service or other function associated with the ACD. In addition, such outages idle a relatively significant number of customer service agents. Depending on the severity of the outage and availability of service technicians, such outages can thus be substantial. As such, various vendors of ACDs, such as Lucent Technologies, have developed software which allows the status of the ACD 22, 24, 26, 28, 30 and 32 to be stored and thus be manually polled by way of a dial-up modem with standard communications software to ascertain the status of the ACS 22, 24, 26, 28, 30 and 32. With such software, it is necessary to manually poll the ACS 22, 24, 26, 28, 30 and 32 on a periodic basis. For a network of ACDs, for example, as illustrated in FIG. 2, a considerable amount of man power is required to perform the manual polling of the ACDs 22, 24, 26, 28, 30 and 32. In addition, such systems are reactive. In other words, once an alarm condition is detected, a service technician is subsequently dispatched to correct the problem. Unfortunately with such prior art systems, an ACD can be out of services for several hours and perhaps days depending on the severity of the problem and the location of the service technician relative to the ACD 22, 24, 26, 28, 30 and 32.

In order to solve this problem, the present invention automatically and continuously polls or queries each of the ACDs 22, 24, 26, 28, 30 and 32 on a periodic basis, for example every two minutes, and provides the status of the ACDs. The system may also be used to monitor the load balance on each of the ACDs 22, 24, 26, 28, 30 and 32 as well as various other attributes of the system, for example, the call traffic to each of the agents, and the average amount of wait time per call. This information may then be transferred, for example, over a secure line, for example, to a corporate Intranet, and displayed by way of a conventional web browser. As known in the art, such corporate Intranet networks are normally protected by a corporate fire wall, which only enables authorized users to access the corporate Intranet. As such, anyone with access rights to the corporate Intranet can access the ACD status information over the Internet from virtually anywhere in the world. By providing automatic and continuous polling of the ACDs, the status of ACDs can be detected and adjustments made to correct problems before they happen.

Figure 4:
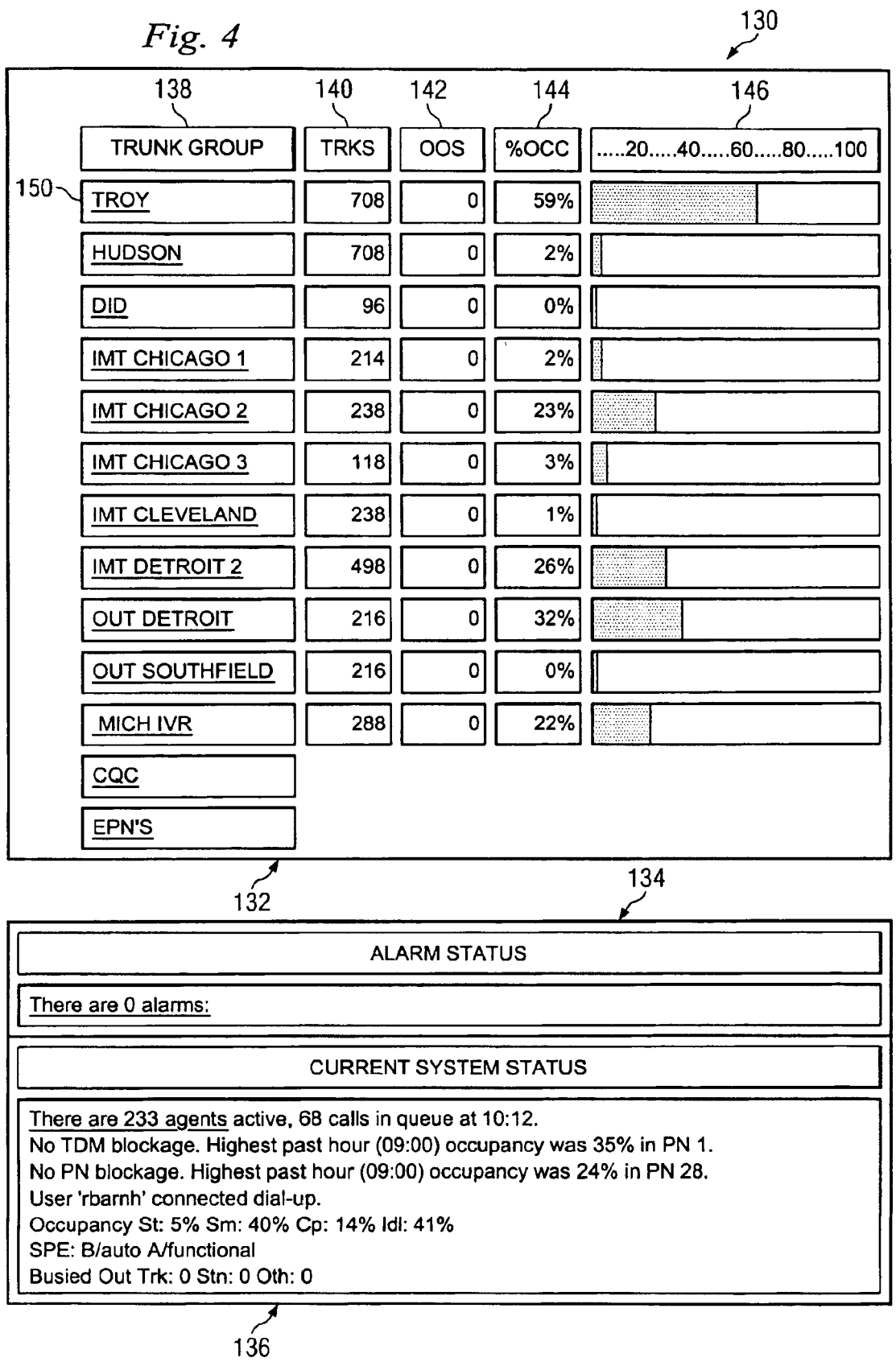
FIG. 4 is an exemplary home web page for an ACD in accordance with the present invention which provides hyperlinks to various web pages for all incoming and outgoing trunk groups connected to the ACD as well as auxiliary equipment associated with the ACD.

Exemplary web pages in accordance with the present invention, adapted to be displayed by way of a conventional web browser, such as the Internet Explorer and Netscape, are illustrated in FIGS. 4–11. Referring to FIG. 4, an exemplary ACD home page for the ACD 28 is illustrated and generally identified with the reference numeral 130. Home pages for the remaining ACDs 22, 24, 26, 30 and 32 would be similar. The ACD home page 130 may be provided with three data boxes; a traffic load data box 132; an alarm status data box 134 and a current system status data box 136.

The traffic load data box 132 is adapted to provide the traffic load of a particular ACD and in particular the traffic load of all of the various trunks connected to the ACD including inbound, outbound and intermachine trunks as well as information on the EPNs and other devices connected to the ACD, such as an IVR. The traffic load data box 132 may be provided with five columns 138, 140, 142, 144 and 146. Column 138 relates to the trunk group connected to the particular ACD. In particular, as mentioned above, each of the ACDs 22, 24, 26, 28 and 30 is fed from inbound trunks from the long distance carrier switches 38 and 40 (FIG. 1), identified, for example, as Hudson and Troy, respectively as well as the intermachine trunks (IMT) connected to the ACD 28 from each of the other ACDs 22, 24, 26, 28, 30 and 32. Column 138 also lists the outbound feeds for each ACD (i.e., OUT DETROIT and OUT SOUTHFIELD) as well as supplemental services, such as a direct inline dial (DID), an interactive voice response (IVR) unit and the contact quality center (CQC). Column 140 may be used to refer to the number of trunks associated with each of the trunk groups identified in column 138. Column 142 may be used to identify the number of trunks out of service, while column 144 may be used to display the percent occupancy rate of the various trunk groups.

In accordance with an important aspect of the invention, traffic load information for all the inbound and outbound trunks to the ACD as well as to the VIR may be displayed graphically in column 146, for example, in the form of a bar graph. For example, as shown in FIG. 4 for the Troy trunk group, identified in row 150 and column 144, a 59% occupancy rate is indicated. This 59% occupancy rate represents the traffic load for the incoming trunk lines from the Troy long distance carrier switch 40 (FIG. 1).

In one embodiment of the invention, different colors may be used to provide quick visual indication of the occupancy rate. For example, the color green may be used to display occupancy rates up to 80% while a different color such as yellow may be used to display occupancy rates, for example, greater than 80%. In this way, the load balance of all trunk groups connected to each of the ACDs 22, 24, 26, 28, 30 and 32 can be quickly checked at a glance by just monitoring column 146 and noting the specific color used for the bar graph.

In addition, to the trunk groups connected to the various ACDs, 22, 24, 26, 28, 30 and 32, the traffic load data block 130 may also be used to provide access to associated equipment, such as EPNs and CQC (contact quality center). As will be discussed in more detail below, each of the entries in column 138 of the traffic load data box 130 may be hyperlinked to successive web pages which provide more detailed information. For example, FIGS. 5A and 5B illustrate an exemplary web page, activated by way of the hyperlink for the Troy trunk group. In particular, if the "Troy" hyperlink in column 138 and row 150 of the load balance data box 130 is clicked on, more detailed information regarding the trunk groups connected between Troy and the ACD 28 is provided. For example, FIG. 4, column 140 indicates that Troy has 708 trunks. FIG. 5A provides the data for those 708 trunks. For example, with reference to FIG. 5A and 5B, six (6) trunks groups (TROY TGN 623, 626, 627, 629, 624, 634) are shown from the long distance carrier switch 40 (FIG. 1) at Troy to the ACD 28. Each trunk group contains five ISDN-PRI lines, which each contain 24 circuits to provide a total of 708 trunks between the long distance carrier switch 40 and the ACD 28. The web page illustrated in FIG. 5A and 5B may be broken into a number of data boxes 150, 152, 154, 156, 158 and 160. Each data box 150–160 may be used to display information regarding a single trunk group, which, as mentioned above, may display five ISDN-PRI lines.

Each of the data boxes 150–160 may be provided with a plurality of columns. The first column 162 may be used to represent the trunk group number (TGN). The second column may be used to represent office equipment (OE). The third column may be used to provide the circuit identification numbers and may be hyperlinked to local assignment information for each circuit,for example, as illustrated in FIG. 6A and 6B. The alarm status may be provided in column 168 for each of the ISDN-PRI lines. The columns 171 and 173 may be used for miscellaneous information, such as smart jacks, if applicable.

An important aspect of one embodiment of the invention relates to the integration of other data, which may be other dynamic data not retrieved from the ACD, or static data, such as the local circuit assignments and records. In particular, the trunk inventory record keeping system (TIRKS) data as illustrated in FIGS. 6A and 6B may be hyperlinked to the trunk group data illustrated in FIGS. 5A and 5B. Thus, when alarm conditions are detected, the TIRKS data is readily available, for example, on an enterprise Intranet website. As such, trouble shooting of alarm conditions is greatly reduced.

Returning to the ACD home page illustrated in FIG. 4, an "ALARM STATUS" data box 134 may also be provided. As currently shown, the alarm status box 134 indicates that there are no alarm (i.e. "There are no alarms"). The alarm status box 134 may be used to represent alarms which may be flashing and/or displaying different colors. For example, minor alarms may be displayed in yellow while major alarms are displayed in red. The alarm status data box 134 may be hyperlinked to a historical alarm log, for example as illustrated in FIG. 8, which maintains the status of alarms for a predetermined period of time, such as 30 days.

As mentioned above, the ACD home page 130 may also be provided with a "current system status" data box 136 which gives different types of useful information regarding the call traffic on the system, as well as other useful information regarding the system. For example, the current system status data box 136, as shown, indicates that there are 223 agents active and that there are 68 calls in the queue and the longest call has been in the queue for 10 minutes, 12 seconds. The current system status box 136 may contain hyperlink to an agent status web page, for example, as generally shown in FIG. 9. The agent status web page may be used to provide different information regarding the agent status. For example, the agent status web page may provide information regarding the skill level of the agent, for example as provided in column 170, the number of agents active, as indicated in column 172, the number of calls in the queue as shown in column 174 and the longest wait for a waiting call, for example as illustrated in column 176, as well as information regarding the name of the gate or functional representation of a call queue.

As mentioned above, the ACD home page 130, in addition to provide an information relating to the trunks connected to a particular ACD 22, 24, 26, 28, 30 and 32, may also be used to provide information regarding equipment connected to the ACDs, such as EPNs. As mentioned above, one or more customer care centers (CCC) may be connected to each of the which distribute the calls to the various agents at a particular location. As such, the EPNs associated with an ACD may be hyperlinked to an EPN web page, such as illustrated in FIG. 10 which provides additional information regarding the particular EPN, such as the "port/card" assignment within the selected EPN cabinet. Such information is relatively useful to a service technician who can look up the information on the Intranet rather than looking through a number of detailed corporate records.

A load balance page is illustrated in FIG. 11. This home page may be provided to display the traffic for an entire ACD. For example, referring to FIG. 2, the ACD 28 illustrates a CCC in Kalamazoo with three EPNs; a CCC in Bethune with one EPN; a CCC in Southfield with seven EPNs; and a CCC in Saginaw with four EPNs. Referring back to FIG. 11, the traffic load for each of the EPNs may be illustrated visually. For example, the load balance page may be provided with a plurality of columns 180–188. The columns 180–186 may be used to indicate the port network number, the EPN or host cabinet, name, the occupancy rate and the highest occupancy rate ever of all of the EPNs as well as the host cabinets. The occupancy information may be shown graphically by way of a bar graph in column 188. For example, a left-hand portion 190 of the bar chart may be used to represent the current occupancy for the previous hour while the right portion 192 may be used to represent the highest occupancy ever.

SOFTWARE

Figure 12:
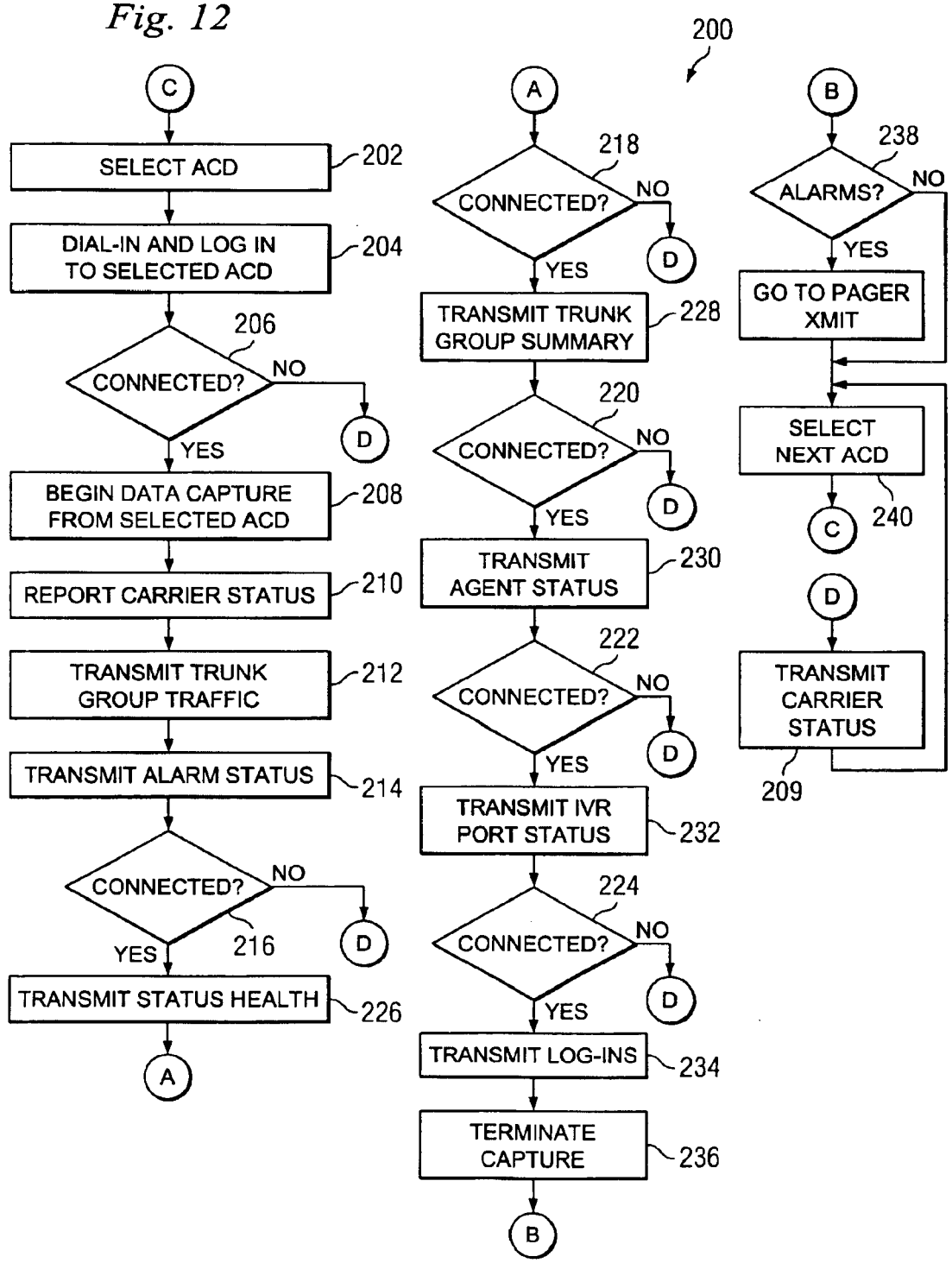
FIG. 12 is a flow diagram for automatically retrieving data from an ACD in accordance with the present invention.
Figure 14C:
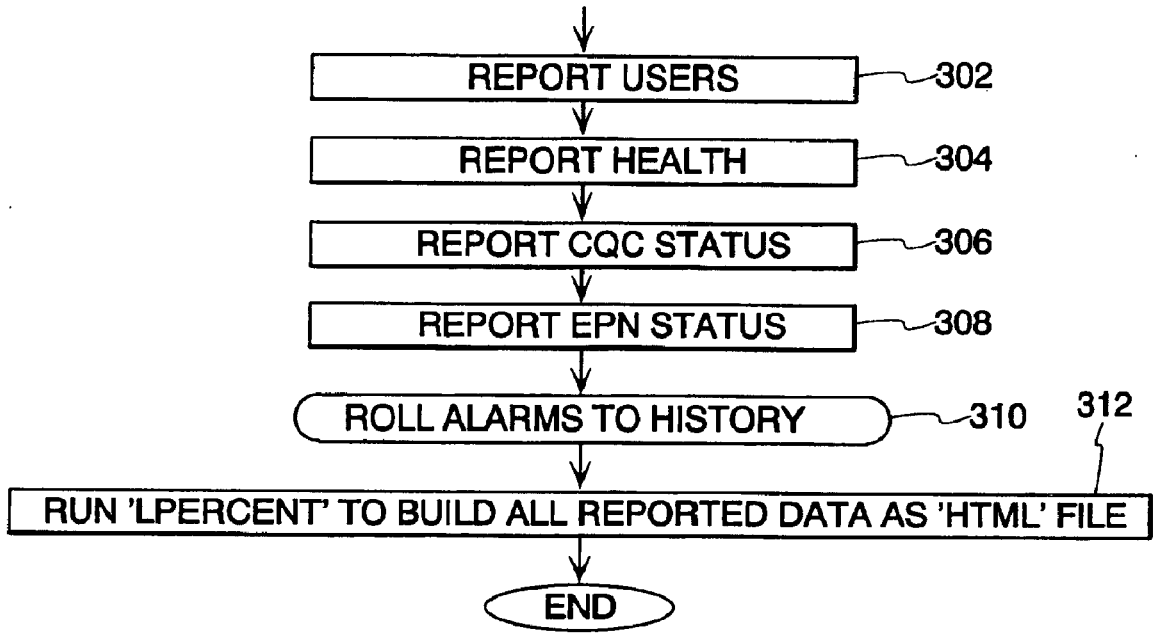
FIGS. 14–20 are the flow diagrams for processing data from the ACDs, in order to generate the web pages illustrated in FIGS. 4–11 in accordance with the present invention.

As mentioned above, the present invention continuously and automatically polls the ACDs over a dial up connection, captures data stored relative to the ACDs and processes this data, for example, to generate the exemplary web pages illustrated in FIGS. 4 through 11. The system in accordance with the present invention may be implemented with standard communications type software, such as Procomm Plus V4.7, available from Symantec Corp. and adapted to provide continuous and automatic polling and transmission of data stored in the ACDs. In one embodiment of the invention, the system is adapted to transmit data, such as alarm data, gathered from the ACDs, to a paging platform to provide notification of the alarm status of the ACDs in addition to or in lieu of the web pages illustrated in FIGS. 4 through 11. The communication software is illustrated in FIG. 12 while the paging software is illustrated in FIG. 13. In particular, as will be discussed in more detail below, FIG. 12 illustrates a modification to a standard communication software package, such as a Procomm Plus V4. 7package, for continuously and automatically dialing up and logging in as well as retrieving data from the various ACDs in the network. The paging software illustrated in FIG. 13 may be used to send out a display page based upon the occurrence of major and/or minor alarm conditions of the ACDs. The flow diagrams illustrated in FIG. 14 through 20 relate to processing of the data from the various ACDs in order to generate the various web pages illustrated in FIGS. 4 through 11. Exemplary software written in C$^+$ for automatically and continuously dialing up, logging and capturing data from the ACDs is provided in Appendix 6. Exemplary software written in C$^+$ for transmitting alarm status to a pager platform is provided in Appendix 7. Although the C$^+$ software illustrated in appendices 7 and 8 is written around the Procomm communications software, the principles of the present invention are applicable to virtually any standard communication software package.

Appendices 1 through 5 relate to the C$^+$ files for processing the data retrieved from the various ACDs. In particular, Appendix 1, entitled "miel.cfg" is a configuration file of the ACD 28, "Michigan-1". This file, "micl.cf", identifies all of the equipment connected to the ACD 28, "Michigan-1". For example, with reference to Appendix 1, the file identifies the various inbound trunks from the long distance carriers 38 and 40 (FIG. 1), DID trunks, the intermachine trunks (IMT); the outbound trunks, the interactive voice response unit (IVR) trunks, the contact quality center (CQC) and the various EPNs connected to the ACD 28.

Appendix 2, entitled "micl.eqp", is an equipment file of all the various equipment connected to the ACD 28; (FIG. 1) "Michigan-1". As shown in Appendix 2, all of the equipment being monitored for the ACD 28 (FIG. 1). "Michigan-1" is identified in Appendix 2.

Appendix 3 relates to a trunk file for the ACD 28 (FIG. 1), "Michigan-1". For example, page 3 of Appendix 3 identifies Troy trunk group number 629. As shown on page 3 of Appendix 3, Troy trunk group 629 is shown to consist of circuits 004 E 17; 005 E 17, 006 A 17; 007 A 17 and 007 E 17, which corresponds to box 156 in FIG. 5A.

Appendix 4, entitled "micl.gat", relates to the agent's skill level for the ACD 28 (FIG. 1), "Michigan-1". This file is used to provide the agent status web page as illustrated in FIG. 9.

Appendix 5, entitled "micl.pn" is a load balance file. This file is used to provide the load balance web page as illustrated in FIG. 11. For example, as shown, this file is used to provide a load balance or occupancy level of the various port cabinets as well as the EPNs attached to the ACD 28; namely Bethune, Kalamazoo, Saginaw and Southfield.

Referring to FIG. 12 an exemplary flow diagrams for continuously, connecting to, logging into and capturing data from various ACDs is illustrated and generally identified with the reference numeral 200. Initially, an ACD is selected in step 202. The system then dials into and logs onto the selected ACD in step 204. After the system logs onto the selected ACD, the system waits for an answer back to determine if the connection was successful in steps 206. If not, the system proceeds to step 209 and transmits and generates a carrier failure status indication in step 209. After a successful connection, the system begins capturing available data from the selected ACD in step 208 and successfully reports the carrier status in step 210. After the carrier status has been reported, trunk group traffic information is received from the selected ACD in step 212. Subsequently, the alarm status is transmitted in step 214.

In order to provide some level of reliability of the data transmitted from the ACD, the system may periodically check the carrier connection as illustrated in steps 216, 218, 220, 222 and 224. Anytime a carrier failure is detected, the system proceeds to step 208 and generates a carrier failure indication.

Assuming that the system is connected, the status health of the selected ACD is transmitted in 226, after the system checks to see if it is still connected to the carrier in step 218. The system retrieves the trunk group load traffic data in step 228. After again checking the connection of the carrier in step 220, the system retrieves the agents status data in step 230.

In step 232, the system retrieves the IVR port status after checking the connection of the carrier in step 222. Subsequently, in step 234 the system retrieves all login data and terminates the data capture from the ACD in step 236.

If any alarms have been detected, the system may be configured to transmit the alarm information to a paging platform in step 238, for example, as illustrated in FIG. 13. Subsequently, in step 240 the system selects the next ACD and loops back to step 202 to provide a continuous and automatic process for dialing up; logging into and capturing data from the next of the various ACDs in the network.

As indicated above, the system may be provided with the ability to provide major and minor alarm status to a paging platform. The software for transmitting the major and minor alarm information to a paging platform, for example, Procomm Plus, as illustrated in FIG. 13. This system generally identified with the reference numeral 250 continuously loops waiting for major and minor alarms to be detected as mentioned above in step 238. Once the alarm information is detected in step 252, the alarm data may be assembled in a batch file or other file suitable for transmission to a paging platform. Once the alarm data is assembled in a suitable file, it is continuously transmitted to the paging platform in steps 256 and 258 until the paging platform indicates to the system 250 that the page was successfully received.

Figure 15:
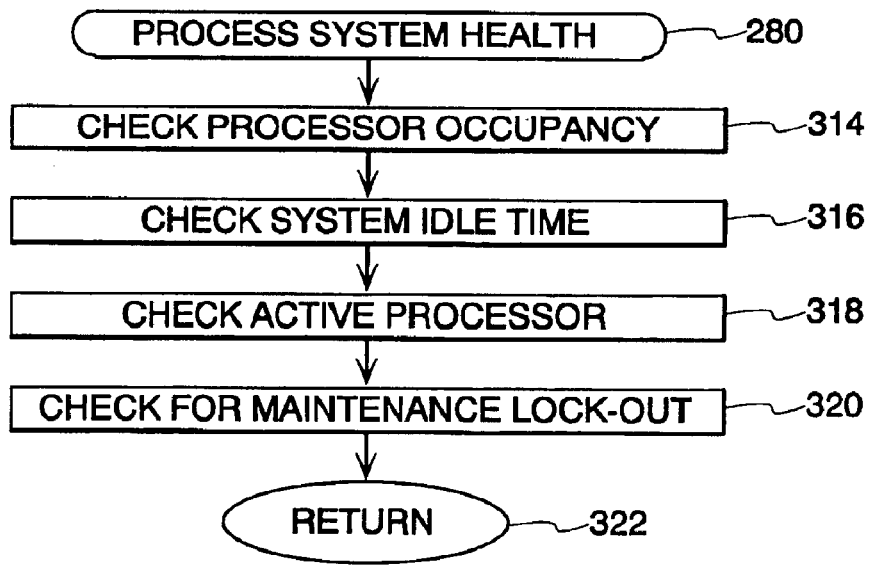

The software for processing the data captured from the ACDs is illustrated in FIGS. 14–20. FIGS. 14A–C illustrates the main loop. Referring to FIGS. 14A–C, the system begins by initializing its arrays and opening files in steps 260 and 262. As known in the art, in order to determine the time corresponding to particular status information provided in an ACD, all ACDs are known to be provided with a real time clock. Depending on the location of the ACD, different ACDs in a network may be in different time zones. As such, in steps 264 and 266, the real time data from the ACDs is obtained and adjusted for the particular time zone for the ACD in processing. Subsequently, in step 268 the data obtained from the ACD, as discussed above in FIG. 12, is read in step 268. In steps 270–280, the system ascertains what type of data was captured. For example, in step 270 the system determines if system health status data was captured. If the data involves system health status, the system proceeds to step 281 and processes the system health data as illustrated in FIG. 15.

It the data is not system health status, the system next determines in 272 whether the data is related to alarm information. If so, the system proceeds to step 282 and processes the alarm information in accordance with FIG. 16. If the data is not alarm information, the system next determines whether the captured data was hunt group or agent status information. If the captured data was hunt group information as determined in step 274, the system next proceeds to step 284 and processes the hunt groups information as set forth in FIG. 17. If the captured data was not hunt group information, the system next ascertains whether the data is login status in step 276. If so, the system proceeds to process the login information in step 286 as illustrated in FIG. 18. If the data is not login status information, the system checks in step 278 to determine whether the data is trunk information. If so, the system processes the trunk group information in step 288 as set forth in FIG. 19. If the captured data is not system health status data; alarm information; hunt group information; login status or trunk group information, the system next ascertains whether the data capture was load balance information. If so, the system proceeds to step 290 and processes the load balance information as set forth in FIG. 20.

All of the data processing algorithms illustrated in FIGS. 15–20 return to the main loop. Subsequently, after all of the various data is processed as set forth in FIGS. 15 and 20. The system computes the summary information in steps 292 (FIG. 14B) any may load it into HTML files for displaying by way of the web pages illustrated in FIGS. 4–11. In particular, system summary information may be used for example to provide data for the ACD web page, for example, as illustrated in the data 132, 134 illustrated in FIG. 4. In step 294, the total number of trunks groups is listed in column 140 in the data box 132. Next, in step 296, the total for the alarm status may be provided for the data box 134 (FIG. 4). Lastly, the summary information computed in step 292 to report the number of agents in step 298 and the blockage in step 300 from the information obtained in step 290 for display in the data box 136 in FIG. 4. In step 302, the system identifies the various login users to the ACD in the data box 136 in FIG. 4. For example, as shown in FIG. 4, the user "bamh" is identified. Next, in step 304 the system processes the system health. In particular, the system checks the occupancy and idle time for reporting in the data box 136 in the ACD home page illustrated in FIG. 4. In step 306, the system reports the contact quality status (CQC) in the data box 132 on the ACD home page 130 illustrated in FIG. 4. The CQC is treated like a trunk group and is reported as either "used" or "idle". Next, in step 308, the system reports the EPNs status. As mentioned above, the ACD web page includes an PEN hyperlink, linked to the various EPNs connected to the specific ACD, for example as illustrated in FIG. 7A and 7B. As discussed above, this data may be used to provide occupancy (i.e. usage) information for the various EPNs for example as illustrated in column 188 in FIG. 11.

Figure 20:
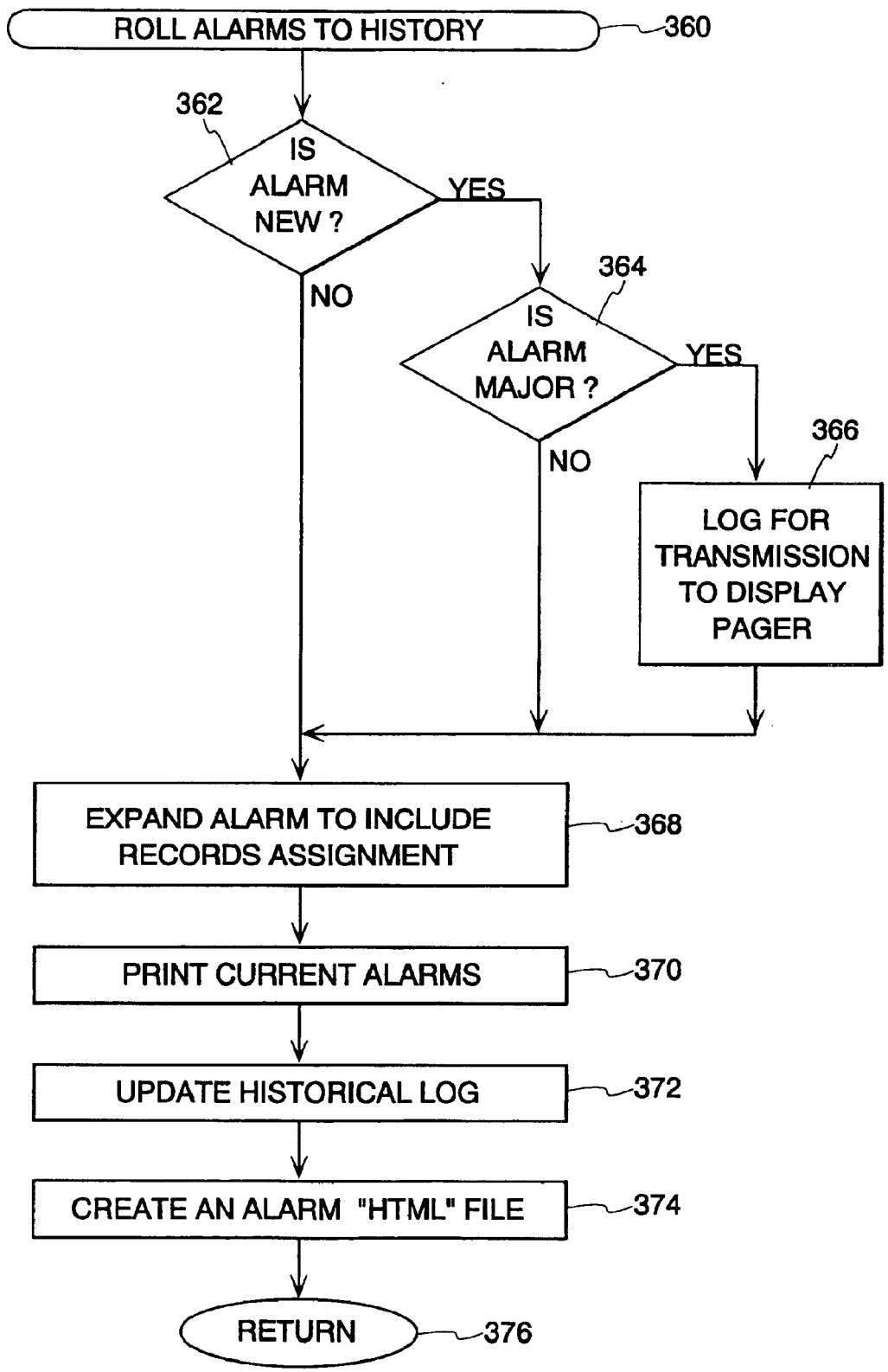

As mentioned above, the system is adapted to provide an alarm log for each ACD. An exemplary alarm log is illustrated in FIG. 8. The information for the exemplary alarm log is generated by the system which forms a historical file for all alarms captured in step 310 as illustrated in FIG. 20. In step 312, the data collected above is used to create a dynamic HTML file to provide virtually real time data by way of a web page.

The software for processing the data captured from the ACD is illustrated in FIGS. 15–20. Referring to FIG. 15, the algorithm for processing the system health is illustrated. In step 314, 316 and 318, system checks data captured from the ACD relating to the occupancy of the ACD; idle time and whether the ACD is active. In addition, in step 320 the system checks to determine if the ACD has been blocked out for maintenance activity. The system returns in step 322 to the main loop to process additional data retrieved from the selected ACD.

Figure 16:
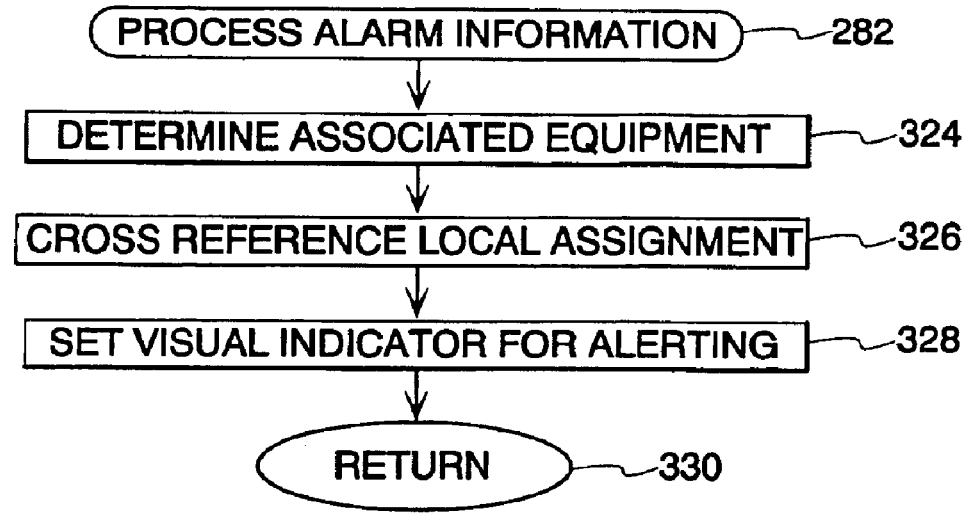

Alarm information is processed as illustrated in FIG. 16. In step 324, the equipment associated with each alarm is determined. This equipment is then cross referenced in step 326 to process the data retrieved with the specific equipment associated with the alarm (i.e., EPN Saginaw), for example as illustrated in FIG. 8. Next, instep 328 the system identifies the alarms in the data box 134 (FIG. 4) of the ACD web page 130. The system returns in step 330.

Figure 17:
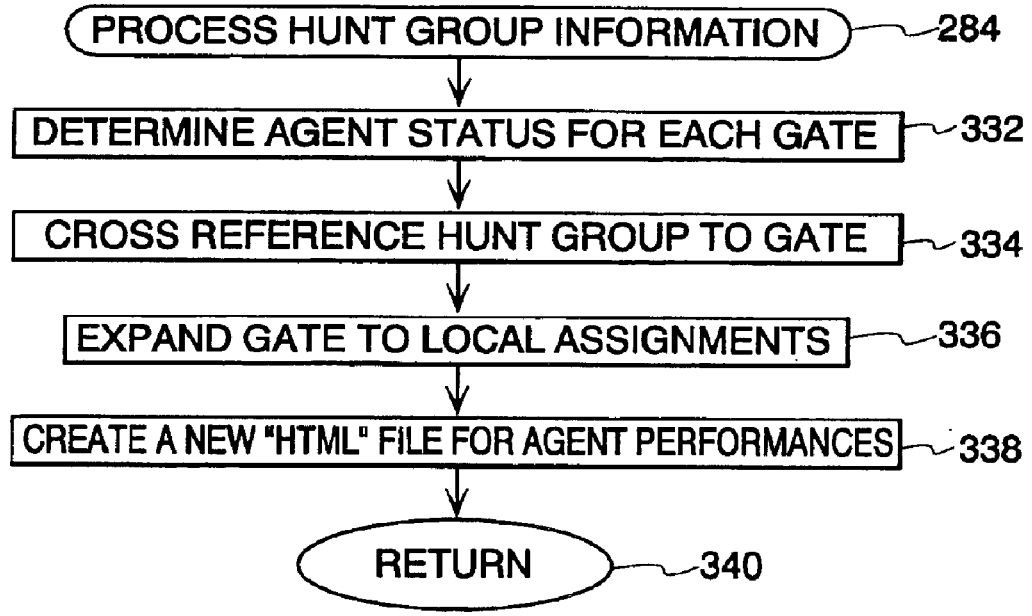
Figure 18:
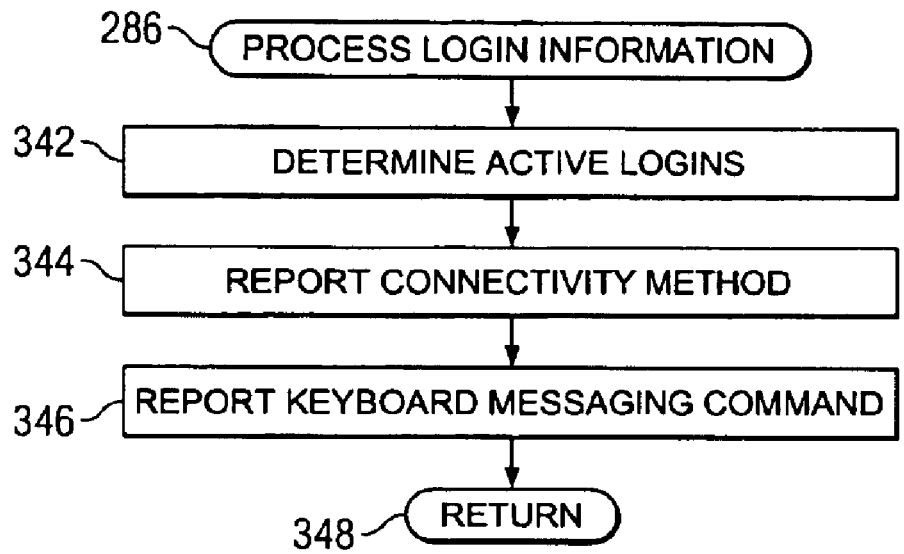

A sub-system for processing hunt group information is illustrated in FIG. 17. The data processed by this sub system is used to create agent status web pages as illustrated in FIG. 9. Initially, in step 332 the system determines the status of each agent (i.e. skill level of agent; number of calls in the queue; longest wait for calls). In step 334, the agents are crossed reference to various gate groups, for example, the gates identified in FIG. 9. In step 326, the gates are grouped according to local assignments, for example as illustrated in FIG. 9. The information may be used to create a dynamic HTML file for display on a web page illustrated in FIG. 9. The system returns from step 340.

Login information may be processed as illustrated in FIG. 18. This information is used to identify the login users and the current system status data box 136 (FIG. 4) on the ACD home page 130. Initially this system determines the number of active logins in step 342. For example, as shown in FIG. 4, the user "rbamh" is illustrated. In step 344, the connectivity is reported. As shown in the data box 136 in FIG. 4, the connectivity method is shown as dial up versus direct connect (i.e. local log-in). In step 346, keyboarding messaging commands are reported. The most recent input messages by the user provide a historical audit trail of activity. The system returns in step 348.

Figure 19:
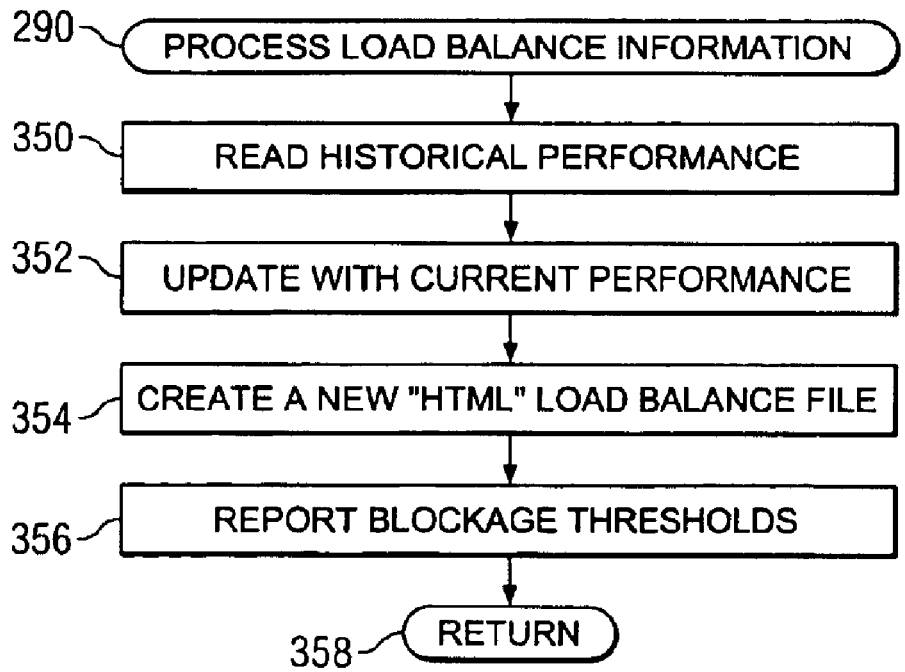

The system for processing load balance information is illustrated in FIG. 19. This information is used to provide the load balance information illustrated in column 192 of the traffic load web page illustrated in FIG. 2. Initially, in step 350 historical load balance data is read. This data is updated with the current load balance information in step 352 and used to generate a HTML load balance file, which in step 354, is used to generate the web pages illustrated in FIGS. 4 and 11. In step 356, blockage thresholds are reported. The blockage threshold relate to 0%–100% for growth potential of capacity exhaust. This data is used for the data box 136 of the ACD web page 130 illustrated in FIG. 4. The system returns in step 358.

As mentioned above, the system may be used to generate an alarm log, for example as illustrated in FIG. 8. Initially in step 362, the system determines whether the alarm is new. If so, it determines whether the alarm is a major alarm in step 364. If the system is a major alarm, the system logs the alarm for transmission to a display pager in step 366. If the alarm is not a major alarm or if the alarm is not a new alarm, the system proceeds to step 368 for display on the web page illustrated in FIG. 8. The system may also include a step 370 for printing current alarms. Subsequently, in step 372, the historical alarm log is updated. This information is used in step 374 to create a dynamic HTML file for display, for example, in FIG. 8. The system returns in step 376.

Exemplary HTML code for the web pages illustrated in FIGS. 4–11 is provided in appendices 9–16 as indicated in the table below.

| FIG. | HTML File Name | Appendix |
| --- | --- | --- |
| 4 | mic1.htm | 9 |
| 5 | mic1011.htm | 10 |
| 6 | 324230.htm | 11 |
| 7 | mic1epn.htm | 12 |
| 8 | mic1alm.htm | 13 |
| 9 | mic1agnt.htm | 14 |
| 10 | mic1E14.htm | 15 |
| 11 | mic1load.htm | 16 |

It should be appreciated that a wide range of changes and modifications may be made to the embodiment of the invention as described herein. Thus, it is intended that the foregoing detailed descriptions be regarded as illustrative rather than limiting and that the following claims, including all equivalents, are intended to define the scope of the invention.

APPENDIX 1 mic1.cfg

TROY:99 G:99 G
  11:ACI TROY
  13:ACI TROY
  15:ACI TROY
  17:ACI TROY
  18:ACI TROY
  19:ACI TROY
HUDSON:90 Y:95 R
  12:ACI HUDSON
  14:ACI HUDSON
  16:ACI HUDSON
  20:ACI HUDSON
  21:ACI HUDSON
  22:ACI HUDSON
DID 90 Y:99 R
  30:DID
IMT CHICAGO 1:90 Y:99 R
  3:IMT CHICAGO 1
IMT CHICAGO 2:90 Y:99 R
  5:IMT CHICAGO 2

APPENDIX 1-continued mic1.cfg

IMT CHICAGO 3:90 Y:99 R
   2:IMT CHICAGO 3
IMT CLEVELAND:90 Y:99 R
   6:IMT CLEVELAND
IMT DETROIT 2:90 Y:99 R
   8:IMT DETROIT 2
   9:IMT DETROIT 2
   118:IMT DETROIT 2
OUT DETROIT:90 G:99 G
   32:OUTBOUND DETROIT
OUT SOUTHFIELD:90 Y:99 R
   33:OUTBOUND SOUTHFIELD
   34:OUTBOUND SOUTHFIELD

APPENDIX 1-continued mic1.cfg

MICH IVR:90 Y:99 R
   599:IVR PORTS
CQC
   CQC:CONTACT QUALITY
EPN's
   EPN:BETHUNE (IT)
   EPN:KALAMAZOO
   EPN:LANSING
   EPN:SAGINAW
   EPN:SOUTHFIELD

APPENDIX 2 mic1.eqp

```
MIC1 05/25/99
01A      DISK DRIVE            TN1657
01A      DUPLICATION INTRFC    UN330B
01A      MEMORY 1              TN1650B
01A      MEMORY 2              TN1650B
01A      MEMORY 3              TN1650B
01A      MSS/NETWORK CONT      UN332
01A      PACKET INTERFACE 1    TN1655
01A      PROCESSOR             UN331B
01A      SYS ACCESS-MAINT      TN1648
01A      TAPE DRIVE            TN1656
01A      TONE/CLOCK            TN2182B
01B      DISK DRIVE            TN1657
01B      DUPLICATION INTRFC    UN330B
01B      MEMORY 1              TN1650B
01B      MEMORY 2              TN1650B
01B      MEMORY 3              TN1650B
01B      MSS/NETWORK CONT      UN332
01B      PACKET INTERFACE 1    TN1655
01B      PROCESSOR             UN331B
01B      SYS ACCESS-MAINT      TN1648
01B      TAPE DRIVE            TN1656
01B      TONE/CLOCK            TN2182
01C01    PGATE BOARD           TN577
01C02    EXPANSION INTRFC      TN570B
01C03    DATA LINE             TN726B
01C04    PDATA LINE            TN553
01C05    AUXILIARY TRUNK       TN763D
01C06    MAINTENANCE/TEST      TN771D
01C07    DS1 INTERFACE         TN767E     HG 599 - IVR x58000
01C08    DS1 INTERFACE         TN767E     HG 599 - IVR x58024
01C09    DS1 INTERFACE         TN767E     HG 599 - IVR x58048
01C11    DS1 CONVERTER         TN1654     EPN 25 - KALAMAZOO
01C12    DS1 CONVERTER         TN1654     EPN 14 - BETHUNE
01C13    DS1 INTERFACE         TN767E     HG 599 - IVR x58072
01C14    DS1 INTERFACE         TN767E     HG 599 - IVR x58288
01C15    DS1 INTERFACE         TN767E     HG 599 - IVR x58312
01C16    DS1 INTERFACE         TN464F     TGN 3 - IMT CHICAGO 1
01C17    DS1 INTERFACE         TN464F     TGN 3 - IMT CHICAGO 1
01C18    DS1 INTERFACE         TN464F     TGN 3 - IMT CHICAGO 1
01C19    DS1 INTERFACE         TN464F     CQC - SOUTHFIELD
01C20    DS1 INTERFACE         TN464F     CQC - KALAMAZOO
01D01    DIGITAL LINE          TN754C
01D02    EXPANSION INTRFC      TN570B
01D04    ANALOG LINE           TN746B
01D08    DS1 INTERFACE         TN767E     HG 599 - IVR x58336
01D09    DS1 INTERFACE         TN767E     TGN 11 - TROY TGN 623
01D10    DS1 CONVERTER         TN1654     EPN 17 - SOUTHFIELD
01D11    DS1 CONVERTER         TN1654     EPN 18 - SOUTHFIELD
01D12    DS1 INTERFACE         TN767E     TGN 3 - IMT CHICAGO 1
01D13    DS1 INTERFACE         TN767E     TGN 32 - OUTBOUND DETROIT
01D15    DS1 INTERFACE         TN767E     HG 599 - IVR x58360
01D16    DS1 INTERFACE         TN767E     HG 599 - IVR x58096
01D17    DS1 INTERFACE         TN464F     TGN 5 - IMT CHICAGO 2
```

APPENDIX 2-continued

| | | mic1.eqp | |
|---|---|---|---|
| 01D18 | DS1 INTERFACE | TN464F | TGN 5 - IMT CHICAGO 2 |
| 01D19 | DS1 INTERFACE | TN464F | CQC - LANSING |
| 01D20 | DS1 INTERFACE | TN464F | CQC - SAGINAW |
| 01E01 | DS1 CONVERTER | TN1654 | EPN 26 - KALAMAZOO |
| 01E02 | SWITCH NODE INTF | TN573B | |
| 01E03 | SWITCH NODE INTF | TN573B | EPN 26 - KALAMAZOO |
| 01E04 | SWITCH NODE INTF | TN573B | |
| 01E05 | SWITCH NODE INTF | TN573B | |
| 01E07 | SWITCH NODE INTF | TN573B | EPN 17 - SOUTHFIELD |
| 01E08 | SWITCH NODE INTF | TN573B | |
| 01E09 | SWITCH NODE INTF | TN573B | |
| 01E10 | SWITCH NODE CLOCK | TN572 | |
| 01E12 | SWITCH NODE CLOCK | TN572 | |
| 01E13 | SWITCH NODE INTF | TN573B | |
| 01E14 | SWITCH NODE INTF | TN573B | |
| 01E15 | SWITCH NODE INTF | TN573B | EPN 25 - KALAMAZOO |
| 01E16 | SWITCH NODE INTF | TN573B | EPN 18 - SOUTHFIELD |
| 01E17 | SWITCH NODE INTF | TN573B | EPN 14 - BETHUNE |
| 01E18 | SWITCH NODE INTF | TN573B | |
| 01E20 | SWITCH NODE INTF | TN573B | |
| 02A | MAINTENANCE | TN775B | |
| 02A | TONE/CLOCK | TN2182B | |
| 02A01 | EXPANSION INTRFC | TN570B | |
| 02A02 | ANNOUNCEMENT | TN750C | |
| 02A03 | CALL CLASSIFIER | TN744C | |
| 02A04 | CALL CLASSIFIER | TN744C | |
| 02A05 | DIGITAL LINE | TN2224 | |
| 02A11 | DS1 CONVERTER | TN1654 | EPN 19 - SOUTHFIELD |
| 02A12 | DS1 INTERFACE | TN767E | HG 599 - IVR x58120 |
| 02A13 | DS1 INTERFACE | TN767E | HG 599 - IVR x58144 |
| 02A14 | DS1 INTERFACE | TN767E | |
| 02A15 | RESERVED LGATE | TN2208 | |
| 02A16 | RESERVED LGATE | TN2208 | |
| 02A17 | RESERVED LGATE | TN2208 | |
| 02A18 | LAN GATE BOARD | TN2208 | |
| 02A19 | RESERVED LGATE | TN2208 | |
| 02B01 | BRI LINE | TN556B | |
| 02B03 | ANNOUNCEMENT | TN750C | |
| 02B10 | DS1 CONVERTER | TN1654 | EPN 20 - SOUTHFIELD |
| 02B11 | DS1 CONVERTER | TN1654 | EPN 27 - KALAMAZOO |
| 02B13 | DS1 INTERFACE | TN767E | TGN 11 - TROY TGN 623 |
| 02B14 | DS1 INTERFACE | TN767E | TGN 5 - IMT CHICAGO 2 |
| 02B15 | DS1 INTERFACE | TN767E | TGN 32 - OUT DETROIT |
| 02B16 | DS1 INTERFACE | TN767E | TGN 32 - OUT DETROIT |
| 02B17 | DS1 INTERFACE | TN767E | TGN 32 - OUT DETROIT |
| 02B18 | DS1 INTERFACE | TN464F | TGN 6 - IMT CLEVELAND |
| 02B19 | DS1 INTERFACE | TN464F | TGN 6 - IMT CLEVELAND |
| 02E01 | DS1 CONVERTER | TN1654 | EPN 28 - SAGINAW |
| 02E02 | SWITCH NODE INTF | TN573B | |
| 02E03 | SWITCH NODE INTF | TN573B | EPN 28 - SAGINAW |
| 02E04 | SWITCH NODE INTF | TN573B | |
| 02E05 | SWITCH NODE INTF | TN573B | |
| 02E06 | SWITCH NODE INTF | TN573B | EPN 20 - SOUTHFIELD |
| 02E07 | SWITCH NODE INTF | TN573B | EPN 27 - KALAMAZOO |
| 02E08 | SWITCH NODE INTF | TN573B | |
| 02E09 | SWITCH NODE INTF | TN573B | |
| 02E10 | SWITCH NODE CLOCK | TN572 | |
| 02E12 | SWITCH NODE CLOCK | TN572 | |
| 02E13 | SWITCH NODE INTF | TN573B | |
| 02E14 | SWITCH NODE INTF | TN573B | |
| 02E16 | SWITCH NODE INTF | TN573B | EPN 19 - SOUTHFIELD |
| 02E17 | SWITCH NODE INTF | TN573B | |
| 02E18 | SWITCH NODE INTF | TN573B | |
| 02E19 | SWITCH NODE INTF | TN573B | |
| 02E20 | SWITCH NODE INTF | TN573B | EPN 29 - SAGINAW |
| 02E21 | DS1 CONVERTER | TN1654 | EPN 29 - SAGINAW |
| 03A | MAINTENANCE | TN775B | |
| 03A | TONE/CLOCK | TN2182B | |
| 03A01 | EXPANSION INTRFC | TN570B | |
| 03A02 | ANNOUNCEMENT | TN750C | |
| 03A03 | CALL CLASSIFIER | TN744C | |
| 03A04 | CALL CLASSIFIER | TN744C | |
| 03A10 | DS1 CONVERTER | TN1654 | EPN 21 - SOUTHFIELD |
| 03A11 | DS1 CONVERTER | TN1654 | EPN 22 - SOUTHFIELD |
| 03A12 | DS1 INTERFACE | TN767E | HG 599 - IVR x58168 |
| 03A13 | DS1 INTERFACE | TN767E | HG 599 - IVR x58192 |
| 03A14 | DS1 INTERFACE | TN767E | HG 599 - IVR x58216 |

APPENDIX 2-continued mic1.eqp

| | | | |
|---|---|---|---|
| 03A15 | DS1 INTERFACE | TN767E | HG 599 - IVR x58240 |
| 03A16 | DS1 INTERFACE | TN767E | HG 599 - IVR x58264 |
| 03A17 | DS1 INTERFACE | TN464F | TGN 15 - TROY TGN 627 |
| 03A18 | DS1 INTERFACE | TN464F | TGN 118 - IMT DETROIT 2 |
| 03A19 | DS1 INTERFACE | TN464F | TGN 11 - TROY TGN 623 |
| 03E01 | DS1 CONVERTER | TN1654 | EPN 30 - SAGINAW |
| 03E02 | SWITCH NODE INTF | TN573B | |
| 03E03 | SWITCH NODE INTF | TN573B | EPN 30 - SAGINAW |
| 03E04 | SWITCH NODE INTF | TN573B | |
| 03E05 | SWITCH NODE INTF | TN573B | |
| 03E06 | SWITCH NODE INTF | TN573B | EPN 22 - SOUTHFIELD |
| 03E07 | SWITCH NODE INTF | TN573B | |
| 03E08 | SWITCH NODE INTF | TN573B | |
| 03E10 | SWITCH NODE CLOCK | TN572 | |
| 03E12 | SWITCH NODE CLOCK | TN572 | |
| 03E14 | SWITCH NODE INTF | TN573B | |
| 03E15 | SWITCH NODE INTF | TN573B | |
| 03E16 | SWITCH NODE INTF | TN573B | |
| 03E17 | SWITCH NODE INTF | TN573B | EPN 21 - SOUTHFIELD |
| 03E18 | SWITCH NODE INTF | TN573B | |
| 03E19 | SWITCH NODE INTF | TN573B | |
| 03E20 | SWITCH NODE INTF | TN573B | EPN 31 - SAGINAW |
| 03E21 | DS1 CONVERTER | TN1654 | EPN 31 - SAGINAW |
| 04A | MAINTENANCE | TN775B | |
| 04A | TONE/CLOCK | TN2182B | |
| 04A01 | EXPANSION INTRFC | TN570B | |
| 04A02 | ANNOUNCEMENT | TN750C | |
| 04A03 | CALL CLASSIFIER | TN744C | |
| 04A04 | CALL CLASSIFIER | TN744C | |
| 04A05 | ANNOUNCEMENT | TN750 | |
| 04A11 | DS1 INTERFACE | TN767E | TGN 11 - TROY TGN 623 |
| 04A12 | DS1 INTERFACE | TN767E | TGN 15 - TROY TGN 627 |
| 04A13 | DS1 INTERFACE | TN767E | TGN 32 - OUT DETROIT |
| 04A14 | DS1 INTERFACE | TN767E | TGN 32 - OUT DETROIT |
| 04A15 | DS1 INTERFACE | TN767E | TGN 20 - HUDSON TGN 716 |
| 04A16 | DS1 INTERFACE | TN767E | TGN 5 - IMT CHICAGO 2 |
| 04A17 | DS1 INTERFACE | TN464F | TGN 15 - TROY TGN 627 |
| 04A18 | DS1 INTERFACE | TN464F | TGN 11 - TROY TGN 623 |
| 04A19 | DS1 INTERFACE | TN464F | TGN 16 - HUDSON TGN 642 |
| 04E | TONE/CLOCK | TN2182B | |
| 04E01 | EXPANSION INTRFC | TN570B | |
| 04E02 | TONE/CLOCK | TN2182B | |
| 04E08 | DS1 INTERFACE | TN767E | TGN 5 - IMT CHICAGO 2 |
| 04E09 | DS1 INTERFACE | TN767E | TGN 12 - HUDSON TGN 722 |
| 04E10 | DS1 INTERFACE | TN767E | TGN 21 - HUDSON TGN 724 |
| 04E11 | DS1 INTERFACE | TN767E | TGN 22 - HUDSON TGN 643 |
| 04E13 | DS1 INTERFACE | TN767E | TGN 19 - TROY TGN 634 |
| 04E14 | DS1 INTERFACE | TN767E | TGN 21 - HUDSON TGN 724 |
| 04E15 | DS1 INTERFACE | TN767E | TGN 22 - HUDSON TGN 643 |
| 04E16 | DS1 INTERFACE | TN464F | TGN 34 - OUT SOUTHFIELD |
| 04E17 | DS1 INTERFACE | TN464F | TGN 17 - TROY TGN 629 |
| 04E18 | DS1 INTERFACE | TN464F | TGN 18 - TROY TGN 624 |
| 04E19 | DS1 INTERFACE | TN464F | TGN 19 - TROY TGN 634 |
| 04E20 | DS1 INTERFACE | TN464F | TGN 20 - HUDSON TGN 716 |
| 05A | MAINTENANCE | TN775B | |
| 05A | TONE/CLOCK | TN2182B | |
| 05A01 | EXPANSION INTRFC | TN570B | |
| 05A02 | CALL CLASSIFIER | TN744C | |
| 05A03 | CALL CLASSIFIER | TN744C | |
| 05A04 | PGATE BOARD | TN577 | |
| 05A11 | DS1 INTERFACE | TN767E | TGN 16 - HUDSON TGN 642 |
| 05A12 | DS1 INTERFACE | TN767E | TGN 15 - TROY TGN 627 |
| 05A13 | DS1 INTERFACE | TN767E | TGN 20 - HUDSON TGN 716 |
| 05A14 | DS1 INTERFACE | TN767E | TGN 6 - IMT CLEVELAND |
| 05A15 | DS1 INTERFACE | TN767E | TGN 6 - IMT CLEVELAND |
| 05A16 | DS1 INTERFACE | TN464F | TGN 16 - HUDSON TGN 642 |
| 05A17 | DS1 INTERFACE | TN464F | TGN 33 - OUT SOUTHFIELD |
| 05A18 | DS1 INTERFACE | TN464F | TGN 21 - HUDSON TGN 724 |
| 05A19 | DS1 INTERFACE | TN464F | TGN 22 - HUDSON TGN 643 |
| 05E | TONE/CLOCK | TN2182B | |
| 05E01 | EXPANSION INTRFC | TN570B | |
| 05E02 | TONE/CLOCK | TN2182B | |
| 05E08 | DS1 INTERFACE | TN767E | TGN 30 - DID |
| 05E09 | DS1 INTERFACE | TN767E | TGN 30 - DID |
| 05E10 | DS1 INTERFACE | TN767E | TGN 6 - IMT CLEVELAND |
| 05E11 | DS1 INTERFACE | TN767E | TGN 13 - TROY TGN 626 |
| 05E12 | DS1 INTERFACE | TN767E | TGN 14 - HUDSON TGN 635 |

APPENDIX 2-continued

| | mic1.eqp | | |
|---|---|---|---|
| 05E13 | DS1 INTERFACE | TN767E | TGN 19 - TROY TGN 634 |
| 05E14 | DS1 INTERFACE | TN767E | TGN 12 - HUDSON TGN 722 |
| 05E15 | DS1 INTERFACE | TN464F | TGN 13 - TROY TGN 626 |
| 05E16 | DS1 INTERFACE | TN464F | TGN 14 - HUDSON TGN 635 |
| 05E17 | DS1 INTERFACE | TN464F | TGN 17 - TROY TGN 629 |
| 05E18 | DS1 INTERFACE | TN464F | TGN 18 - TROY TGN 624 |
| 05E19 | DS1 INTERFACE | TN464F | TGN 19 - TROY TGN 634 |
| 05E20 | DS1 INTERFACE | TN464F | TGN 20 - HUDSON TGN 716 |
| 06A | MAINTENANCE | TN775B | |
| 06A | TONE/CLOCK | TN2182B | |
| 06A01 | EXPANSION INTRFC | TN570B | |
| 06A02 | CALL CLASSIFIER | TN744C | |
| 06A03 | CALL CLASSIFIER | TN744C | |
| 06A11 | DS1 INTERFACE | TN767E | TGN 6 - IMT CLEVELAND |
| 06A12 | DS1 INTERFACE | TN767E | TGN 15 - TROY TGN 627 |
| 06A13 | DS1 INTERFACE | TN767E | TGN 16 - HUDSON TGN 642 |
| 06A14 | DS1 INTERFACE | TN767E | TGN 6 - IMT CLEVELAND |
| 06A15 | DS1 INTERFACE | TN767E | TGN 12 - HUDSON TGN 722 |
| 06A16 | DS1 INTERFACE | TN464F | TGN 12 - HUDSON TGN 722 |
| 06A17 | DS1 INTERFACE | TN464F | TGN 17 - TROY TGN 629 |
| 06A18 | DS1 INTERFACE | TN464F | TGN 21 - HUDSON TGN 724 |
| 06A19 | DS1 INTERFACE | TN464F | TGN 22 - HUDSON TGN 643 |
| 06E | TONE/CLOCK | TN2182B | |
| 06E01 | EXPANSION INTRFC | TN570B | |
| 06E02 | TONE/CLOCK | TN2182B | |
| 06E08 | DS1 INTERFACE | TN767E | TGN 30 - DID |
| 06E10 | DS1 INTERFACE | TN767E | TGN 14 - HUDSON TGN 635 |
| 06E11 | DS1 INTERFACE | TN767E | TGN 13 - TROY TGN 626 |
| 06E14 | DS1 INTERFACE | TN767E | TGN 19 - TROY TGN 634 |
| 06E15 | DS1 INTERFACE | TN464F | TGN 13 - TROY TGN 626 |
| 06E16 | DS1 INTERFACE | TN464F | TGN 14 - HUDSON TGN 635 |
| 06E17 | DS1 INTERFACE | TN464F | TGN 33 - OUT SOUTHFIELD |
| 06E18 | DS1 INTERFACE | TN464F | TGN 18 - TROY TGN 624 |
| 06E19 | DS1 INTERFACE | TN464F | TGN 34 - OUT SOUTHFIELD |
| 06E20 | DS1 INTERFACE | TN464F | TGN 20 - HUDSON TGN 716 |
| 07A | MAINTENANCE | TN775B | |
| 07A | TONE/CLOCK | TN2182B | |
| 07A01 | EXPANSION INTRFC | TN570B | |
| 07A02 | CALL CLASSIFIER | TN744C | |
| 07A03 | CALL CLASSIFIER | TN744C | |
| 07A10 | DS1 INTERFACE | TN767E | TGN 6 - IMT CLEVELAND |
| 07A11 | DS1 INTERFACE | TN767E | TGN 32 - OUT DETROIT |
| 07A12 | DS1 INTERFACE | TN767E | TGN 14 - HUDSON TGN 635 |
| 07A13 | DS1 INTERFACE | TN767E | TGN 6 - IMT CLEVELAND |
| 07A15 | DS1 INTERFACE | TN767E | TGN 16 - HUDSON TGN 642 |
| 07A16 | DS1 INTERFACE | TN464F | TGN 12 - HUDSON TGN 722 |
| 07A17 | DS1 INTERFACE | TN464F | TGN 17 - TROY TGN 629 |
| 07A18 | DS1 INTERFACE | TN464F | TGN 18 - TROY TGN 624 |
| 07A19 | DS1 INTERFACE | TN464F | TGN 33 - OUT SOUTHFIELD |
| 07E | TONE/CLOCK | TN2182B | |
| 07E01 | EXPANSION INTRFC | TN570B | |
| 07E02 | TONE/CLOCK | TN2182B | |
| 07E08 | DS1 INTERFACE | TN767E | TGN 30 - DID |
| 07E09 | DS1 INTERFACE | TN767E | TGN 6 - IMT CLEVELAND |
| 07E10 | DS1 INTERFACE | TN767E | TGN 13 - TROY TGN 626 |
| 07E11 | DS1 INTERFACE | TN767E | TGN 21 - HUDSON TGN 724 |
| 07E13 | DS1 INTERFACE | TN767E | |
| 07E14 | DS1 INTERFACE | TN767E | TGN 22 - HUDSON TGN 643 |
| 07E16 | DS1 INTERFACE | TN464F | TGN 34 - OUT SOUTHFIELD |
| 07E17 | DS1 INTERFACE | TN464F | TGN 17 - TROY TGN 629 |
| 07E18 | DS1 INTERFACE | TN464F | TGN 18 - TROY TGN 624 |
| 08A | MAINTENANCE | TN775B | @EPN 14 - BETHUNE |
| 08A | TONE CLOCK | TN2182 | @EPN 14 - BETHUNE |
| 08A01 | EXPANSION INTRFC | TN570B | @EPN 14 - BETHUNE |
| 08A02 | DS1 CONVERTER | TN1654 | @EPN 14 - BETHUNE |
| 08A03 | DIGITAL LINE | TN2224 | @EPN 14 - BETHUNE |
| 08A04 | DIGITAL LINE | TN2224 | @EPN 14 - BETHUNE |
| 08A05 | DIGITAL LINE | TN2224 | @EPN 14 - BETHUNE |
| 08A06 | DIGITAL LINE | TN2224 | @EPN 14 - BETHUNE |
| 13A | MAINTENANCE | TN775B | @EPN 17 - SOUTHFIELD |
| 13A | TONE CLOCK | TN2182 | @EPN 17 - SOUTHFIELD |
| 13A01 | EXPANSION INTRFC | TN570B | @EPN 17 - SOUTHFIELD |
| 13A02 | DS1 CONVERTER | TN1654 | @EPN 17 - SOUTHFIELD |
| 13A03 | DIGITAL LINE | TN2224 | @EPN 17 - SOUTHFIELD |
| 13A04 | DIGITAL LINE | TN2224 | @EPN 17 - SOUTHFIELD |
| 13A05 | DIGITAL LINE | TN2224 | @EPN 17 - SOUTHFIELD |
| 13A06 | DIGITAL LINE | TN2224 | @EPN 17 - SOUTHFIELD |

APPENDIX 2-continued mic1.eqp

| | | | |
|---|---|---|---|
| 13A07 | DIGITAL LINE | TN2224 | @EPN 17 - SOUTHFIELD |
| 14A | MAINTENANCE | TN775B | @EPN 18 - SOUTHFIELD |
| 14A | TONE CLOCK | TN2182 | @EPN 18 - SOUTHFIELD |
| 14A01 | EXPANSION INTRFC | TN570B | @EPN 18 - SOUTHFIELD |
| 14A02 | DS1 CONVERTER | TN1654 | @EPN 18 - SOUTHFIELD |
| 14A03 | DIGITAL LINE | TN2224 | @EPN 18 - SOUTHFIELD |
| 14A04 | DIGITAL LINE | TN2224 | @EPN 18 - SOUTHFIELD |
| 14A05 | DIGITAL LINE | TN2224 | @EPN 18 - SOUTHFIELD |
| 14A06 | DIGITAL LINE | TN2224 | @EPN 18 - SOUTHFIELD |
| 15A | MAINTENANCE | TN775B | @EPN 19 - SOUTHFIELD |
| 15A | TONE CLOCK | TN2182 | @EPN 19 - SOUTHFIELD |
| 15A01 | EXPANSION INTRFC | TN570B | @EPN 19 - SOUTHFIELD |
| 15A02 | DS1 CONVERTER | TN1654 | @EPN 19 - SOUTHFIELD |
| 15A03 | DIGITAL LINE | TN2224 | @EPN 19 - SOUTHFIELD |
| 15A04 | DIGITAL LINE | TN2224 | @EPN 19 - SOUTHFIELD |
| 15A05 | DIGITAL LINE | TN2224 | @EPN 19 - SOUTHFIELD |
| 15A06 | DIGITAL LINE | TN2224 | @EPN 19 - SOUTHFIELD |
| 16A | MAINTENANCE | TN775B | @EPN 20 - SOUTHFIELD |
| 16A | TONE CLOCK | TN2182 | @EPN 20 - SOUTHFIELD |
| 16A01 | EXPANSION INTRFC | TN570B | @EPN 20 - SOUTHFIELD |
| 16A02 | DS1 CONVERTER | TN1654 | @EPN 20 - SOUTHFIELD |
| 16A03 | DIGITAL LINE | TN2224 | @EPN 20 - SOUTHFIELD |
| 16A04 | DIGITAL LINE | TN2224 | @EPN 20 - SOUTHFIELD |
| 16A05 | DIGITAL LINE | TN2224 | @EPN 20 - SOUTHFIELD |
| 16A06 | DIGITAL LINE | TN2224 | @EPN 20 - SOUTHFIELD |
| 17A | MAINTENANCE | TN775B | @EPN 21 - SOUTHFIELD |
| 17A | TONE CLOCK | TN2182 | @EPN 21 - SOUTHFIELD |
| 17A01 | EXPANSION INTRFC | TN570B | @EPN 21 - SOUTHFIELD |
| 17A02 | DS1 CONVERTER | TN1654 | @EPN 21 - SOUTHFIELD |
| 17A03 | DIGITAL LINE | TN2224 | @EPN 21 - SOUTHFIELD |
| 17A04 | DIGITAL LINE | TN2224 | @EPN 21 - SOUTHFIELD |
| 17A05 | DIGITAL LINE | TN2224 | @EPN 21 - SOUTHFIELD |
| 17A06 | DIGITAL LINE | TN2224 | @EPN 21 - SOUTHFIELD |
| 17A07 | DIGITAL LINE | TN2224 | @EPN 21 - SOUTHFIELD |
| 18A | MAINTENANCE | TN775B | @EPN 22 - SOUTHFIELD |
| 18A | TONE CLOCK | TN2182 | @EPN 22 - SOUTHFIELD |
| 18A01 | EXPANSION INTRFC | TN570B | @EPN 22 - SOUTHFIELD |
| 18A02 | DS1 CONVERTER | TN1654 | @EPN 22 - SOUTHFIELD |
| 18A03 | DIGITAL LINE | TN2224 | @EPN 22 - SOUTHFIELD |
| 18A04 | DIGITAL LINE | TN2224 | @EPN 22 - SOUTHFIELD |
| 18A05 | DIGITAL LINE | TN2224 | @EPN 22 - SOUTHFIELD |
| 18A06 | DIGITAL LINE | TN2224 | @EPN 22 - SOUTHFIELD |
| 19A | MAINTENANCE | TN775B | |
| 19A | TONE/CLOCK | TN2182B | |
| 19A01 | EXPANSION INTRFC | TN570B | |
| 19A04 | DS1 INTERFACE | TN767E | TGN 34 - OUT SOUTHFIELD |
| 19A05 | DS1 INTERFACE | TN767E | TGN 34 - OUT SOUTHFIELD |
| 19A06 | DS1 INTERFACE | TN767E | TGN 33 - OUT SOUTHFIELD |
| 19A16 | DS1 INTERFACE | TN464F | TGN 118 - IMT DETROIT 2 |
| 19A17 | DS1 INTERFACE | TN767E | TGN 9 - IMT DETROIT 2 |
| 19A18 | DS1 INTERFACE | TN767E | TGN 2 - IMT CHICAGO 3 |
| 19A19 | DS1 INTERFACE | TN767E | TGN 118 - IMT DETROIT 2 |
| 19E | TONE/CLOCK | TN2182 | |
| 19E01 | EXPANSION INTRFC | TN570B | |
| 19E02 | TONE/CLOCK | TN2182 | |
| 19E03 | DS1 INTERFACE | TN767E | TGN 32 - OUT DETROIT |
| 19E04 | DS1 INTERFACE | TN767E | TGN 32 - OUT DETROIT |
| 19E16 | DS1 INTERFACE | TN464F | TGN 118 - IMT DETROIT 2 |
| 19E17 | DS1 INTERFACE | TN464F | TGN 9 - IMT DETROIT 2 |
| 19E18 | DS1 INTERFACE | TN464F | TGN 8 - IMT DETROIT 2 |
| 19E19 | DS1 INTERFACE | TN464F | TGN 118 - IMT DETROIT 2 |
| 19E20 | DS1 INTERFACE | TN767E | TGN 118 - IMT DETROIT 2 |
| 20A | MAINTENANCE | TN775B | @EPN 25 - KALAMAZOO |
| 20A | TONE/CLOCK | TN2182 | @EPN 25 - KALAMAZOO |
| 20A01 | EXPANSION INTRFC | TN570B | @EPN 25 - KALAMAZOO |
| 20A02 | DS1 CONVERTER | TN1654 | @EPN 25 - KALAMAZOO |
| 20A03 | DIGITAL LINE | TN2224 | @EPN 25 - KALAMAZOO |
| 20A04 | DIGITAL LINE | TN2224 | @EPN 25 - KALAMAZOO |
| 20A05 | DIGITAL LINE | TN2224 | @EPN 25 - KALAMAZOO |
| 20A06 | DIGITAL LINE | TN2224 | @EPN 25 - KALAMAZOO |
| 21A | MAINTENANCE | TN775B | @EPN 26 - KALAMAZOO |
| 21A | TONE/CLOCK | TN2182 | @EPN 26 - KALAMAZOO |
| 21A01 | EXPANSION INTRFC | TN570B | @EPN 26 - KALAMAZOO |
| 21A02 | DS1 CONVERTER | TN1654 | @EPN 26 - KALAMAZOO |
| 21A03 | DIGITAL LINE | TN2224 | @EPN 26 - KALAMAZOO |
| 21A04 | DIGITAL LINE | TN2224 | @EPN 26 - KALAMAZOO |
| 21A05 | DIGITAL LINE | TN2224 | @EPN 26 - KALAMAZOO |

APPENDIX 2-continued

| | | mic1.eqp | |
|---|---|---|---|
| 21A06 | DIGITAL LINE | TN2224 | @EPN 26 - KALAMAZOO |
| 22A | MAINTENANCE | TN775B | @EPN 27 - KALAMAZOO |
| 22A | TONE/CLOCK | TN2182 | @EPN 27 - KALAMAZOO |
| 22A01 | EXPANSION INTRFC | TN570B | @EPN 27 - KALAMAZOO |
| 22A02 | DS1 CONVERTER | TN1654 | @EPN 27 - KALAMAZOO |
| 22A03 | DIGITAL LINE | TN2224 | @EPN 27 - KALAMAZOO |
| 22A04 | DIGITAL LINE | TN2224 | @EPN 27 - KALAMAZOO |
| 22A05 | DIGITAL LINE | TN2224 | @EPN 27 - KALAMAZOO |
| 22A06 | DIGITAL LINE | TN2224 | @EPN 27 - KALAMAZOO |
| 23A | MAINTENANCE | TN775B | @EPN 28 - SAGINAW |
| 23A | TONE/CLOCK | TN2182 | @EPN 28 - SAGINAW |
| 23A01 | EXPANSION INTRFC | TN570B | @EPN 28 - SAGINAW |
| 23A02 | DS1 CONVERTER | TN1654 | @EPN 28 - SAGINAW |
| 23A03 | DIGITAL LINE | TN2224 | @EPN 28 - SAGINAW |
| 23A04 | DIGITAL LINE | TN2224 | @EPN 28 - SAGINAW |
| 23A05 | DIGITAL LINE | TN2224 | @EPN 28 - SAGINAW |
| 23A06 | DIGITAL LINE | TN2224 | @EPN 28 - SAGINAW |
| 24A | MAINTENANCE | TN775B | @EPN 29 - SAGINAW |
| 24A | TONE/CLOCK | TN2182 | @EPN 29 - SAGINAW |
| 24A01 | EXPANSION INTRFC | TN570B | @EPN 29 - SAGINAW |
| 24A02 | DS1 CONVERTER | TN1654 | @EPN 29 - SAGINAW |
| 24A03 | DIGITAL LINE | TN2224 | @EPN 29 - SAGINAW |
| 24A04 | DIGITAL LINE | TN2224 | @EPN 29 - SAGINAW |
| 24A05 | DIGITAL LINE | TN2224 | @EPN 29 - SAGINAW |
| 24A06 | DIGITAL LINE | TN2224 | @EPN 29 - SAGINAW |
| 25A | MAINTENANCE | TN775B | @EPN 30 - SAGINAW |
| 25A | TONE/CLOCK | TN2182 | @EPN 30 - SAGINAW |
| 25A01 | EXPANSION INTRFC | TN570B | @EPN 30 - SAGINAW |
| 25A02 | DS1 CONVERTER | TN1654 | @EPN 30 - SAGINAW |
| 25A03 | DIGITAL LINE | TN2224 | @EPN 30 - SAGINAW |
| 25A04 | DIGITAL LINE | TN2224 | @EPN 30 - SAGINAW |
| 25A05 | DIGITAL LINE | TN2224 | @EPN 30 - SAGINAW |
| 25A06 | DIGITAL LINE | TN2224 | @EPN 30 - SAGINAW |
| 26A | MAINTENANCE | TN775B | @EPN 31 - SAGINAW |
| 26A | TONE/CLOCK | TN2182 | @EPN 31 - SAGINAW |
| 26A01 | EXPANSION INTRFC | TN570B | @EPN 31 - SAGINAW |
| 26A02 | DS1 CONVERTER | TN1654 | @EPN 31 - SAGINAW |
| 26A03 | DIGITAL LINE | TN2224 | @EPN 31 - SAGINAW |
| 26A04 | DIGITAL LINE | TN2224 | @EPN 31 - SAGINAW |
| 26A05 | DIGITAL LINE | TN2224 | @EPN 31 - SAGINAW |
| 27A | MAINTENANCE | TN775C | |
| 27A | TONE/CLOCK | TN2182 | |
| 27A01 | EXPANSION INTRFC | TN570C | |
| 27A04 | MAINTENANCE/TEST | TN771D | |
| 27A05 | DS1 INTERFACE | TN464F | TGN 3 - IMT CHICAGO 1 |
| 27A06 | DS1 INTERFACE | TN464F | TGN 3 - IMT CHICAGO 1 |
| 27A07 | DS1 INTERFACE | TN464F | TGN 3 - IMT CHICAGO 1 |
| 27A08 | DS1 INTERFACE | TN464F | TGN 5 - IMT CHICAGO 2 |
| 27A09 | DS1 INTERFACE | TN464F | TGN 5 - IMT CHICAGO 2 |
| 27A11 | DS1 INTERFACE | TN767E | TGN 3 - IMT CHICAGO 1 |
| 27A12 | DS1 INTERFACE | TN767E | TGN 3 - IMT CHICAGO 1 |
| 27A13 | DS1 INTERFACE | TN767E | TGN 5 - IMT CHICAGO 2 |
| 27A14 | DS1 INTERFACE | TN767E | TGN 5 - IMT CHICAGO 2 |
| 27A15 | DS1 INTERFACE | TN767E | TGN 5 - IMT CHICAGO 2 |
| 28A | MAINTENANCE | TN775C | |
| 28A | TONE/CLOCK | TN2182 | |
| 28A01 | EXPANSION INTRFC | TN570B | |
| 28A12 | DS1 INTERFACE | TN767E | TGN 9 - IMT DETROIT 2 |
| 28A13 | DS1 INTERFACE | TN767E | TGN 9 - IMT DETROIT 2 |
| 28A14 | DS1 INTERFACE | TN767E | TGN 8 - IMT DETROIT 2 |
| 28A15 | DS1 INTERFACE | TN767E | TGN 8 - IMT DETROIT 2 |
| 28A16 | DS1 INTERFACE | TN767E | TGN 2 - IMT CHICAGO 3 |
| 28A17 | DS1 INTERFACE | TN464F | TGN 9 - IMT DETROIT 2 |
| 28A18 | DS1 INTERFACE | TN464F | TGN 8 - IMT DETROIT 2 |
| 28A19 | DS1 INTERFACE | TN464F | TGN 2 - IMT CHICAGO 3 |
| 29A | MAINTENANCE | TN775C | |
| 29A | TONE/CLOCK | TN2182 | |
| 29A01 | EXPANSION INTRFC | TN570B | |
| 29A12 | DS1 INTERFACE | TN767E | TGN 9 - IMT DETROIT 2 |
| 29A13 | DS1 INTERFACE | TN767E | TGN 9 - IMT DETROIT 2 |
| 29A14 | DS1 INTERFACE | TN767E | TGN 8 - IMT DETROIT 2 |
| 29A15 | DS1 INTERFACE | TN767E | TGN 8 - IMT DETROIT 2 |
| 29A16 | DS1 INTERFACE | TN767E | TGN 2 - IMT CHICAGO 3 |
| 29A17 | DS1 INTERFACE | TN464F | TGN 9 - IMT DETROIT 2 |
| 29A18 | DS1 INTERFACE | TN464F | TGN 8 - IMT DETROIT 2 |
| 29A19 | DS1 INTERFACE | TN464F | TGN 2 - IMT CHICAGO 3 |

APPENDIX 3

| mic1.trk |
|---|

```
ACD:MIC1 ACD1
TG:2:IMT CHICAGO 3
028A19:DHZZ 773873:144.151.178.91:???
029A19:DHZZ 773874:144.151.178.92:???
028A16:DHZZ 773875:144.151.178.187:???
029A16:DHZZ 773876:144.151.178.188:???
019A18:DHZZ 773877:144.151.178.27:???
TG:3:IMT CHICAGO 1
001C16:DHDZ 696029:144.151.178.86:144.156.152.86
001C17:DHDZ 696030:144.151.178.87:144.156.152.87
001C18:DHDZ 696031:144.151.178.88:144.156.152.88
001D12:DHDZ 696032:144.151.178.89:144.156.152.89
027A05:DHZZ 697047:144.151.179.17:144.156.152.177
027A06:DHZZ 697048:144.151.179.18:144.156.152.178
027A07:DHZZ 697049:144.151.179.19:144.156.152.179
027A11:DHZZ 697050:144.151.179.20:144.156.152.180
027A12:DHZZ 697051:144.151.179.21:144.156.152.181
TG:5:IMT CHICAGO 2
001D17:DHDZ 744328:144.151.178.180:144.156.179.81
001D18:DHDZ 744329:144.151.178.181:144.156.179.82
002B14:DHDZ 744330:144.151.178.182:144.156.179.83
004A16:DHDZ 744331:144.151.178.183:144.156.179.84
004E08:DHDZ 744332:144.151.178.184:144.156.179.85
027A13:DHZZ 697052:144.151.179.22:144.156.179.177
027A14:DHZZ 697053:144.151.179.23:144.156.179.178
027A15:DHZZ 697054:144.151.179.24:144.156.179.179
027A08:DHZZ 697055:144.151.179.25:144.156.179.180
027A09:DHZZ 697056:144.151.179.26:144.156.179.181
TG:6:IMT CLEVELAND
002B18:DHZZ 521055:144.151.178.81:144.151.178.81
002B19:DHZZ 521056:144.151.178.82:144.151.178.82
005A14:DHZZ 521057:144.151.178.83:144.151.178.83
005A15:DHZZ 521058:144.151.178.84:144.151.178.84
005E10:DHZZ 521060:144.151.178.85:144.151.178.85
006A11:DHZZ 534240:144.156.178.179:144.152.44.211
006A14:DHZZ 534241:144.156.178.178:144.152.44.210
007A10:DHZZ 534242:144.156.178.177:144.152.44.209
007A13:DHZZ 534243:144.156.178.185:144.152.44.225
007E09:DHZZ 534245:144.156.178.186:144.152.44.226
TG:8:IMT DETROIT 2
028A18:Direct Cable:N/A:N/A
029A18:Direct Cable:N/A:N/A
028A15:Direct Cable:N/A:N/A
028A14:Direct Cable:N/A:N/A
029A15:Direct Cable:N/A:N/A
029A14:Direct Cable:N/A:N/A
019E18:Direct Cable:N/A:N/A
TG:9:IMT DETROIT 2
028A17:Direct Cable:N/A:N/A
029A17:Direct Cable:N/A:N/A
028A13:Direct Cable:N/A:N/A
028A12:Direct Cable:N/A:N/A
029A13:Direct Cable:N/A:N/A
029A12:Direct Cable:N/A:N/A
019A17:Direct Cable:N/A:N/A
019E17:Direct Cable:N/A:N/A
TG:11:TROY TGN 623
003A19:HCGS 324230:N/A:N/A:TROY TGN 623
004A18:HCGS 324330:N/A:N/A
002B13:HCGS 324331:N/A:N/A
004A11:HCGS 324332:N/A:N/A
001D09:HCGS 324333:N/A:N/A
TG:12:HUDSON TGN 722
006A16:HCGS 324334:N/A:N/A:HUDSON TGN 722
007A16:HCGS 324335:N/A:N/A
004E09:HCGS 324336:N/A:N/A
005E14:HCGS 324337:N/A:N/A
006A15:HCGS 324338:N/A:N/A
TG:13:TROY TGN 626
005E15:HCGS 324339:N/A:N/A:TROY TGN 626
006E15:HCGS 324340:N/A:N/A
005E11:HCGS 324341:N/A:N/A
006E11:HCGS 324342:N/A:N/A
007E10:HCGS 324343:N/A:N/A
TG:14:HUDSON TGN 635
005E16:HCGS 342344:N/A:N/A:HUDSON TGN 635
006E16:HCGS 324345:N/A:N/A
```

APPENDIX 3-continued mic1.trk

```
005E12:HCGS 324346:N/A:N/A
006E10:HCGS 324347:N/A:N/A
007A12:HCGS 324348:N/A:N/A
TG:15:TROY TGN 627
003A17:HCGS 324349:N/A:N/A:TROY TGN 627
004A17:HCGS 324350:N/A:N/A
004A12:HCGS 324351:N/A:N/A
005A12:HCGS 324352:N/A:N/A
006A12:HCGS 324353:N/A:N/A
TG:16:HUDSON TGN 642
004A19:HCGS 324354:N/A:N/A:HUDSON TGN 642
005A16:HCGS 324355:N/A:N/A
005A11:HCGS 324356:N/A:N/A
006A13:HCGS 324357:N/A:N/A
007A15:HCGS 324358:N/A:N/A
TG:17:TROY TGN 629
004E17:HCGS 324483:N/A:N/A:TROY TGN 629
005E17:HCGS 324484:N/A:N/A
006A17:HCGS 324485:N/A:N/A
007A17:HCGS 324486:N/A:N/A
007E17:HCGS 324487:N/A:N/A
TG:18:TROY TGN 624
004E18:HCGS 324488:N/A:N/A:TROY TGN 624
005E18:HCGS 324489:N/A:N/A
006E18:HCGS 324490:N/A:N/A
007A18:HCGS 324491:N/A:N/A
007E18:HCGS 324492:N/A:N/A
TG:19:TROY TGN 634
004E19:HCGS 324493:N/A:N/A:TROY TGN 634
005E19:HCGS 324494:N/A:N/A
004E13:HCGS 324495:N/A:N/A
005E13:HCGS 324496:N/A:N/A
006E14:HCGS 324497:N/A:N/A
TG:20:HUDSON TGN 716
004E20:HCGS 324498:N/A:N/A:HUDSON TGN 716
005E20:HCGS 324499:N/A:N/A
006E20:HCGS 324500:N/A:N/A
004A15:HCGS 324501:N/A:N/A
005A13:HCGS 324502:N/A:N/A
TG:21:HUDSON TGN 724
005A18:HCGS 324504:N/A:N/A:HUDSON TGN 724
006A18:HCGS 324505:N/A:N/A
004E10:HCGS 324506:N/A:N/A
004E14:HCGS 324507:N/A:N/A
007E11:HCGS 324508:N/A:N/A
TG:22:HUDSON TGN 643
005A19:HCGS 324509:N/A:N/A:HUDSON TGN 643
006A19:HCGS 324510:N/A:N/A
004E11:HCGS 324511:N/A:N/A
004E15:HCGS 324512:N/A:N/A
007E14:HCGS 324513:N/A:N/A
TG:30:DID
005E08:CAC CFG2SG9:N/A:N/A:DTRTMIBL6CD-DTRTMIBHDC1__AM101
005E09:CAC CFG2SH2:N/A:N/A:DTRTMIBL6CD-DTRTMIBHDC1__AM102
006E08:CAC CFG2SH3:N/A:N/A:DTRTMIBL6CD-DTRTMIBHDC1__AM103
007E08:CAC CFG2SH4:N/A:N/A:DTRTMIBL6CD-DTRTMIBHDC1__AM104
TG:32:OUT DETROIT
007A11:CAC CFG2KP8:N/A:N/A:DTRTMIBL6CD-DTRTMIBLDC2__AM101
001D13:CAC CFG2KP9:N/A:N/A:DTRTMIBL6CD-DTRTMIBLDC2__AM102
002B15:CAC CFG2KQ2:N/A:N/A:DTRTMIBL6CD-DTRTMIBLDC2__AM103
002B16:CAC CFG2KQ3:N/A:N/A:DTRTMIBL6CD-DTRTMIBLDC2__AM104
002B17:CAC CFG2KQ4:N/A:N/A:DTRTMIBL6CD-DTRTMIBLDC2__AM105
004A13:CAC CFG2KQ5:N/A:N/A:DTRTMIBL6CD-DTRTMIBLDC2__AM106
004A14:CAC CFG2KQ6:N/A:N/A:DTRTMIBL6CD-DTRTMIBLDC2__AM107
019E03:CAC CFK2SF7:N/A:N/A:DTRTMIBL6CD-DTRTMIBLDC2__AM8054
019E04:CAC CFK2SF8:N/A:N/A:DTRTMIBL6CD-DTRTMIBLDC2__AM8055
TG:33:OUT SOUTHFIELD
005A17:CAC CFG2KQ7:N/A:N/A:DTRTMIBL6CD-SFLDMIOKDC0__AM101
007A19:CAC CFG2KQ8:N/A:N/A:DTRTMIBL6CD-SFLDMIOKDC0__AM102
006E17:CAC CFG2KQ9:N/A:N/A:DTRTMIBL6CD-SFLDMIOKDC0__AM103
019A06:CAC CFH2MK8:N/A:N/A:DTRTMIBL6CD-SFLDMIOKDC0__AM107
TG:34:OUT SOUTHFIELD
006E19:CAC CFG2KR2:N/A:N/A:DTRTMIBL6CD-SFLDMIOKDC0__AM104
007E16:CAC CFG2KR3:N/A:N/A:DTRTMIBL6CD-SFLDMIOKDC0__AM105
004E16:CAC CFG2KP7:N/A:N/A:DTRTMIBL6CD-SFLDMIOKDC0__AM106
019A04:CAC CFK2RQ2:N/A:N/A:DTRTMIBL6CD-SFLDMIOKDC0__8001
019A05:CAC CFK2RQ3:N/A:N/A:DTRTMIBL6CD-SFLDMIOKDC0__8002
```

APPENDIX 3-continued mic1.trk

```
TG:118:IMT DETROIT 2
019A16:Direct Cable:N/A:N/A
019E19:Direct Cable:N/A:N/A
003A18:Direct Cable:N/A:N/A
019A19:Direct Cable:N/A:N/A
019E16:Direct Cable:N/A:N/A
019E20:Direct Cable:N/A:N/A
TG:599:IVR PORTS
001D16:DHDZ 696350:144.151.178.161:144.155.251.87:DTCS0611-1A x58096
002A12:DHDZ 696351:144.151.178.162:144.155.251.88:DTCS0611-1B x58120
002A13:DHDZ 696352:144.151.178.163:144.155.251.89:DTCS0611-2A x58144
003A12:DHDZ 696353:144.151.178.164:144.155.251.90:DTCS0611-2B x58168
003A13:DHDZ 696354:144.151.178.165:144.155.251.91:DTCS0612-1A x58192
003A14:DHDZ 696355:144.151.178.166:144.155.251.92:DTCS0612-1B x58216
003A15:DHDZ 696356:144.151.178.167:144.155.251.97:DTCS0612-2A x58240
003A16:DHDZ 696357:144.151.178.168:144.155.251.98:DTCS0612-2B x58264
001C14:DHDZ 696358:144.151.178.69:144.155.251.99:DTCS0815-1A x58288
001C15:DHDZ 696359:144.151.178.70:144.155.251.100:DTCS0815-1B x58312
001D08:DHDZ 696360:144.151.178.71:144.155.251.101:DTCS0815-2A x58336
001D15:DHDZ 696361:144.151.178.72:144.155.251.102:DTCS0815-2B x58360
007E13:DHDZ 696462:144.151.178.73:144.155.251.28:DTCS0203-1A x58384
CQC:CONTACT QUALITY
001C19:DHDZ 743873:144.151.178.97:N/A:SOUTHFIELD
001D20:DHDZ 743874:144.151.178.98:N/A:SAGINAW
001C20:DHDZ 743875:144.151.178.99:N/A:KALAMAZOO
EPN:BETHUNE (IT)
001C12:DHDZ 791565:144.151.178.37:N/A:EPN 14 008A02A
001C12:DHDZ 791566:144.151.178.38:N/A:008A02B
001C12:DHDZ 791567:144.151.178.39:N/A:008A02C
001C12:DHDZ 791568:144.151.178.40:N/A:008A02D
EPN:KALAMAZOO
001C11:DHDZ 708222:144.151.178.57:N/A:EPN 25 020A02A
001C11:DHDZ 708223:144.151.178.58:N/A:020A02B
001C11:DHDZ 708224:144.151.178.59:N/A:020A02C
001C11:DHDZ 708225:144.151.178.60:N/A:020A02D
001E01:DHDZ 708226:144.151.178.149:N/A:EPN 26 021A02A
001E01:DHDZ 708227:144.151.178.150:N/A:021A02B
001E01:DHDZ 708228:144.151.178.151:N/A:021A02C
001E01:DHDZ 708229:144.151.178.152:N/A:021A02D
002B11:DHDZ 708230:144.151.178.153:N/A:EPN 27 022A02A
002B11:DHDZ 708231:144.151.178.154:N/A:022A02B
002B11:DHDZ 708232:144.151.178.155:N/A:022A02C
002B11:DHDZ 708233:144.151.178.156:N/A:022A02D
EPN:SAGINAW
002E01:DHDZ 708234:144.151.178.25:N/A:EPN 28 023A02A
002E01:DHDZ 708235:144.151.178.26:N/A:023A02B
002E01:DHDZ 708236:144.151.178.27:N/A:023A02C
002E01:DHDZ 708237:144.151.178.28:N/A:023A02D
002E21:DHDZ 708238:144.151.178.41:N/A:EPN 29 024A02A
002E21:DHDZ 708239:144.151.178.42:N/A:024A02B
002E21:DHDZ 708240:144.151.178.43:N/A:024A02C
002E21:DHDZ 708241:144.151.178.44:N/A:024A02D
003E01:DHDZ 708242:144.151.178.121:N/A:EPN 30 025A02A
003E01:DHDZ 708243:144.151.178.122:N/A:025A02B
003E01:DHDZ 708244:144.151.178.123:N/A:025A02C
003E01:DHDZ 708245:144.151.178.124:N/A:025A02D
003E21:DHDZ 708246:144.151.178.137:N/A:EPN 31 026A02A
003E21:DHDZ 708247:144.151.178.138:N/A:026A02B
003E21:DHDZ 708248:144.151.178.139:N/A:026A02C
003E21:DHDZ 708249:144.151.178.140:N/A:026A02D
EPN:SOUTHFIELD
001D10:DHDZ 708302:144.151.178.17:N/A:EPN 17 013A02A
001D10:DHDZ 708303:144.151.178.18:N/A:013A02B
001D10:DHDZ 708304:144.151.178.19:N/A:013A02C
001D10:DHDZ 708305:144.151.178.20:N/A:013A02D
001D11:DHDZ 708306:144.151.178.33:N/A:EPN 18 014A02A
001D11:DHDZ 708307:144.151.178.34:N/A:014A02B
001D11:DHDZ 708308:144.151.178.35:N/A:014A02C
001D11:DHDZ 708309:144.151.178.36:N/A:014A02D
002A11:DHDZ 708310:144.151.178.49:N/A:EPN 19 015A02A
002A11:DHDZ 708311:144.151.178.50:N/A:015A02B
002A11:DHDZ 708312:144.151.178.51:N/A:015A02C
002A11:DHDZ 708313:144.151.178.52:N/A:015A02D
002B10:DHDZ 708314:144.151.178.113:N/A:EPN 20 016A02A
002B10:DHDZ 708315:144.151.178.114:N/A:016A02B
002B10:DHDZ 708316:144.151.178.115:N/A:016A02C
002B10:DHDZ 708317:144.151.178.116:N/A:016A02D
```

APPENDIX 3-continued mic1.trk

```
003A10:DHDZ 708318:144.151.178.129:N/A:EPN 21 017A02A
003A10:DHDZ 708319:144.151.178.130:N/A:017A02B
003A10:DHDZ 708320:144.151.178.131:N/A:017A02C
003A10:DHDZ 708321:144.151.178.132:N/A:017A02D
003A11:DHDZ 708322:144.151.178.145:N/A:EPN 22 018A02A
003A11:DHDZ 708323:144.151.178.146:N/A:018A02B
003A11:DHDZ 708324:144.151.178.147:N/A:018A02C
003A11:DHDZ 708325:144.151.178.148:N/A:018A02D
```

APPENDIX 4 mic1.gat

| | |
|---|---|
| 1 | TEMPORARY SKILL |
| 99 | System Ports |
| 100 | BETHUNE IT |
| 200 | STHFLD UNIV 200 |
| 201 | MI UNVL SR |
| 202 | MI IT ONLINE |
| 203 | MI TIMED ACW 203 |
| 204 | MI CSST |
| 231 | HOTC INBOUND |
| 232 | HOTC OUTBOUND/OFFLINE |
| 233 | HOTC ACE HELP DESK |
| 234 | HOTC-CORP HOUSING/GMAC |
| 235 | HOTC-INTRA/UNBUNDLING DESK |
| 236 | RSC OFFLINE/LTNP-RESALE |
| 237 | RSC WINBACK IT |
| 250 | Kalamazoo Asst Coach |
| 251 | Lansing Asst Coach |
| 252 | Saginaw Asst Coach |
| 253 | Southfield Asst Coach |
| 256 | MI ASST COACH |
| 257 | MI WI ASST COACH 257 |
| 258 | MI OH ASST COACH 258 |
| 260 | Kalamazoo ACE |
| 261 | GREENWODD/MI ACE |
| 262 | Saginaw ACE |
| 263 | Southfield ACE |
| 264 | TC FUNCTION 264 |
| 270 | MI OH MULTI STATE |
| 276 | IN UNIV |
| 278 | WI MULTI |
| 297 | Manager |
| 298 | HOTC EMERGENCY |
| 299 | MI Emergency |
| 583 | TEST SKILL |
| 584 | ASCOT TEST SKILL |
| 585 | CALL FLOW TEST SKILL |
| 586 | TELCOM OPS TEST SKILL #1 |
| 587 | TELCOM OPS TEST SKILL #2 |
| 588 | NETWORK VRU PORTS AUTO BILL |
| 589 | IVR TEST SKILL-ACI IP |
| 594 | NETWORK VRU PORTS |
| 595 | MI IT |
| 596 | IVR TROUBLESHOOTING SKILL |
| 597 | IVR TEST SKILL |
| 598 | MI IVR PORTS AUTO BILLING |
| 599 | MI IVR PORTS |

APPENDIX 5 mic1.pn

```
01 01 27 08 55 16 09/07/1999 HOST CABINET 1
02 02 25 15 61 33 07/06/1999 HOST CABINET 2
03 03 14 08 49 28 08/24/1999 HOST CABINET 3
04 04 21 12 68 37 09/07/1999 HOST CABINET 4
05 04 19 15 03 48 08/23/1999 HOST CABINET 4
06 05 05 03 48 24 09/07/1999 HOST CABINET 5
07 05 23 14 81 41 07/19/1999 HOST CABINET 5
08 06 09 06 51 39 08/23/1999 HOST CABINET 6
09 06 17 11 62 31 08/23/1999 HOST CABINET 6
10 07 08 05 52 27 09/07/1999 HOST CABINET 7
11 07 11 07 42 21 07/19/1999 HOST CABINET 7
23 19 00 00 08 11 09/21/1999 HOST CABINET 19
24 19 07 04 35 20 08/30/1999 HOST CABINET 19
32 27 06 04 35 22 10/11/1999 HOST CABINET 27
12 28 19 11 48 25 08/30/1999 HOST CABINET 28
13 29 22 13 46 42 10/20/1999 HOST CABINET 29
14 08 00 00 04 12 10/13/1999 BETHUNE
25 20 09 24 20 52 05/29/1999 KALAMAZOO
26 21 09 24 18 48 06/14/1999 KALAMAZOO
27 22 10 27 18 49 06/01/1999 KALAMAZOO
28 23 09 25 28 75 06/01/1999 SAGINAW
29 24 08 21 26 68 06/28/1999 SAGINAW
30 25 10 26 21 57 06/28/1999 SAGINAW
31 26 01 02 17 46 07/19/1999 SAGINAW
17 13 05 14 16 42 06/01/1999 SOUTHFIELD
18 14 04 11 14 38 06/07/1999 SOUTHFIELD
19 15 06 17 13 36 06/01/1999 SOUTHFIELD
20 16 09 24 17 45 05/24/1999 SOUTHFIELD
21 17 10 27 18 49 09/07/1999 SOUTHFIELD
22 18 05 14 16 45 08/30/1999 SOUTHFIELD
```

APPENDIX 6

LOOP1.WAS

```
;Script to dial, connect, query, and process Lucent ACD data
;
;all rights reserved
proc main
    integer ACD_SWITCH = 3      ;set active switch here where 1= ill1
```

APPENDIX 6-continued

| LOOP1.WAS |
|---|

```
                            ;2= ill2
                            ;3= mic1
                            ;4= ohio
    integer AGENT
    string FNAME1 = "ill1.onl"
    string FNAME2 = "ill2.onl"
    string FNAME3 = "mic1.onl"
    string FNAME4 = "ohio.onl"
    string CAPFILE = "loop.cap"
    string CXRSTAT = "cxr_stat"
    string HAYES
    string WHO
    string WHOPASS
    string AGENT1
    string AGENT2
    string AGENT3
    string PGATE_PORT
DIAL_AGAIN:
    if ACD_SWITCH == 1
        fopen 0 FNAME1 READ TEXT
    endif
    if ACD_SWITCH == 2
        fopen 0 FNAME2 READ TEXT
    endif
    if ACD_SWITCH == 3
        fopen 0 FNAME3 READ TEXT
    endif
    if ACD_SWITCH == 4
        fopen 0 FNAME4 READ TEXT
    endif
    ;
    ;start ACD specific login and retrieval here
    ;
    fgets 0 HAYES
    fgets 0 WHO
    fgets 0 WHOPASS
    fgets 0 AGENT1
    fgets 0 AGENT2
    fgets 0 AGENT3
    fgets 0 PGATE_PORT
    fclose 0
    ;first, see if we're already/still connected
    pause 3
    transmit "^[OP"
    waitfor "Command: " 4
        if SUCCESS           ;skip login scheme and start collecting data
            ;fclose 1
            set capture file CAPFILE
            goto HERE_LOOP
        endif
    transmit "AT&D2^M"       ;else send atdt string
    pause 5
    rxflush
    transmit "ATDT"
    transmit HAYES
    rxflush   ;clear any accumulated garbage
    transmit "^M"
    waitfor "CONNECT" 10
        if FAILURE
            goto DIAL_AGAIN ;possibly BUSY or ERROR
        endif
    waitfor "Login: " 10
        if FAILURE
            goto DIAL_AGAIN ;possible PGATE trouble
        endif
    transmit WHO
    transmit "^M"
    waitfor "Password: "
    transmit WHOPASS
    transmit "^M"
    waitfor "Terminal Type (513, 715, 4410, 4425, VT220): [513] "
    transmit "4410^M"
    waitfor "Command: "
    set capture file CAPFILE
HERE_LOOP:
    while $CARRIER          ;sets up start of continuous loop if CARRIER is ON
    fopen 1 CAPFILE create
```

APPENDIX 6-continued

LOOP1.WAS

```
    fopen 2 CXRSTAT create text
    capture ON
    ;report on CARRIER DETECT STATUS
    if $CARRIER
        fputs 2 " "
        fputs 2 "CARRIER OK"
        fputs 2 " "
    else
        fputs 2 " "
        fputs 2 "CARRIER FAIL"
        fputs 2 " "
    endif
    fclose 2
    pause 2
    transmit "^[OP"           ;get back to command prompt
    pause 2
    if $CARRIER == 0
        goto CXR_ALARM
    endif
    ;
    ;-------------------------------------------------------------------------------
    transmit "monitor traffic trunk-group^M"
                              ;
                              ;display and retrieve trunk group status here
    pause 4                   ;
    snapshot capture          ;
    transmit "^[OP"           ;get back to command prompt
    pause 2
    if $CARRIER == 0
        goto CXR_ALARM
    endif
    ;
    ;-------------------------------------------------------------------------------
    transmit "display alarms^M"
    pause 2
    transmit "y^I"            ;choose active
    pause 1
    transmit "n^I"            ;skip resolved
    pause 1
    transmit "y^I"            ;choose major
    pause 1
    transmit "y^I"            ;choose minor
    pause 1
    transmit "n^I"            ;skip warning
    pause 1
    transmit "a^[OR"          ;choose 'all' status (or 'd' for day)
MORE_ALARMS:
    if $CARRIER == 0
        goto CXR_ALARM
    endif
    waitfor "Command: " 7     ;wait 7 seconds
    if FAILURE
        snapshot capture
        transmit "^[OV" ;enter 'F7' (next page)
        goto MORE_ALARMS
    endif
    pause 2
    snapshot capture
    transmit "^[OP"           ;exit command mode back to prompt to retrieve alarms
                              ;
                              ;alarm retrieval finished here
                              ;
    pause 2
    if $CARRIER == 0
        goto CXR_ALARM
    endif
    ;
    ;-------------------------------------------------------------------------------
    transmit "status health^M"
    pause 5
    snapshot capture
    transmit "^[OP"           ;exit command mode back to prompt
                              ;
    pause 2
    if $CARRIER == 0
        goto CXR_ALARM
    endif
```

APPENDIX 6-continued

LOOP1.WAS

```
;
;------------------------------------------------------------------------------------------------
transmit "list measurements trunk-group summary last-hour^M" ;get MB counts
MORE_MB:
    if $CARRIER == 0
        goto CXR_ALARM
    endif
    waitfor "Command: " 7          ;wait 7 seconds
    if FAILURE
        snapshot capture
        transmit "^[OV" ;enter 'F7' (next page)
        goto MORE_MB
    endif
    pause 2
    snapshot capture
    transmit "^[OP"                ;exit command mode back to prompt to retrieve alarms
                                   ;
                                   ;alarm retrieval finished here
                                   ;
    pause 2
    if $CARRIER == 0
        goto CXR_ALARM
    endif
;
;------------------------------------------------------------------------------------------------
transmit "monitor traffic hunt-groups "
transmit AGENT1                ;
transmit "^M"                  ;
                               ;
pause 6                        ;
snapshot capture               ;
                               ;
transmit "^[OP"                ;get back to command prompt
pause 2                        ;
if $CARRIER == 0
    goto CXR_ALARM
endif
;
;------------------------------------------------------------------------------------------------
transmit "monitor traffic hunt-groups "
transmit AGENT2                ;
transmit "^M"                  ;
                               ;retrieve ivr port status here
                               ;
pause 6                        ;
snapshot capture               ;
                               ;
transmit "^[OP"
pause 2
if $CARRIER == 0
    goto CXR_ALARM
endif
;
;------------------------------------------------------------------------------------------------
atoi AGENT3 AGENT      ;test for three hunt-group (agent) screens
if AGENT != 0
    transmit "monitor traffic hunt-groups "
    transmit AGENT3        ;
    transmit "^M"          ;
                           ;retrieve ivr port status here
                           ;
    pause 6                ;
    snapshot capture           ;
                           ;
    transmit "^[OP"
    pause 2
    if $CARRIER == 0
        goto CXR_ALARM
    endif
;
endif
;------------------------------------------------------------------------------------------------
;transmit "status pgate-port "
;transmit PGATE_PORT    ;
                           ;retrieve pgate port status here
;------------------------------------------------------------------------------------------------
transmit "status logins"
```

APPENDIX 6-continued

LOOP1.WAS

```
transmit "^M"               ;
                            ;retrieve logged in users here
                            ;
pause 4                     ;
snapshot capture            ;
                            ;
transmit "^[OP"
pause 2
if $CARRIER == 0
    goto CXR_ALARM
endif
;
;----------------------------------------------------------------------
transmit "list measurements load-balance total last-hour^M"
MORE_LOAD_INFO:
    if $CARRIER == 0
        goto CXR_ALARM
    endif
    waitfor "Command: " 6       ;pause 6 seconds
    if FAILURE
        snapshot capture
        transmit "^[OV" ;enter 'F7' (next page)
        goto MORE_LOAD_INFO
    endif
                            ;
pause 2                     ;retrieve network load balance page 1
snapshot capture            ;
                            ;
;
;----------------------------------------------------------------------
capture OFF
fclose 1
transmit "^[OP"             ;get back to command prompt
pause 1
OFFLINE:
if ACD_SWITCH == 1
    dos "follow1" HIDDEN
    if isfile "ill1.maj"
        dos "ill1alm.bat" HIDDEN
    endif
    if findfirst "ill1*.ken"
        dos "ill1ken.bat" HIDDEN
    endif
    pause 5
endif
if ACD_SWITCH == 2
    dos "follow2" HIDDEN
    if isfile "ill2.maj"
        dos "ill2alm.bat" HIDDEN
    endif
    if findfirst "ill2*.ken"
        dos "ill2ken.bat" HIDDEN
    endif
    pause 5
endif
if ACD_SWITCH == 3
```

APPENDIX 7 mic1alm

```
ftp -s:alarms3 144.156
cat mic1.maj >> mic1maj.log
del mic1.maj
```

APPENDIX 8

DUTYPAGE.WAS

```
;Script to loop waiting for MAJOR alarm message to be sent to pager
;all rights reserved
```

APPENDIX 8-continued

DUTYPAGE.WAS

```
string MSGFILE = "display.msg"
string
string MESSAGE
proc main
    while 1
        pause 30
        if isfile "ill1.maj"
            dos "copy ill1.maj display.msg"
            pause 3
            dos "del ill1.maj"
            pause 3
            call send_page
```

APPENDIX 8-continued

DUTYPAGE.WAS

```
            dos "type display.msg >> major.log" HIDDEN
            pause 3
            dos "del display.msg" HIDDEN
         endif
         if isfile "ill2.maj"
            dos "copy ill2.maj display.msg"
            pause 3
            dos "del ill2.maj"
            pause 3
            call send_page
            dos "type display.msg >> major.log" HIDDEN
            pause 3
            dos "del display.msg" HIDDEN
         endif
         if isfile "ill3.maj"
            dos "copy ill3.maj display.msg"
            pause 3
            dos "del ill3.maj"
            pause 3
            call send_page
            dos "type display.msg >> major.log" HIDDEN
            pause 3
            dos "del display.msg" HIDDEN
         endif
         if isfile "mic1.maj"
            dos "copy mic1.maj display.msg"
            pause 3
            dos "del mic1.maj"
            pause 3
            call send_page
            dos "type display.msg >> major.log" HIDDEN
            pause 3
            dos "del display.msg" HIDDEN
         endif
         if isfile "mic2.maj"
            dos "copy mic2.maj display.msg"
            pause 3
            dos "del mic2.maj"
            pause 3
            call send_page
            dos "type display.msg >> major.log" HIDDEN
            pause 3
            dos "del display.msg" HIDDEN
         endif
         if isfile "ohio.maj"
            dos "copy ohio.maj display.msg"
            pause 3
            dos "del ohio.maj"
            pause 3
            call send_page
            dos "type display.msg >> major.log" HIDDEN
            pause 3
            dos "del display.msg" HIDDEN
         endif
      yield
   andwhile
endproc
func send_page : integer
      fopen 2 MSGFILE READ TEXT   ;Read alarm message from
                                  'display.msg' into
                                  MESSAGE string
      fgets 2 MESSAGE
      dial DATA "DISPLAYPAGE"
      pause 5
      transmit "^M"
      waitfor "ID="
      transmit "M^M"           ; send 'M' for Manual
      waitfor "Pager ID, then RETURN."
      transmit PIN
      transmit "^M"
      waitfor "Message, then RETURN."
      transmit MESSAGE
      transmit "^M"
      waitfor "Thank You"
      transmit "^[^D^M"        ; <ESC> <EOT> <CR>
      pause 1
      hangup
```

APPENDIX 8-continued

DUTYPAGE.WAS

```
      pause 5
      clear
      return 1
endfunc
```

APPENDIX 9

Mic1.htm

```
<HTML>
<META HTTP-EQUIV="Refresh" CONTENT=60>
<HEAD><TITLE>MIC1 ACD</TITLE></HEAD>
<BODY BGCOLOR = "#F0F0F0">
<H1><FONT COLOR="#880000">
<CENTER>- Lucent ACD Status -</CENTER>
</FONT></H1>
<CENTER><H3><FONT COLOR="#880000">(as of Thu Mar 09
14:50:03 2000
  CDT) </FONT></H3></CENTER>
<HR>
<CENTER><TABLE>
<TR>
<TD><CENTER><H2><FONT FACE=ARIAL
COLOR="#880000">MIC1</FONT></H2></CENTER></TD>
</TR>
<TR>
<TD VALIGN=TOP>
<TABLE BORDER=1>
<TR>
<TH></TH>
<TH WIDTH = 94><CENTER><FONT FACE=ARIAL SIZE=1>TRUNK
GROUP</CENTER></TH>
<TH><FONT FACE=ARIAL SIZE=1>TRKS</TH>
<TH><FONT FACE=ARIAL SIZE=1>OOS</TH>
<TH><FONT FACE=ARIAL SIZE=1>%OCC</TH>
<TH><FONT FACE=ARIAL
SIZE=1> . . . 20 . . . 40 . . . 60 . . . 80 . . . 10
0</TH>
</TR>
<TR>
<TD></TD>
<TD><FONT FACE=ARIAL SIZE=1><A
HREF="mic1011.htm">TROY</TD>
<TD ALIGN=RIGHT><FONT FACE=ARIAL SIZE=1>708</TD>
<TD ALIGN=RIGHT><FONT FACE=ARIAL SIZE=1>0</TD>
<TD ALIGN=RIGHT><FONT FACE=ARIAL SIZE=1>34%</TD>
<TD><IMG SRC="greenbar.gif" HEIGHT=11 WIDTH=59></TD>
<TR>
<TD></TD>
<TD><FONT FACE=ARIAL SIZE=1><A
HREF="mic1012.htm">HUDSON</TD>
<TD ALIGN=RIGHT><FONT FACE=ARIAL SIZE=1>708</TD>
<TD ALIGN=RIGHT><FONT FACE=ARIAL SIZE=1>0</TD>
<TD ALIGN=RIGHT><FONT FACE=ARIAL SIZE=1>2%</TD>
<TD><IMG SRC="greenbar.gif" HEIGHT=11 WIDTH=3></TD>
<TR>
<TD></TD>
<TD><FONT FACE=ARIAL SIZE=1><A HREF="mic1030.htm">DID
</TD>
<TD ALIGN=RIGHT><FONT FACE=ARIAL SIZE=1>96</TD>
<TD ALIGN=RIGHT><FONT FACE=ARIAL SIZE=1>0</TD>
<TD ALIGN=RIGHT><FONT FACE=ARIAL SIZE=1>0%</TD>
<TD><IMG SRC="greenbar.gif" HEIGHT=11 WIDTH=1></TD>
<TR>
<TD></TD>
<TD><FONT FACE=ARIAL SIZE=1><A HREF="mic1003.htm">IMT
CHICAGO 1</TD>
<TD ALIGN=RIGHT><FONT FACE=ARIAL SIZE=1>214</TD>
<TD ALIGN=RIGHT><FONT FACE=ARIAL SIZE=1>0</TD>
<TD ALIGN=RIGHT><FONT FACE=ARIAL SIZE=1>1%</TD>
<TD><IMG SRC="greenbar.gif" HEIGHT=11 WIDTH=1></TD>
<TR>
<TD></TD>
<TD><FONT FACE=ARIAL SIZE=1><A HREF="mic1005.htm">IMT
```

APPENDIX 9-continued

Mic1.htm

```
CHICAGO 2</TD>
<TD ALIGN=RIGHT><FONT FACE=ARIAL SIZE=1>238</TD>
<TD ALIGN=RIGHT><FONT FACE=ARIAL SIZE=1>0</TD>
<TD ALIGN=RIGHT><FONT FACE=ARIAL SIZE=1>0%</TD>
<TD><IMG SRC="greenbar.gif" HEIGHT=11 WIDTH=1></TD>
<TR>
<TD></TD>
<TD><FONT FACE=ARIAL SIZE=1><A HREF="mic1002.htm">IMT
CHICAGO 3</TD>
<TD ALIGN=RIGHT><FONT FACE=ARIAL SIZE=1>118</TD>
<TD ALIGN=RIGHT><FONT FACE=ARIAL SIZE=1>0</TD>
<TD ALIGN=RIGHT><FONT FACE=ARIAL SIZE=1>1%</TD>
<TD><IMG SRC="greenbar.gif" HEIGHT=11 WIDTH=1></TD>
<TR>
<TD></TD>
<TD><FONT FACE=ARIAL SIZE=1><A HREF="mic1006.htm">IMT
CLEVELAND</TD>
<TD ALIGN=RIGHT><FONT FACE=ARIAL SIZE=1>238</TD>
<TD ALIGN=RIGHT><FONT FACE=ARIAL SIZE=1>0</TD>
<TD ALIGN=RIGHT><FONT FACE=ARIAL SIZE=1>0%</TD>
<TD><IMG SRC="greenbar.gif" HEIGHT=11 WIDTH=1></TD>
<TR>
<TD></TD>
<TD><FONT FACE=ARIAL SIZE=1><A HREF="mic1008.htm">IMT
DETROIT 2</TD>
<TD ALIGN=RIGHT><FONT FACE=ARIAL SIZE=1>498</TD>
<TD ALIGN=RIGHT><FONT FACE=ARIAL SIZE=1>0</TD>
<TD ALIGN=RIGHT><FONT FACE=ARIAL SIZE=1>20%</TD>
<TD><IMG SRC="greenbar.gif" HEIGHT=11 WIDTH=35></TD>
<TR>
<TD></TD>
<TD><FONT FACE=ARIAL SIZE=1><A HREF="mic1032.htm">OUT
DETROIT</TD>
<TD ALIGN=RIGHT><FONT FACE=ARIAL SIZE=1>216</TD>
<TD ALIGN=RIGHT><FONT FACE=ARIAL SIZE=1>0</TD>
<TD ALIGN=RIGHT><FONT FACE=ARIAL SIZE=1>25%</TD>
<TD><IMG SRC="greenbar.gif" HEIGHT=11 WIDTH=43></TD>
<TR>
<TD></TD>
<TD><FONT FACE=ARIAL SIZE=1><A HREF="mic1033.htm">OUT
SOUTHFIELD</TD>
<TD ALIGN=RIGHT><FONT FACE=ARIAL SIZE=1>216</TD>
<TD ALIGN=RIGHT><FONT FACE=ARIAL SIZE=1>0</TD>
<TD ALIGN=RIGHT><FONT FACE=ARIAL SIZE=1>0%</TD>
<TD><IMG SRC="greenbar.gif" HEIGHT=11 WIDTH=1></TD>
<TR>
<TD></TD>
<TD><FONT FACE=ARIAL SIZE=1><A HREF="mic1599.htm">MICH
IVR</TD>
<TD ALIGN=RIGHT><FONT FACE=ARIAL SIZE=1>288</TD>
<TD ALIGN=RIGHT><FONT FACE=ARIAL SIZE=1>0</TD>
<TD ALIGN=RIGHT><FONT FACE=ARIAL SIZE=1>5%</TD>
<TD><IMG SRC="greenbar.gif" HEIGHT=11 WIDTH=8></TD>
<TR>
<TD></TD>
<TD><FONT FACE=ARIAL SIZE=1><A
HREF="mic1cqc.htm">CQC</TD>
</TD>
<TR>
<TD></TD>
<TD><FONT FACE=ARIAL SIZE=1><A
HREF="mic1epn.htm">EPN's</TD>
</TD>
</CENTER>
</TABLE>
</CENTER></TD>
</TR>
</TABLE>
<CENTER>
<TABLE BORDER=1>
<TR><TH WIDTH=380><FONT FACE=arial SIZE=1>ALARM
STATUS</TH></TR>
<TR><TD><FONT FACE=arial SIZE=1>
<A HREF="mic1alm.htm">There are 0 alarms:</A>
<BR></TABLE>
</CENTER>
<CENTER>
<TABLE BORDER=1>
<TR><TH WIDTH=380><FONT FACE=arial SIZE=1>CURRENT
SYSTEM STATUS</TH></TR>
<TR><TD><FONT FACE=arial SIZE=1>
<A HREF=mic1agnt.htm>There are 190 agents</A> active, 0
calls in queue at 15:50.
<BR>No TDM blockage. Highest past hour (14:00) occupancy
was 24% in PN 2.
<BR>No PN blockage. Highest past hour (14:00) occupancy
was 32% in PN 29.
<BR>Occupancy St: 4% Sm: 11% Cp: 8% Idl: 77%
<BR>SPE: B/auto A/functional
<BR>Busied Out Trk: 0 Stn: 0 Oth: 0
<BR></TABLE>
</CENTER>
</BODY></HTML>
```

APPENDIX 10 mic1011.htm

```
<HTML>
<HEAD>
<TITLE> 11:ACI TROY</TITLE>
</HEAD>
<BODY BGCOLOR = "#F0F0F0">
<CENTER><H2><FONT COLOR = "#880000"> 11:ACI
TROY</FONT></H2></CENTER><CENTER>
<TABLE BORDER = 1>
<TH WIDTH = 36><FONT FACE="arial" SIZE=2
COLOR="gray">TGN</TH>
<TH WIDTH = 66><FONT FACE="arial" SIZE=2
COLOR="gray">OE</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE="arial" SIZE=2 COLOR="gray">MISC</TH>
<TR>
<TD ALIGN = CENTER><FONT FACE="arial" SIZE=2>011</TD>
<TD ALIGN = CENTER>
<!-SM HERE->
<FONT FACE="arial" SIZE=2>003 A 19
</TD>
<TD><A HREF=tirks/324230.htm><FONT FACE="arial"
SIZE=2>HCGS 324230</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD><FONT FACE="arial" SIZE=2>TROY TGN 623</TD>
</TR>
<TR>
<TD></TD>
<TD ALIGN = CENTER>
<!-SM HERE->
<FONT FACE="arial" SIZE=2>004 A 18
</TD>
<TD><A HREF=tirks/324330.htm><FONT FACE="arial"
SIZE=2>HCGS 324330</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
```

APPENDIX 10-continued mic1011.htm

```
<TD ALIGN = CENTER>
<!-SM HERE->
<FONT FACE="arial" SIZE=2>002 B 13
</TD>
<TD><A HREF=tirks/324331.htm><FONT FACE="arial"
SIZE=2>HCGS 324331</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>004 A 11
</TD>
<TD><A HREF=tirks/324332.htm><FONT FACE="arial"
SIZE=2>HCGS 324332</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>001 D 09
</TD>
<TD><A HREF=tirks/324333.htm><FONT FACE="arial"
SIZE=2>HCGS 324333</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
</TABLE>
<CENTER><H2><FONT COLOR = "#880000"> 13:ACI
TROY</FONT></H2></CENTER><CENTER>
<TABLE BORDER = 1>
<TH WIDTH = 36><FONT FACE="arial" SIZE=2
COLOR="gray">TGN</TH>
<TH WIDTH = 66><FONT FACE="arial" SIZE=2
COLOR="gray">OE</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE="arial" SIZE=2 COLOR="gray">MISC</TH>
<TR>
<TD ALIGN = CENTER><FONT FACE="arial" SIZE=2>013</TD>
<TD ALIGN = CENTER>
<!-SM HERE->
<FONT FACE="arial" SIZE=2>005 E 15
</TD>
<TD><A HREF=tirks/324339.htm><FONT FACE="arial"
SIZE=2>HCGS 324339</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD><FONT FACE="arial" SIZE=2>TROY TGN 626</TD>
</TR>
<TR>
<TD></TD>
```

APPENDIX 10-continued mic1011.htm

```
<TD ALIGN = CENTER>
<!-SM HERE->
<FONT FACE="arial" SIZE=2>006 E 15
</TD>
<TD><A HREF=tirks/324340.htm><FONT FACE="arial"
SIZE=2>HCGS 324340</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>005 E 11
</TD>
<TD><A HREF=tirks/324341.htm><FONT FACE="arial"
SIZE=2>HCGS 324341</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>006 E 11
</TD>
<TD><A HREF=tirks/324342.htm><FONT FACE="arial"
SIZE=2>HCGS 324342</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>007 E 10
</TD>
<TD><A HREF=tirks/324343.htm><FONT FACE="arial"
SIZE=2>HCGS 324343</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
</TABLE>
<CENTER><H2><FONT COLOR = "#880000"> 15:ACI
TROY</FONT></H2></CENTER><CENTER>
<TABLE BORDER = 1>
<TH WIDTH = 36><FONT FACE="arial" SIZE=2
COLOR="gray">TGN</TH>
<TH WIDTH = 66><FONT FACE="arial" SIZE=2
COLOR="gray">OE</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE="arial" SIZE=2 COLOR="gray">MISC</TH>
<TR>
<TD ALIGN = CENTER><FONT FACE="arial" SIZE=2>015</TD>
```

APPENDIX 10-continued mic1011.htm

```
<TD ALIGN = CENTER>
<!-SM HERE->
<FONT FACE="arial" SIZE=2>003 A 17
</TD>
<TD><A HREF=tirks/324349.htm><FONT FACE="arial"
SIZE=2>HCGS 324349</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD><FONT FACE="arial" SIZE=2>TROY TGN 627</TD>
</TR>
<TR>
<TD></TD>
<TD ALIGN = CENTER>
<!-SM HERE->
<FONT FACE="arial" SIZE=2>004 A 17
</TD>
<TD><A HREF=tirks/324350.htm><FONT FACE="arial"
SIZE=2>HCGS 324350</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>004 A 12
</TD>
<TD><A HREF=tirks/324351.htm><FONT FACE="arial"
SIZE=2>HCGS 324351</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>005 A 12
</TD>
<TD><A HREF=tirks/324352.htm><FONT FACE="arial"
SIZE=2>HCGS 324352</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>006 A 12
</TD>
<TD><A HREF=tirks/324353.htm><FONT FACE="arial"
SIZE=2>HCGS 324353</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
</TABLE>
<CENTER><H2><FONT COLOR = "#880000"> 17:ACI
TROY</FONT></H2></CENTER><CENTER>
<TABLE BORDER = 1>
<TH WIDTH = 36><FONT FACE="arial" SIZE=2
COLOR="gray">TGN</TH>
<TH WIDTH = 66><FONT FACE="arial" SIZE=2
COLOR="gray">OE</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE="arial" SIZE=2 COLOR="gray">MISC</TH>
<TR>
<TD ALIGN = CENTER><FONT FACE="arial" SIZE=2>017</TD>
<TD ALIGN = CENTER>
<!-SM HERE->
<FONT FACE="arial" SIZE=2>004 E 17
</TD>
<TD><A HREF=tirks/324483.htm><FONT FACE="arial"
SIZE=2>HCGS 324483</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD><FONT FACE="arial" SIZE=2>TROY TGN 629</TD>
</TR>
<TR>
<TD></TD>
<TD ALIGN = CENTER>
<!-SM HERE->
<FONT FACE="arial" SIZE=2>005 E 17
</TD>
<TD><A HREF=tirks/324484.htm><FONT FACE="arial"
SIZE=2>HCGS 324484</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>006 A 17
</TD>
<TD><A HREF=tirks/324485.htm><FONT FACE="arial"
SIZE=2>HCGS 324485</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>007 A 17
</TD>
<TD><A HREF=tirks/324486.htm><FONT FACE="arial"
SIZE=2>HCGS 324486</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
```

APPENDIX 10-continued mic1011.htm

```
<FONT FACE="arial" SIZE=2>007 E 17
</TD>
<TD><A HREF=tirks/324487.htm><FONT FACE="arial"
SIZE=2>HCGS 324487</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
</TABLE>
<CENTER><H2><FONT COLOR = "#880000"> 18:ACI
TROY</FONT></H2></CENTER><CENTER>
<TABLE BORDER = 1>
<TH WIDTH = 36><FONT FACE="arial" SIZE=2
COLOR="gray">TGN</TH>
<TH WIDTH = 66><FONT FACE="arial" SIZE=2
COLOR="gray">OE</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE="arial" SIZE=2 COLOR="gray">MISC</TH>
<TR>
<TD ALIGN = CENTER><FONT FACE="arial" SIZE=2>018</TD>
<TD ALIGN = CENTER>
<!-SM HERE->
<FONT FACE="arial" SIZE=2>004 E 18
</TD>
<TD><A HREF=tirks/324488.htm><FONT FACE="arial"
SIZE=2>HCGS 324488</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD><FONT FACE="arial" SIZE=2>TROY TGN 624</TD>
</TR>
<TR>
<TD></TD>
<TD ALIGN = CENTER>
<!-SM HERE->
<FONT FACE="arial" SIZE=2>005 E 18
</TD>
<TD><A HREF=tirks/324489.htm><FONT FACE="arial"
SIZE=2>HCGS 324489</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>006 E 18
</TD>
<TD><A HREF=tirks/324490.htm><FONT FACE="arial"
SIZE=2>HCGS 324490</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>007 A 18
</TD>
<TD><A HREF=tirks/324491.htm><FONT FACE="arial"
SIZE=2>HCGS 324491</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>007 E 18
</TD>
<TD><A HREF=tirks/324492.htm><FONT FACE="arial"
SIZE=2>HCGS 324492</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
</TABLE>
<CENTER><H2><FONT COLOR = "#880000"> 19:ACI
TROY</FONT></H2></CENTER><CENTER>
<TABLE BORDER = 1>
<TH WIDTH = 36><FONT FACE="arial" SIZE=2
COLOR="gray">TGN</TH>
<TH WIDTH = 66><FONT FACE="arial" SIZE=2
COLOR="gray">OE</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE="arial" SIZE=2 COLOR="gray">MISC</TH>
<TR>
<TD ALIGN = CENTER><FONT FACE="arial" SIZE=2>019</TD>
<TD ALIGN = CENTER>
<!-SM HERE->
<FONT FACE="arial" SIZE=2>004 E 19
</TD>
<TD><A HREF=tirks/324493.htm><FONT FACE="arial"
SIZE=2>HCGS 324493</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD><FONT FACE="arial" SIZE=2>TROY TGN 634</TD>
</TR>
<TR>
<TD></TD>
<TD ALIGN = CENTER>
<!-SM HERE->
<FONT FACE="arial" SIZE=2>005 E 19
</TD>
<TD><A HREF=tirks/324494.htm><FONT FACE="arial"
SIZE=2>HCGS 324494</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
```

APPENDIX 10-continued mic1011.htm

```
<FONT FACE="arial" SIZE=2>004 E 13
</TD>
<TD><A HREF=tirks/324495.htm><FONT FACE="arial"
SIZE=2>HCGS 324495</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>005 E 13
</TD>
<TD><A HREF=tirks/324496.htm><FONT FACE="arial"
SIZE=2>HCGS 324496</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
<TR>
<TD></TD>
<TD ALIGN = CENTER>
<!-SM HERE->
<FONT FACE="arial" SIZE=2>006 E 14
</TD>
<TD><A HREF=tirks/324497.htm><FONT FACE="arial"
SIZE=2>HCGS 324497</TD>
<TD ALIGN = CENTER>
<FONT FACE="arial" SIZE=2>None
</TD>
<TD><FONT FACE="arial" SIZE=2><CENTER>n/a</TD>
<TD><FONT FACE="arial" SIZE=2><CENTER>n/a</TD>
<TD></TD>
</TR>
</TABLE>
</BODY>
</HTML>
```

APPENDIX 11

324230.htm

```
<HTML><BODY BGCOLOR="#F0F0F0">
<CENTER>
<H3><FONT COLOR=#880000>
Call, choose option 2 for trouble
referrals.
</H3></FONT></CENTER><HR>
<CENTER>
<PRE>
     CIRCUIT DETAILS
CKT S         /HCGS/324230         /MB                        A
TROYMIUOW00 Z DTRTMIBL6CD
CLO MIS123927001              DV          ACT IE IND   PRQ SSP TSP
     MSC N MCO DTRTMIBHSHC
CAC SVF2BP3 CUST AMERITECHCOMMUNICATI PULS -- MW B EML
OBJ            PG 01 OF 04
M SEQ    A     LOCATION        SV   EQPT/FAC    RR/TYPE    UNIT     A
TLP Z          SBDV/MISC            TP
    002  E
                                N
    004  I                           MODEL = 8589 DESI GN = 2
                                N
    006  X     TROYMIUOW00            LINE C ODE=B8ZS
                                N
    008  X     TROYMIUOW00            **SIGNAL CODE=ESF* *
                                N
    010  I     PROCESSED BY FLOWTHRU ID:HICAP-A VERS: 002
STAMP :041295 130406 N
    012        TROYMIUOW00            04DS6/       44 /
                                NI
    014                                HCG-
                                NC
    016        STA ADDR          N
    018                                TROY
               EU CITY           N
    020                                MI
               EU STATE          N
    022  W     TROYMIUOW00            DEMARC
                                S
    024        TROYMIUOW00            POI
                                XA
    026  W                       X4   806         T3          2
```

APPENDIX 11-continued

| | | | | 324230.htm | | | | |
|---|---|---|---|---|---|---|---|---|
| | | IC | X# | | | | | |
| 028 | | | | | | | | |
| | | OWNER=B-BX | XX | | | | | |
| 030 | | | | | | | | |
| | | E=DTRTMIBLK07 | XX | | | | | |
| 032 | | | | | MB 0094.5 | | | |
| | | MI  0094.5 ZL | D# | | | | | |
| 034 | | DTRTMIBLK07 | | EE31F | | | | |
| | F07/07 | /0397 XZ | | | | | | |
| 036 | | DTRTMIBLK06 | | T3MAE412 | 040473.11 | 1916 | | |
| | F66/13 | /08 /4 XM | | | | | | |
| CKT S | | /HCGS/324230 | | /MB | | | A | |
| TROYMIUOW00 Z DTRTMIBL6CD | | | | | | | | |
| CLO MIS123927001 | | | | DV | ACT IE IND | PRQ SSP TSP | | |
| MSC N MCO DTRTMIBHSHC | | | | | | | | |
| CAC SVF2BP3 CUST AMERITECHCOMMUNICATI PULS -- MW B EML | | | | | | | | |
| OBJ | | PG 02 OF 04 | | | | | | |
| M SEQ | A | LOCATION | SV | EQPT/FAC | RR/TYPE | UNIT | A | |
| TLP Z | | SBDV/MISC | TP | | | | | |
| 038 | | DTRTMIBLK07 | | T1MBDX01 040483.02B ACSA | | | | |
| | | | XH | | | | | |
| 040 | | DTRTMIBLK07 | | T1MBDY01 040482.02C CSSA2 | | | | |
| | | | XH | | | | | |
| 042 | | DTRTMIBLK07 | | T1MBDZ01 040482.02B ESSA2 | | | | |
| | | | XH | | | | | |
| 044 | | DTRTMIBLK07 | | T1MBD901 040480.12A 1 | | | | |
| | | | XH | | | | | |
| 046 | | DTRTMIBLK07 | | T1MBD9U1 040480.12A 1-17 | | | | |
| | | | XH | | | | | |
| 048 | | DTRTMIBLK07 | | | DCS5NNNSC | | | |
| | | | XF | | | | | |
| 050 | | DTRTMIBLK07 | | T1MBD9Y1 040482.02B 0397 | | | | |
| | F66/12 | /07 /4 | XM | | | | | |
| 052 | | DTRTMIBLK07 | | | | | | |
| | F07/07 | /0397 | EX | | | | | |
| 054 | E | DTRTMIBLK07 | | /K07 | /FE/DAB/ 01/ | | | |
| | | | N1 | | | | | |
| 056 | E | DTRTMIBLK07 | | 035-16 | | | | |
| / | | | N2 | | | | | |
| 058 | E | DTRTMIBLK07 | | T1 / | | | | |
| | | | N3 | | | | | |
| 060 | | DTRTMIBLK07 | | T1MBDX01 040483.02B ACSA | | | | |
| | | | EH | | | | | |
| 062 | | DTRTMIBLK07 | | T1MBDY01 040482.01C CSSA1 | | | | |
| | | | EH | | | | | |
| 064 | | DTRTMIBLK07 | | T1MBDZ01 040482.01B ESSA1 | | | | |
| | | | EH | | | | | |
| 066 | | DTRTMIBLK07 | | T1MBD801 040481.03A 1 | | | | |
| | | | EH | | | | | |
| 068 | | DTRTMIBLK07 | | T1MBD831 040481.03A 1-27 | | | | |
| | | | EH | | | | | |
| 070 | | DTRTMIBLK07 | | | DCS5NNNF7 | | | |
| | | | F# | | | | | |
| 072 | W | DTRTMIBLK07 | | T1MBD8S1 040482.01B 035-16 | | | | |
| | F93/03 /02 /44 EU | | | | | | | |
| CKT S | | /HCGS/324230 | | /MB | | | A | |
| TROYMIUOW00 Z DTRTMIBL6CD | | | | | | | | |
| CLO MIS123927001 | | | | DV | ACT IE IND | PRQ SSP TSP | | |
| MSC N MCO DTRTMIBHSHC | | | | | | | | |
| CAC SVF2BP3 CUST AMERITECHCOMMUNICATI PULS -- MW B EML | | | | | | | | |
| OBJ | | PG 03 OF 04 | | | | | | |
| M SEQ A | | LOCATION | SV | EQPT/FAC | RR/TYPE | UNIT | A | |
| TLP Z | | SBDV/MISC | TP | | | | | |
| 074 | | DTRTMIBLK07 | | | | | | |
| | F07/07 | /035 | EX | | | | | |
| 076 | | DTRTMIBLK07 | | SD=TSLS- 5500 | | | | |
| | | | EX | | | | | |
| 078 | | DTRTMIBLK07 | | $FEPMTYP E=ANSI403; FEPM= | | | | |
| | | | EX | | | | | |
| 080 | | DTRTMIBLK07 | | ON;DS1 F ORMAT MUST =ESF; | | | | |
| | | | EX | | | | | |
| 082 | | DTRTMIBLK07 | | NEPM=OFF | | | | |
| | | | EX | | | | | |
| 084 | | DTRTMIBL | | | NCT2YGEEE | | | |
| | | | F# | | | | | |
| 086 | W | DTRTMIBL | | T1ML1971 11CAB1 | | 0114 | | |
| | F93/07 /06 /14 | | EM | | | | | |

APPENDIX 11-continued

324230.htm

| 088 | W | DTRTMIBL | P | T1IUJ222 IP03191235 |
| 090 | | DTRTMIBL | PX | $PM SM ARTJACK S1=NA |
| 092 | | DTRTMIBL | PX | ,S2-1=DI SABLE,S2-2 =DISA |
| 094 | | DTRTMIBL | PX | BLE,S2-3 =DISABLE,S 2-4=E |
| 096 | | DTRTMIBL | PX | NABLE,S2 -5=ESF,S3= 7.5D. |
| 098 | | DTRTMIBL | PX | B,S4=SHO RT,S5=DISA BLE,S |
| 100 | | DTRTMIBL | PX | 6=ON,S7= ENABLE |
| 102 | W | DTRTMIBL6CD | S | DEMARC |
| 104 | | STA ADDR | N | |
| 106 | | EU FLR | N | 11 |
| 108 | | EU ROOM | N | 1129 |

```
CKT S          /HCGS/324230        /MB                              A
TROYMIUOW00 Z DTRTMIBL6CD
CLO MIS123927001                   DV         ACT IE IND  PRQ SSP TSP
    MSC N MCO DTRTMIBHSHC
CAC SVF2BP3 CUST AMERITECHCOMMUNICATI PULS -- MW B EML
OBJ            PG 04 OF 04
M SEQ    A     LOCATION      SV   EQPT/FAC    RR/TYPE    UNIT       A
TLP Z          SBDV/MISC          TP
  110                             DETROIT
         EU CITY              N
  112                             MI
         EU STATE             N
  114          DTRTMIBL6CD         04DU9/     1SN/
                              NI
  116          DTRTMIBL6CD         DTRTMIBL 6CD COMSUM ER
                              NX
</PRE>
</CENTER>
</BODY>
</HTML>
```

APPENDIX 12

Mic1epn.htm

```
<HTML>
<HEAD>
<TITLE> EPN:BETHUNE (IT)</TITLE>
</HEAD>
<BODY BGCOLOR = "#F0F0F0">
<CENTER><H2><FONT COLOR = "#880000"> EPN:BETHUNE
(IT)</FONT></H2></CENTER><CENTER>
<TABLE BORDER = 1>
<TH WIDTH = 36><FONT FACE="arial" SIZE=2
COLOR="gray">EPN</TH>
<TH WIDTH = 66><FONT FACE=arial SIZE=2 COLOR=gray>HOST
PORT</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE=arial SIZE=2 COLOR=gray>REMOTE PORT</TH>
<TR>
<TD BGCOLOR=blue
 ALIGN = CENTER><A HREF=mic1E14.htm><FONT COLOR=white
FACE=arial SIZE=2>14</TD>
<TD ALIGN = CENTER><FONT FACE=arial SIZE=2>001 C 12
```

APPENDIX 12-continued

Mic1epn.htm

```
A</TD><TD><FONT FACE=arial SIZE=2><A
HREF=tirks/791565.htm>DHDZ 791565</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.37</A></TD>
<TD ALIGN = CENTER><FONT FACE=arial SIZE=2>n/a</TD>
<TD><FONT FACE=arial SIZE=2>008 A 02 A</TR>
<TR>
<TD></TD>
<TD ALIGN = CENTER><FONT FACE=arial SIZE=2>001 C 12
B</TD><TD><FONT FACE=arial SIZE=2><A
HREF=tirks/791566.htm>DHDZ 791566</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.38</A></TD>
<TD ALIGN = CENTER><FONT FACE=arial SIZE=2>n/a</TD>
<TD><FONT FACE=arial SIZE=2>008 A 02 B</TR>
<TR>
<TD></TD>
<TD ALIGN = CENTER><FONT FACE=arial SIZE=2>001 C 12
C</TD><TD><FONT FACE=arial SIZE=2><A
HREF=tirks/791567.htm>DHDZ 791567</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.39</A></TD>
<TD ALIGN = CENTER><FONT FACE=arial SIZE=2>n/a</TD>
```

APPENDIX 12-continued

Mic1epn.htm

```
<TD><FONT FACE=arial SIZE=2>008 A 02 C</TR>
<TR>
<TD></TD>
<TD ALIGN = CENTER><FONT FACE=arial SIZE=2>001 C 12
D</TD><TD><FONT FACE=arial SIZE=2><A
HREF=tirks/791568.htm>DHDZ 791568</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.40</A></TD>
<TD ALIGN = CENTER><FONT FACE=arial SIZE=2>n/a</TD>
<TD><FONT FACE=arial SIZE=2>008 A 02 D</TR>
</TABLE>
<CENTER><H2><FONT COLOR = "#880000">EPN:KALAMAZOO
</FONT></H2></CENTER><CENTER>
<TABLE BORDER = 1>
<TH WIDTH = 36><FONT FACE="arial" SIZE=2
COLOR="gray">EPN</TH>
<TH WIDTH = 66><FONT FACE=arial SIZE=2 COLOR=gray>HOST
PORT</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE=arial SIZE=2 COLOR=gray>REMOTE PORT</TH>
<TR>
<TD BGCOLOR=blue
  ALIGN = CENTER><A HREF=mic1E25.htm><FONT COLOR=white
FACE=arial SIZE=2>25</TD>
<TD ALIGN = CENTER><FONT FACE=arial SIZE=2>001 C 11
A</TD><TD><FONT FACE=arial SIZE=2><A
HREF=tirks/708222.htm>DHDZ 708222</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.57</A></TD>
<TD ALIGN = CENTER><FONT FACE=arial SIZE=2>n/a</TD>
<TD><FONT FACE=arial SIZE=2>020 A 02 A</TR>
<TR>
<TD></TD>
<TD ALIGN = CENTER><FONT FACE=arial SIZE=2>001 C 11
B</TD><TD><FONT FACE=arial SIZE=2><A
HREF=tirks/708223.htm>DHDZ 708223</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.58</A></TD>
<TD ALIGN = CENTER><FONT FACE=arial SIZE=2>n/a</TD>
<TD><FONT FACE=arial SIZE=2>020 A 02 B</TR>
<TR>
<TD></TD>
<TD ALIGN = CENTER><FONT FACE=arial SIZE=2>001 C 11
C</TD><TD><FONT FACE=arial SIZE=2><A
HREF=tirks/708224.htm>DHDZ 708224</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.59</A></TD>
<TD ALIGN = CENTER><FONT FACE=arial SIZE=2>n/a</TD>
<TD><FONT FACE=arial SIZE=2>020 A 02 C</TR>
<TR>
<TD></TD>
<TD ALIGN = CENTER><FONT FACE=arial SIZE=2>001 C 11
D</TD><TD><FONT FACE=arial SIZE=2><A
HREF=tirks/708225.htm>DHDZ 708225</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.60</A></TD>
<TD ALIGN = CENTER><FONT FACE=arial SIZE=2>n/a</TD>
<TD><FONT FACE=arial SIZE=2>020 A 02 D</TR>
<TR>
<TD BGCOLOR=orange
  ALIGN = CENTER><A HREF=mic1E26.htm><FONT COLOR=white
FACE=arial SIZE=2>26</TD>
<TD ALIGN = CENTER><FONT FACE=arial SIZE=2>001 E 01
A</TD><TD><FONT FACE=arial SIZE=2><A
HREF=tirks/708226.htm>DHDZ 708226</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.149</A></TD>
<TD ALIGN = CENTER><FONT FACE=arial SIZE=2>n/a</TD>
<TD><FONT FACE=arial SIZE=2>021 A 02 A</TR>
<TR>
<TD></TD>
<TD ALIGN = CENTER><FONT FACE=arial SIZE=2>001 E 01
B</TD><TD><FONT FACE=arial SIZE=2><A
HREF=tirks/708227.htm>DHDZ 708227</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.150</A></TD>
<TD ALIGN = CENTER><FONT FACE=arial SIZE=2>n/a</TD>
<TD><FONT FACE=arial SIZE=2>021 A 02 B</TR>
<TR>
<TD></TD>
<TD ALIGN = CENTER><FONT FACE=arial SIZE=2>001 E 01
C</TD><TD><FONT FACE=arial SIZE=2><A
HREF=tirks/708228.htm>DHDZ 708228</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.151</A></TD>
<TD ALIGN = CENTER><FONT FACE=arial SIZE=2>n/a</TD>
<TD><FONT FACE=arial SIZE=2>021 A 02 C</TR>
<TR>
<TD></TD>
<TD ALIGN = CENTER><FONT FACE=arial SIZE=2>001 E 01
D</TD><TD><FONT FACE=arial SIZE=2><A
HREF=tirks/708229.htm>DHDZ 708229</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.152</A></TD>
<TD ALIGN = CENTER><FONT FACE=arial SIZE=2>n/a</TD>
<TD><FONT FACE=arial SIZE=2>021 A 02 D</TR>
<TR>
<TD BGCOLOR=green
  ALIGN = CENTER><A HREF=mic1E27.htm><FONT COLOR=white
FACE=arial SIZE=2>27</TD>
<TD ALIGN = CENTER><FONT FACE=arial SIZE=2>002 B 11
A</TD><TD><FONT FACE=arial SIZE=2><A
HREF=tirks/708230.htm>DHDZ 708230</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.153</A></TD>
<TD ALIGN = CENTER><FONT FACE=arial SIZE=2>n/a</TD>
<TD><FONT FACE=arial SIZE=2>022 A 02 A</TR>
<TR>
<TD></TD>
<TD ALIGN = CENTER><FONT FACE=arial SIZE=2>002 B 11
B</TD><TD><FONT FACE=arial SIZE=2><A
HREF=tirks/708231.htm>DHDZ 708231</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.154</A></TD>
<TD ALIGN = CENTER><FONT FACE=arial SIZE=2>n/a</TD>
<TD><FONT FACE=arial SIZE=2>022 A 02 B</TR>
<TR>
<TD></TD>
<TD ALIGN = CENTER><FONT FACE=arial SIZE=2>002 B 11
C</TD><TD><FONT FACE=arial SIZE=2><A
HREF=tirks/708232.htm>DHDZ 708232</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.155</A></TD>
<TD ALIGN = CENTER><FONT FACE=arial SIZE=2>n/a</TD>
<TD><FONT FACE=arial SIZE=2>022 A 02 C</TR>
<TR>
<TD></TD>
<TD ALIGN = CENTER><FONT FACE=arial SIZE=2>002 B 11
D</TD><TD><FONT FACE=arial SIZE=2><A
HREF=tirks/708233.htm>DHDZ 708233</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.156</A></TD>
<TD ALIGN = CENTER><FONT FACE=arial SIZE=2>n/a</TD>
<TD><FONT FACE=arial SIZE=2>022 A 02 D</TR>
```

APPENDIX 12-continued

Mic1epn.htm

```
</TABLE>
<CENTER><H2><FONT COLOR = "#880000">EPN:SAGINAW
</FONT></H2></CENTER><CENTER>
<TABLE BORDER = 1>
<TH WIDTH = 36><FONT FACE="arial" SIZE=2
COLOR="gray">EPN</TH>
<TH WIDTH = 66><FONT FACE=arial SIZE=2 COLOR=gray>HOST
PORT</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE=arial SIZE=2 COLOR=gray>REMOTE PORT</TH>
<TR>
<TD BGCOLOR=blue
  ALIGN = CENTER><A HREF=mic1E28.htm><FONT COLOR=white
FACE=arial SIZE=2>28</TD>
<TD ALIGN = CENTER><FONT FACE=arial SIZE=2>002 E 01
A</TD><TD><FONT FACE=arial SIZE=2><A
HREF=tirks/708234.htm>DHDZ 708234</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.25</A></TD>
<TD ALIGN = CENTER><FONT FACE=arial SIZE=2>n/a</TD>
<TD><FONT FACE=arial SIZE=2>023 A 02 A</TR>
<TR>
<TD></TD>
<TD ALIGN = CENTER><FONT FACE=arial SIZE=2>002 E 01
B</TD><TD><FONT FACE=arial SIZE=2><A
HREF=tirks/708235.htm>DHDZ 708235</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.26</A></TD>
<TD ALIGN = CENTER><FONT FACE=arial SIZE=2>n/a</TD>
<TD><FONT FACE=arial SIZE=2>023 A 02 B</TR>
<TR>
<TD></TD>
<TD ALIGN = CENTER><FONT FACE=arial SIZE=2>002 E 01
C</TD><TD><FONT FACE=arial SIZE=2><A
HREF=tirks/708236.htm>DHDZ 708236</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.27</A></TD>
<TD ALIGN = CENTER><FONT FACE=arial SIZE=2>n/a</TD>
<TD><FONT FACE=arial SIZE=2>023 A 02 C</TR>
<TR>
<TD></TD>
<TD ALIGN = CENTER><FONT FACE=arial SIZE=2>002 E 01
D</TD><TD><FONT FACE=arial SIZE=2><A
HREF=tirks/708237.htm>DHDZ 708237</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.28</A></TD>
<TD ALIGN = CENTER><FONT FACE=arial SIZE=2>n/a</TD>
<TD><FONT FACE=arial SIZE=2>023 A 02 D</TR>
<TR>
<TD BGCOLOR=orange
  ALIGN = CENTER><A HREF=mic1E29.htm><FONT COLOR=white
FACE=arial SIZE=2>29</TD>
<TD ALIGN = CENTER><FONT FACE=arial SIZE=2>002 E 21
A</TD><TD><FONT FACE=arial SIZE=2><A
HREF=tirks/708238.htm>DHDZ 708238</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.41</A></TD>
<TD ALIGN = CENTER><FONT FACE=arial SIZE=2>n/a</TD>
<TD><FONT FACE=arial SIZE=2>024 A 02 A</TR>
<TR>
<TD></TD>
<TD ALIGN = CENTER><FONT FACE=arial SIZE=2>002 E 21
B</TD><TD><FONT FACE=arial SIZE=2><A
HREF=tirks/708239.htm>DHDZ 708239</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.42</A></TD>
<TD ALIGN = CENTER><FONT FACE=arial SIZE=2>n/a</TD>
<TD><FONT FACE=arial SIZE=2>024 A 02 B</TR>
<TR>
<TD></TD>
<TD ALIGN = CENTER><FONT FACE=arial SIZE=2>002 E 21
C</TD><TD><FONT FACE=arial SIZE=2><A
HREF=tirks/708240.htm>DHDZ 708240</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.43</A></TD>
<TD ALIGN = CENTER><FONT FACE=arial SIZE=2>n/a</TD>
<TD><FONT FACE=arial SIZE=2>024 A 02 C</TR>
<TR>
<TD></TD>
<TD ALIGN = CENTER><FONT FACE=arial SIZE=2>002 E 21
D</TD><TD><FONT FACE=arial SIZE=2><A
HREF=tirks/708241.htm>DHDZ 708241</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.44</A></TD>
<TD ALIGN = CENTER><FONT FACE=arial SIZE=2>n/a</TD>
<TD><FONT FACE=arial SIZE=2>024 A 02 D</TR>
<TR>
<TD BGCOLOR=green
  ALIGN = CENTER><A HREF=mic1E30.htm><FONT COLOR=white
FACE=arial SIZE=2>30</TD>
<TD ALIGN = CENTER><FONT FACE=arial SIZE=2>003 E 01
A</TD><TD><FONT FACE=arial SIZE=2><A
HREF=tirks/708242.htm>DHDZ 708242</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.121</A></TD>
<TD ALIGN = CENTER><FONT FACE=arial SIZE=2>n/a</TD>
<TD><FONT FACE=arial SIZE=2>025 A 02 A</TR>
<TR>
<TD></TD>
<TD ALIGN = CENTER><FONT FACE=arial SIZE=2>003 E 01
B</TD><TD><FONT FACE=arial SIZE=2><A
HREF=tirks/708243.htm>DHDZ 708243</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.122</A></TD>
<TD ALIGN = CENTER><FONT FACE=arial SIZE=2>n/a</TD>
<TD><FONT FACE=arial SIZE=2>025 A 02 B</TR>
<TR>
<TD></TD>
<TD ALIGN = CENTER><FONT FACE=arial SIZE=2>003 E 01
C</TD><TD><FONT FACE=arial SIZE=2><A
HREF=tirks/708244.htm>DHDZ 708244</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.123</A></TD>
<TD ALIGN = CENTER><FONT FACE=arial SIZE=2>n/a</TD>
<TD><FONT FACE=arial SIZE=2>025 A 02 C</TR>
<TR>
<TD></TD>
<TD ALIGN = CENTER><FONT FACE=arial SIZE=2>003 E 01
D</TD><TD><FONT FACE=arial SIZE=2><A
HREF=tirks/708245.htm>DHDZ 708245</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.124</A></TD>
<TD ALIGN = CENTER><FONT FACE=arial SIZE=2>n/a</TD>
<TD><FONT FACE=arial SIZE=2>025 A 02 D</TR>
<TR>
<TD BGCOLOR=brown
  ALIGN = CENTER><A HREF=mic1E31.htm><FONT COLOR=white
FACE=arial SIZE=2>31</TD>
<TD ALIGN = CENTER><FONT FACE=arial SIZE=2>003 E 21
A</TD><TD><FONT FACE=arial SIZE=2><A
HREF=tirks/708246.htm>DHDZ 708246</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.137</A></TD>
<TD ALIGN = CENTER><FONT FACE=arial SIZE=2>n/a</TD>
```

APPENDIX 12-continued

Mic1epn.htm

```
<TD><FONT FACE=arial SIZE=2>026 A 02 A</TR>
<TR>
<TD></TD>
<TD ALIGN = CENTER><FONT FACE=arial SIZE=2>003 E 21
B</TD><TD><FONT FACE=arial SIZE=2><A
HREF=tirks/708247.htm>DHDZ 708247</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.138</A></TD>
<TD ALIGN = CENTER><FONT FACE=arial SIZE=2>n/a</TD>
<TD><FONT FACE=arial SIZE=2>026 A 02 B</TR>
<TR>
<TD></TD>
<TD ALIGN = CENTER><FONT FACE=arial SIZE=2>003 E 21
C</TD><TD><FONT FACE=arial SIZE=2><A
HREF=tirks/708248.htm>DHDZ 708248</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.139</A></TD>
<TD ALIGN = CENTER><FONT FACE=arial SIZE=2>n/a</TD>
<TD><FONT FACE=arial SIZE=2>026 A 02 C</TR>
<TR>
<TD></TD>
<TD ALIGN = CENTER><FONT FACE=arial SIZE=2>003 E 21
D</TD><TD><FONT FACE=arial SIZE=2><A
HREF=tirks/708249.htm>DHDZ 708249</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.140</A></TD>
<TD ALIGN = CENTER><FONT FACE=arial SIZE=2>n/a</TD>
<TD><FONT FACE=arial SIZE=2>026 A 02 D</TR>
</TABLE>
<CENTER><H2><FONT COLOR = "#880000">EPN:SOUTHFIELD
</FONT></H2></CENTER><CENTER>
<TABLE BORDER = 1>
<TH WIDTH = 36><FONT FACE="arial" SIZE=2
COLOR="gray">EPN</TH>
<TH WIDTH = 66><FONT FACE=arial SIZE=2 COLOR=gray>HOST
PORT</TH>
<TH WIDTH = 100><FONT FACE="arial" SIZE=2
COLOR="gray">CKT ID</TH>
<TH WIDTH = 68><FONT FACE="arial" SIZE=2
COLOR="gray">ALARM STATUS</TH>
<TH WIDTH = 100><FONT FACE="arial" SIZE=2
COLOR="gray">CSU_A</TH>
<TH WIDTH = 100><FONT FACE="arial" SIZE=2
COLOR="gray">CSU_Z</TH>
<TH><FONT FACE=arial SIZE=2 COLOR=gray>REMOTE PORT</TH>
<TR>
<TD BGCOLOR=blue
 ALIGN = CENTER><A HREF=mic1E17.htm><FONT COLOR=white
FACE=arial SIZE=2>17</TD>
<TD ALIGN = CENTER><FONT FACE=arial SIZE=2>001 D 10
A</TD><TD><FONT FACE=arial SIZE=2><A
HREF=tirks/708302.htm>DHDZ 708302</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.17</A></TD>
<TD ALIGN = CENTER><FONT FACE=arial SIZE=2>n/a</TD>
<TD><FONT FACE=arial SIZE=2>013 A 02 A</TR>
<TR>
<TD></TD>
<TD ALIGN = CENTER><FONT FACE=arial SIZE=2>001 D 10
B</TD><TD><FONT FACE=arial SIZE=2><A
HREF=tirks/708303.htm>DHDZ 708303</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.18</A></TD>
<TD ALIGN = CENTER><FONT FACE=arial SIZE=2>n/a</TD>
<TD><FONT FACE=arial SIZE=2>013 A 02 B</TR>
<TR>
<TD></TD>
<TD ALIGN = CENTER><FONT FACE=arial SIZE=2>001 D 10
C</TD><TD><FONT FACE=arial SIZE=2><A
HREF=tirks/708304.htm>DHDZ 708304</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.19</A></TD>
<TD ALIGN = CENTER><FONT FACE=arial SIZE=2>n/a</TD>
<TD><FONT FACE=arial SIZE=2>013 A 02 C</TR>
<TR>
<TD></TD>
<TD ALIGN = CENTER><FONT FACE=arial SIZE=2>001 D 10
D</TD><TD><FONT FACE=arial SIZE=2><A
HREF=tirks/708305.htm>DHDZ 708305</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.20</A></TD>
<TD ALIGN = CENTER><FONT FACE=arial SIZE=2>n/a</TD>
<TD><FONT FACE=arial SIZE=2>013 A 02 D</TR>
<TR>
<TD BGCOLOR=orange
 ALIGN = CENTER><A HREF=mic1E18.htm><FONT COLOR=white
FACE=arial SIZE=2>18</TD>
<TD ALIGN = CENTER><FONT FACE=arial SIZE=2>001 D 11
A</TD><TD><FONT FACE=arial SIZE=2><A
HREF=tirks/708306.htm>DHDZ 708306</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.33</A></TD>
<TD ALIGN = CENTER><FONT FACE=arial SIZE=2>n/a</TD>
<TD><FONT FACE=arial SIZE=2>014 A 02 A</TR>
<TR>
<TD></TD>
<TD ALIGN = CENTER><FONT FACE=arial SIZE=2>001 D 11
B</TD><TD><FONT FACE=arial SIZE=2><A
HREF=tirks/708307.htm>DHDZ 708307</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.34</A></TD>
<TD ALIGN = CENTER><FONT FACE=arial SIZE=2>n/a</TD>
<TD><FONT FACE=arial SIZE=2>014 A 02 B</TR>
<TR>
<TD></TD>
<TD ALIGN = CENTER><FONT FACE=arial SIZE=2>001 D 11
C</TD><TD><FONT FACE=arial SIZE=2><A
HREF=tirks/708308.htm>DHDZ 708308</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.35</A></TD>
<TD ALIGN = CENTER><FONT FACE=arial SIZE=2>n/a</TD>
<TD><FONT FACE=arial SIZE=2>014 A 02 C</TR>
<TR>
<TD></TD>
<TD ALIGN = CENTER><FONT FACE=arial SIZE=2>001 D 11
D</TD><TD><FONT FACE=arial SIZE=2><A
HREF=tirks/708309.htm>DHDZ 708309</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.36</A></TD>
<TD ALIGN = CENTER><FONT FACE=arial SIZE=2>n/a</TD>
<TD><FONT FACE=arial SIZE=2>014 A 02 D</TR>
<TR>
<TD BGCOLOR=green
 ALIGN = CENTER><A HREF=mic1E19.htm><FONT COLOR=white
FACE=arial SIZE=2>19</TD>
<TD ALIGN = CENTER><FONT FACE=arial SIZE=2>002 A 11
A</TD><TD><FONT FACE=arial SIZE=2><A
HREF=tirks/708310.htm>DHDZ 708310</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.49</A></TD>
<TD ALIGN = CENTER><FONT FACE=arial SIZE=2>n/a</TD>
<TD><FONT FACE=arial SIZE=2>015 A 02 A</TR>
<TR>
<TD></TD>
<TD ALIGN = CENTER><FONT FACE=arial SIZE=2>002 A 11
B</TD><TD><FONT FACE=arial SIZE=2><A
HREF=tirks/708311.htm>DHDZ 708311</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.50</A></TD>
<TD ALIGN = CENTER><FONT FACE=arial SIZE=2>n/a</TD>
<TD><FONT FACE=arial SIZE=2>015 A 02 B</TR>
```

APPENDIX 12-continued

Mic1epn.htm

```
<TR>
<TD></TD>
<TD ALIGN = CENTER><FONT FACE=arial SIZE=2>002 A 11
C</TD><TD><FONT FACE=arial SIZE=2><A
HREF=tirks/708312.htm>DHDZ 708312</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.51</A></TD>
<TD ALIGN = CENTER><FONT FACE=arial SIZE=2>n/a</TD>
<TD><FONT FACE=arial SIZE=2>015 A 02 C</TR>
<TR>
<TD></TD>
<TD ALIGN = CENTER><FONT FACE=arial SIZE=2>002 A 11
D</TD><TD><FONT FACE=arial SIZE=2><A
HREF=tirks/708313.htm>DHDZ 708313</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.52</A></TD>
<TD ALIGN = CENTER><FONT FACE=arial SIZE=2>n/a</TD>
<TD><FONT FACE=arial SIZE=2>015 A 02 D</TR>
<TR>
<TD BGCOLOR=brown
 ALIGN = CENTER><A HREF=mic1E20.htm><FONT COLOR=white
FACE=arial SIZE=2>20</TD>
<TD ALIGN = CENTER><FONT FACE=arial SIZE=2>002 B 10
A</TD><TD><FONT FACE=arial SIZE=2><A
HREF=tirks/708314.htm>DHDZ 708314</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.113</A></TD>
<TD ALIGN = CENTER><FONT FACE=arial SIZE=2>n/a</TD>
<TD><FONT FACE=arial SIZE=2>016 A 02 A</TR>
<TR>
<TD></TD>
<TD ALIGN = CENTER><FONT FACE=arial SIZE=2>002 B 10
B</TD><TD><FONT FACE=arial SIZE=2><A
HREF=tirks/708315.htm>DHDZ 708315</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.114</A></TD>
<TD ALIGN = CENTER><FONT FACE=arial SIZE=2>n/a</TD>
<TD><FONT FACE=arial SIZE=2>016 A 02 B</TR>
<TR>
<TD></TD>
<TD ALIGN = CENTER><FONT FACE=arial SIZE=2>002 B 10
C</TD><TD><FONT FACE=arial SIZE=2><A
HREF=tirks/708316.htm>DHDZ 708316</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.115</A></TD>
<TD ALIGN = CENTER><FONT FACE=arial SIZE=2>n/a</TD>
<TD><FONT FACE=arial SIZE=2>016 A 02 C</TR>
<TR>
<TD></TD>
<TD ALIGN = CENTER><FONT FACE=arial SIZE=2>002 B 10
D</TD><TD><FONT FACE=arial SIZE=2><A
HREF=tirks/708317.htm>DHDZ 708317</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.116</A></TD>
<TD ALIGN = CENTER><FONT FACE=arial SIZE=2>n/a</TD>
<TD><FONT FACE=arial SIZE=2>016 A 02 D</TR>
<TR>
<TD BGCOLOR=gray
 ALIGN = CENTER><A HREF=mic1E21.htm><FONT COLOR=white
FACE=arial SIZE=2>21</TD>
<TD ALIGN = CENTER><FONT FACE=arial SIZE=2>003 A 10
A</TD><TD><FONT FACE=arial SIZE=2><A
HREF=tirks/708318.htm>DHDZ 708318</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.129</A></TD>
<TD ALIGN = CENTER><FONT FACE=arial SIZE=2>n/a</TD>
<TD><FONT FACE=arial SIZE=2>017 A 02 A</TR>
<TR>
<TD></TD>
<TD ALIGN = CENTER><FONT FACE=arial SIZE=2>003 A 10
B</TD><TD><FONT FACE=arial SIZE=2><A
HREF=tirks/708319.htm>DHDZ 708319</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.130</A></TD>
<TD ALIGN = CENTER><FONT FACE=arial SIZE=2>n/a</TD>
<TD><FONT FACE=arial SIZE=2>017 A 02 B</TR>
<TR>
<TD></TD>
<TD ALIGN = CENTER><FONT FACE=arial SIZE=2>003 A 10
C</TD><TD><FONT FACE=arial SIZE=2><A
HREF=tirks/708320.htm>DHDZ 708320</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.131</A></TD>
<TD ALIGN = CENTER><FONT FACE=arial SIZE=2>n/a</TD>
<TD><FONT FACE=arial SIZE=2>017 A 02 C</TR>
<TR>
<TD></TD>
<TD ALIGN = CENTER><FONT FACE=arial SIZE=2>003 A 10
D</TD><TD><FONT FACE=arial SIZE=2><A
HREF=tirks/708321.htm>DHDZ 708321</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.132</A></TD>
<TD ALIGN = CENTER><FONT FACE=arial SIZE=2>n/a</TD>
<TD><FONT FACE=arial SIZE=2>017 A 02 D</TR>
<TR>
<TD BGCOLOR=violet
 ALIGN = CENTER><A HREF=mic1E22.htm><FONT COLOR=white
FACE=arial SIZE=2>22</TD>
<TD ALIGN = CENTER><FONT FACE=arial SIZE=2>003 A 11
A</TD><TD><FONT FACE=arial SIZE=2><A
HREF=tirks/708322.htm>DHDZ 708322</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.145</A></TD>
<TD ALIGN = CENTER><FONT FACE=arial SIZE=2>n/a</TD>
<TD><FONT FACE=arial SIZE=2>018 A 02 A</TR>
<TR>
<TD></TD>
<TD ALIGN = CENTER><FONT FACE=arial SIZE=2>003 A 11
B</TD><TD><FONT FACE=arial SIZE=2><A
HREF=tirks/708323.htm>DHDZ 708323</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.146</A></TD>
<TD ALIGN = CENTER><FONT FACE=arial SIZE=2>n/a</TD>
<TD><FONT FACE=arial SIZE=2>018 A 02 B</TR>
<TR>
<TD></TD>
<TD ALIGN = CENTER><FONT FACE=arial SIZE=2>003 A 11
C</TD><TD><FONT FACE=arial SIZE=2><A
HREF=tirks/708324.htm>DHDZ 708324</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.147</A></TD>
<TD ALIGN = CENTER><FONT FACE=arial SIZE=2>n/a</TD>
<TD><FONT FACE=arial SIZE=2>018 A 02 C</TR>
<TR>
<TD></TD>
<TD ALIGN = CENTER><FONT FACE=arial SIZE=2>003 A 11
D</TD><TD><FONT FACE=arial SIZE=2><A
HREF=tirks/708325.htm>DHDZ 708325</A></TD>
<TD ALIGN = CENTER><FONT FACE=arial SIZE=2>None
</TD><TD ALIGN = CENTER><FONT FACE=arial SIZE=2><A
HREF=iptest.htm>144.151.178.148</A></TD>
<TD ALIGN = CENTER><FONT FACE=arial SIZE=2>n/a</TD>
<TD><FONT FACE=arial SIZE=2>018 A 02 D</TR>
</TABLE>
```

APPENDIX 13

Mic1alm.htm

```
<HTML>
<HEAD>
<TITLE>MIC1 Alarm Log</TITLE>
</HEAD>
<BODY BGCOLOR=#F0F0F0>
<CENTER>
<TABLE>
<TR><TD><FONT COLOR=#880000>
<H1><CENTER>- MIC1 Alarm Log -</CENTER></H1></TD>
</TR>
</TABLE></CENTER>
<CENTER>
<FORM METHOD = GET>
<SELECT SIZE=32>
<OPTION>LATEST [TIMES] ALARM MESSAGE . . .
<OPTION>
<OPTION>03/09 09:18 [1] 03/09 09:17 ->02E16 SN-CONF
MAJOR (EPN 19 - SOUTHFIELD)
<OPTION>03/09 09:18 [1] 03/09 09:17 ->15A0101 SYS-LINK
MINOR (@EPN 19 - SOUTHFIELD)
<OPTION>03/08 16:06 [1] 03/08 16:05 ->29_A-PNC FIBER-LK
MINOR
<OPTION>03/08 11:00 [1] 03/08 10:58 ->02A11B DS1-FAC
MAJOR (EPN 19 - SOUTHFIELD)
<OPTION>03/05 20:04 [4] 02/16 21:32 ->05A0401 PGATE-PT
MINOR
<OPTION>02/29 13:18 [24] 02/16 22:36 ->24A02B DS1-FAC
MINOR (@EPN 29 - SAGINAW)
<OPTION>02/29 13:18 [17] 02/16 22:36 ->24A02D DS1-FAC
MINOR (@EPN 29 - SAGINAW)
<OPTION>02/29 13:18 [18] 02/16 22:36 ->24A02A DS1-FAC
MINOR (@EPN 29 - SAGINAW)
<OPTION>02/29 13:18 [2] 02/16 22:36 ->24A02C DS1-FAC
MINOR (@EPN 29 - SAGINAW)
<OPTION>02/23 05:55 [3] 02/23 04:27 ->24A02B DS1-FAC
MAJOR (@EPN 29 - SAGINAW)
<OPTION>02/17 09:21 [20] 02/16 22:35 ->21A02A DS1-FAC
MINOR (@EPN 26 - KALAMAZOO)
<OPTION>02/17 09:21 [21] 02/16 22:35 ->25A02B DS1-FAC
MINOR (@EPN 30 - SAGINAW)
<OPTION>02/17 09:21 [19] 02/16 22:35 ->25A02A DS1-FAC
MINOR (@EPN 30 - SAGINAW)
<OPTION>02/17 09:21 [17] 02/16 22:37 ->17A02D DS1-FAC
MINOR (@EPN 21 - SOUTHFIELD)
<OPTION>02/17 09:21 [18] 02/16 22:37 ->08A02C DS1-FAC
MINOR (@EPN 14 - BETHUNE)
<OPTION>02/17 09:19 [19] 02/16 22:36 ->26A02A DS1-FAC
MINOR (@EPN 31 - SAGINAW)
<OPTION>02/17 09:19 [19] 02/16 22:37 ->16A02C DS1-FAC
MINOR (@EPN 20 - SOUTHFIELD)
<OPTION>02/17 09:19 [17] 02/16 22:34 ->20A02D DS1-FAC
MINOR (@EPN 25 - KALAMAZOO)
<OPTION>02/17 09:19 [21] 02/16 22:36 ->23A02C DS1-FAC
MINOR (@EPN 28 - SAGINAW)
<OPTION>02/17 09:19 [20] 02/16 22:34 ->20A02B DS1-FAC
MINOR (@EPN 25 - KALAMAZOO)
<OPTION>02/17 09:19 [19] 02/16 22:37 ->16A02A DS1-FAC
MINOR (@EPN 20 - SOUTHFIELD)
<OPTION>02/17 09:19 [18] 02/16 22:36 ->16A02D DS1-FAC
MINOR (@EPN 20 - SOUTHFIELD)
<OPTION>02/17 09:19 [15] 02/16 22:34 ->20A02A DS1-FAC
MINOR (@EPN 25 - KALAMAZOO)
<OPTION>02/17 09:17 [16] 02/16 22:35 ->18A02D DS1-FAC
MINOR (@EPN 22 - SOUTHFIELD)
<OPTION>02/17 09:17 [20] 02/16 22:37 ->16A02B DS1-FAC
MINOR (@EPN 20 - SOUTHFIELD)
<OPTION>02/17 09:17 [19] 02/16 22:33 ->13A02A DS1-FAC
MINOR (@EPN 17 - SOUTHFIELD)
<OPTION>02/17 09:16 [19] 02/16 22:36 ->21A02B DS1-FAC
MINOR (@EPN 26 - KALAMAZOO)
<OPTION>02/17 09:16 [18] 02/16 22:37 ->17A02C DS1-FAC
MINOR (@EPN 21 - SOUTHFIELD)
<OPTION>02/17 09:16 [19] 02/16 22:37 ->08A02B DS1-FAC
MINOR (@EPN 14 - BETHUNE)
<OPTION>02/17 08:50 [19] 02/16 22:37 ->14A02A DS1-FAC
MINOR (@EPN 18 - SOUTHFIELD)
<OPTION>02/17 08:50 [17] 02/16 22:37 ->14A02B DS1-FAC
MINOR (@EPN 18 - SOUTHFIELD)
<OPTION>02/17 08:45 [17] 02/16 22:35 ->21A02D DS1-FAC
MINOR (@EPN 26 - KALAMAZOO)
<OPTION>02/17 08:45 [15] 02/16 22:35 ->22A02D DS1-FAC
MINOR (@EPN 27 - KALAMAZOO)
<OPTION>02/17 08:45 [18] 02/16 22:35 ->22A02A DS1-FAC
MINOR (@EPN 27 - KALAMAZOO)
<OPTION>02/17 08:45 [18] 02/16 22:35 ->25A02C DS1-FAC
MINOR (@EPN 30 - SAGINAW)
<OPTION>02/17 08:43 [19] 02/16 22:37 ->14A02D DS1-FAC
MINOR (@EPN 18 - SOUTHFIELD)
<OPTION>02/17 08:43 [20] 02/16 22:37 ->14A02C DS1-FAC
MINOR (@EPN 18 - SOUTHFIELD)
<OPTION>02/17 08:13 [16] 02/16 22:35 ->18A02A DS1-FAC
MINOR (@EPN 22 - SOUTHFIELD)
<OPTION>02/17 08:13 [18] 02/16 22:36 ->23A02A DS1-FAC
MINOR (@EPN 28 - SAGINAW)
<OPTION>02/17 07:42 [15] 02/16 22:35 ->22A02B DS1-FAC
MINOR (@EPN 27 - KALAMAZOO)
<OPTION>02/17 06:09 [13] 02/16 22:33 ->13A02B DS1-FAC
MINOR (@EPN 17 - SOUTHFIELD)
<OPTION>02/17 05:49 [1] 02/17 05:31 ->21A02B DS1-FEAC
MINOR (@EPN 26 - KALAMAZOO)
<OPTION>02/17 04:30 [11] 02/16 22:36 ->21A02C DS1-FAC
MINOR (@EPN 26 - KALAMAZOO)
<OPTION>02/17 04:02 [9] 02/16 22:34 ->20A02C DS1-FAC
MINOR (@EPN 25 - KALAMAZOO)
<OPTION>02/17 03:55 [8] 02/16 22:36 ->15A02A DS1-FAC
MINOR (@EPN 19 - SOUTHFIELD)
<OPTION>02/16 23:47 [1] 02/16 23:44 ->14A02C DS1-FAC
MINOR (@EPN 18 - SOUTHFIELD)
<OPTION>02/16 23:41 [2] 02/16 22:35 ->25A02D DS1-FAC
MINOR (@EPN 30 - SAGINAW)
<OPTION>02/16 23:39 [2] 02/16 22:37 ->08A02D DS1-FAC
MINOR (@EPN 14 - BETHUNE)
<OPTION>02/16 23:39 [2] 02/16 22:37 ->17A02A DS1-FAC
MINOR (@EPN 21 - SOUTHFIELD)
<OPTION>02/16 23:39 [2] 02/16 22:36 ->26A02B DS1-FAC
MINOR (@EPN 31 - SAGINAW)
<OPTION>02/16 22:39 [1] 02/16 22:37 ->08A02A DS1-FAC
MINOR (@EPN 14 - BETHUNE)
<OPTION>02/16 22:39 [1] 02/16 22:37 ->17A02B DS1-FAC
MINOR (@EPN 21 - SOUTHFIELD)
<OPTION>02/16 22:37 [1] 02/16 22:35 ->22A02C DS1-FAC
MINOR (@EPN 27 - KALAMAZOO)
<OPTION>02/16 22:37 [1] 02/16 22:35 ->18A02B DS1-FAC
MINOR (@EPN 22 - SOUTHFIELD)
<OPTION>02/16 22:37 [1] 02/16 22:35 ->18A02C DS1-FAC
MINOR (@EPN 22 - SOUTHFIELD)
<OPTION>02/16 22:37 [1] 02/16 22:36 ->26A02C DS1-FAC
MINOR (@EPN 31 - SAGINAW)
<OPTION>02/16 22:37 [1] 02/16 22:36 ->26A02D DS1-FAC
MINOR (@EPN 31 - SAGINAW)
<OPTION>02/16 22:37 [1] 02/16 22:36 ->15A02C DS1-FAC
MINOR (@EPN 19 - SOUTHFIELD)
<OPTION>02/16 22:37 [1] 02/16 22:36 ->15A02B DS1-FAC
MINOR (@EPN 19 - SOUTHFIELD)
<OPTION>02/16 22:37 [1] 02/16 22:36 ->15A02D DS1-FAC
MINOR (@EPN 19 - SOUTHFIELD)
<OPTION>02/16 22:37 [1] 02/16 22:36 ->23A02D DS1-FAC
MINOR (@EPN 28 - SAGINAW)
<OPTION>02/16 22:37 [1] 02/16 22:36 ->23A02B DS1-FAC
MINOR (@EPN 28 - SAGINAW)
<OPTION>02/16 22:34 [1] 02/16 22:33 ->13A02D DS1-FAC
MINOR (@EPN 17 - SOUTHFIELD)
<OPTION>02/16 22:34 [1] 02/16 22:33 ->13A02C DS1-FAC
MINOR (@EPN 17 - SOUTHFIELD)
<OPTION>02/10 12:44 [1] 02/10 12:43 ->21A01 EXP-INTF
MINOR (@EPN 26 - KALAMAZOO)
<OPTION>02/10 12:43 [1] 02/10 12:41 ->33_A-PNC FIBER-LK
MINOR
</SELECT>
</FORM>
</CENTER>
</BODY>
</HTML>
```

APPENDIX 14

Mic1agnt.htm

```
<HTML>
<META HTTP-EQUIV="Refresh" CONTENT=60>
<HEAD>
<TITLE>MIC1 Agent Status</TITLE></HEAD>
<BODY BGCOLOR=#F0F0F0>
<CENTER><FONT COLOR=#880000><H1>- MIC1 Agent Status
-</H1>
</CENTER>
<CENTER>
<H3><FONT COLOR=#880000>(as of Thu Mar 09 14:51:36 2000
 CDT)
</CENTER>
<P>
<CENTER>
<TABLE BORDER=1>
<TR>
<TH WIDTH=46><FONT FACE=arial SIZE=1>SPLIT / SKILL</TH>
<TH WIDTH=60><FONT FACE=arial SIZE=1>AGENTS
   ACTIVE</TH>
<TH WIDTH=58><FONT FACE=arial SIZE=1>QUEUED
   CALLS</TH>
<TH WIDTH=58><FONT FACE=arial SIZE=1>LONGEST WAIT</TH>
<TH><FONT FACE=arial SIZE=1>GATE NAME</TH>
</TR>
<TR>
<TD ALIGN=RIGHT><FONT FACE=arial SIZE=1>99 </TD>
<TD ALIGN=RIGHT><FONT FACE=arial SIZE=1>1 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> SYSTEM PORTS
 </TD>
<TR>
<TD ALIGN=RIGHT><FONT FACE=arial SIZE=1>200 </TD>
<TD ALIGN=RIGHT><FONT FACE=arial SIZE=1>171 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> STHFLD UNIV 200
 </TD>
<TR>
<TD ALIGN=RIGHT><FONT FACE=arial SIZE=1>204 </TD>
<TD ALIGN=RIGHT><FONT FACE=arial SIZE=1>4 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> MI CSST
 </TD>
<TR>
<TD ALIGN=RIGHT><FONT FACE=arial SIZE=1>256 </TD>
<TD ALIGN=RIGHT><FONT FACE=arial SIZE=1>4 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> MI ASST COACH
 </TD>
<TR>
<TD ALIGN=RIGHT><FONT FACE=arial SIZE=1>262 </TD>
<TD ALIGN=RIGHT><FONT FACE=arial SIZE=1>1 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> SAGINAW ACE
 </TD>
<TR>
<TD ALIGN=RIGHT><FONT FACE=arial SIZE=1>263 </TD>
<TD ALIGN=RIGHT><FONT FACE=arial SIZE=1>4 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> SOUTHFIELD ACE
 </TD>
<TR>
<TD> </TD>
<TD ALIGN=RIGHT><FONT FACE=arial SIZE=1>185 </TD>
<TD ALIGN=RIGHT><FONT FACE=arial SIZE=1>0 </TD>
<TD ALIGN=RIGHT><FONT FACE=arial SIZE=1>0:00 </TD>
<TD><FONT FACE=arial SIZE=1> ** TOTALS ** </TD>
</TABLE>
</CENTER>
</BODY>
</HTML>
```

APPENDIX 15 mic1E14.htm

```
<HTML>
<HEAD><TITLE>MIC1 EPN 14</TITLE></HEAD>
<BODY BGCOLOR=F0F0F0>
<CENTER>
<H2><FONT COLOR=880000>BETHUNE
  - EPN 14</FONT></H2></CENTER>
<CENTER><TABLE><TR><TD BGCOLOR=blue
 ><FONT SIZE=4 COLOR=white>(Cabinet 8)</TD></TR></TABLE>
</CENTER>
<CENTER>
<TABLE BORDER=1>
<TR><TH><FONT FACE=ARIAL SIZE=2>PORT\CARD</TH>
<TH><FONT FACE=arial SIZE=2><CENTER>08A03</TH>
<TH><FONT FACE=arial SIZE=2><CENTER>08A04</TH>
<TH><FONT FACE=arial SIZE=2><CENTER>08A05</TH>
<TH><FONT FACE=arial SIZE=2><CENTER>08A06</TH>
</TR>
<TR>
<TD><FONT FACE=courier><CENTER>1</CENTER></TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>2</CENTER></TD>
<TD WIDTH=50><FONT FACE=courier><CENTER>59401</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>3</CENTER></TD>
<TD WIDTH=50><FONT FACE=courier><CENTER>59402</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>4</CENTER></TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>5</CENTER></TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>6</CENTER></TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>7</CENTER></TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>8</CENTER></TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
<TD WIDTH=50><FONT FACE=courier><CENTER>---</TD>
</TR>
<TR>
<TD><FONT FACE=courier><CENTER>9</CENTER></TD>
<TD WIDTH=50><FONT FACE=courier><CENTER>---</TD>
<TD WIDTH=50><FONT FACE=courier><CENTER>---</TD>
```

APPENDIX 15-continued mic1E14.htm

```
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>10</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>11</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>12</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>13</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>14</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>15</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>16</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>17</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>18</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>19</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>20</CENTER></TD>
<TD WIDTH=50><FONT FACE=courier><CENTER>--</TD>
<TD WIDTH=50><FONT FACE=courier><CENTER>--</TD>
```

APPENDIX 15-continued mic1E14.htm

```
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>21</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>22</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>23</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
<TR>
<TD><FONT FACE=courier><CENTER>24</CENTER></TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
<TD WIDTH=50><FONT FACE=courier><CENTER>--</TD>
</TR>
</TABLE></CENTER>
</BODY>
</HTML>
```

APPENDIX 16

Mic1load.htm

```
<HTML>
<HEAD>
<TITLE>MIC1 Traffic Load</TITLE></HEAD>
<BODY BGCOLOR=#F0F0F0>
<CENTER><FONT COLOR=#880000><H1>- MIC1 Traffic Load
-</H1>
</CENTER>
<CENTER>
<H3><FONT COLOR=#880000>(Past Hour / Peak for Thu Mar 09
14:53:09 2000
 CDT)
</CENTER>
<P>
<CENTER>
<TABLE BORDER=1>
<TR>
<TH ALIGN=CENTER WIDTH=55><FONT FACE=ARIAL
SIZE=1>PORT
NETWORK</TH>
<TH ALIGN=CENTER><FONT FACE=arial SIZE=1>NAME</TH>
<TH ALIGN=CENTER WIDTH=28><FONT FACE=arial SIZE=1>TDM
OCC</TH>
<TH ALIGN=CENTER WIDTH=28><FONT FACE=arial SIZE=1>PN
OCC</TH>
<TH ALIGN=CENTER><FONT FACE=arial
SIZE=1> . . . 20 . . . 40 . . . 60 . . . 80 . . .
 . . . 100</TH>
</TR>
<TR>
<TD ALIGN=RIGHT><FONT FACE=arial SIZE=1>1 </TD>
<TD><FONT FACE=arial SIZE=1>HOST CABINET 1 </TD>
<TD ALIGN=RIGHT><FONT FACE=arial SIZE=1>23 </TD>
<TD ALIGN=RIGHT><FONT FACE=arial SIZE=1>7 </TD>
<TD ALIGN=LEFT><IMG SRC=greenbar.gif HEIGHT=11
WIDTH=46><IMG SRC=yellobar.gif HEIGHT=11 WIDTH=88></TD>
```

APPENDIX 16-continued

Mic1load.htm

```
</TR>
<TR>
<TD ALIGN=RIGHT><FONT FACE=arial SIZE=1>2 </TD>
<TD><FONT FACE=arial SIZE=1>HOST CABINET 2 </TD>
<TD ALIGN=RIGHT><FONT FACE=arial SIZE=1>24 </TD>
<TD ALIGN=RIGHT><FONT FACE=arial SIZE=1>15 </TD>
<TD ALIGN=LEFT><IMG SRC=greenbar.gif HEIGHT=11
WIDTH=48><IMG SRC=yellobar.gif HEIGHT=11 WIDTH=74></TD>
</TR>
<TR>
<TD ALIGN=RIGHT><FONT FACE=arial SIZE=1>3 </TD>
<TD><FONT FACE=arial SIZE=1>HOST CABINET 3 </TD>
<TD ALIGN=RIGHT><FONT FACE=arial SIZE=1>11 </TD>
<TD ALIGN=RIGHT><FONT FACE=arial SIZE=1>7 </TD>
<TD ALIGN=LEFT><IMG SRC=greenbar.gif HEIGHT=11
WIDTH=22><IMG SRC=yellobar.gif HEIGHT=11 WIDTH=76></TD>
</TR>
<TR>
<TD ALIGN=RIGHT><FONT FACE=arial SIZE=1>4 </TD>
<TD><FONT FACE=arial SIZE=1>HOST CABINET 4 </TD>
<TD ALIGN=RIGHT><FONT FACE=arial SIZE=1>19 </TD>
<TD ALIGN=RIGHT><FONT FACE=arial SIZE=1>11 </TD>
<TD ALIGN=LEFT><IMG SRC=greenbar.gif HEIGHT=11
WIDTH=38><IMG SRC=yellobar.gif HEIGHT=11 WIDTH=98></TD>
</TR>
<TR>
<TD ALIGN=RIGHT><FONT FACE=arial SIZE=1>5 </TD>
<TD><FONT FACE=arial SIZE=1>HOST CABINET 4 </TD>
<TD ALIGN=RIGHT><FONT FACE=arial SIZE=1>20 </TD>
<TD ALIGN=RIGHT><FONT FACE=arial SIZE=1>12 </TD>
<TD ALIGN=LEFT><IMG SRC=greenbar.gif HEIGHT=11
WIDTH=40><IMG SRC=yellobar.gif HEIGHT=11 WIDTH=120></TD>
</TR>
<TR>
<TD ALIGN=RIGHT><FONT FACE=arial SIZE=1>6 </TD>
<TD><FONT FACE=arial SIZE=1>HOST CABINET 5 </TD>
<TD ALIGN=RIGHT><FONT FACE=arial SIZE=1>5 </TD>
<TD ALIGN=RIGHT><FONT FACE=arial SIZE=1>4 </TD>
<TD ALIGN=LEFT><IMG SRC=greenbar.gif HEIGHT=11
WIDTH=10><IMG SRC=yellobar.gif HEIGHT=11 WIDTH=86></TD>
</TR>
<TR>
<TD ALIGN=RIGHT><FONT FACE=arial SIZE=1>7 </TD>
<TD><FONT FACE=arial SIZE=1>HOST CABINET 5 </TD>
<TD ALIGN=RIGHT><FONT FACE=arial SIZE=1>24 </TD>
<TD ALIGN=RIGHT><FONT FACE=arial SIZE=1>15 </TD>
<TD ALIGN=LEFT><IMG SRC=greenbar.gif HEIGHT=11
WIDTH=48><IMG SRC=yellobar.gif HEIGHT=11 WIDTH=142></TD>
</TR>
<TR>
<TD ALIGN=RIGHT><FONT FACE=arial SIZE=1>8 </TD>
<TD><FONT FACE=arial SIZE=1>HOST CABINET 6 </TD>
<TD ALIGN=RIGHT><FONT FACE=arial SIZE=1>9 </TD>
<TD ALIGN=RIGHT><FONT FACE=arial SIZE=1>6 </TD>
<TD ALIGN=LEFT><IMG SRC=greenbar.gif HEIGHT=11
WIDTH=18><IMG SRC=yellobar.gif HEIGHT=11 WIDTH=84></TD>
</TR>
<TR>
<TD ALIGN=RIGHT><FONT FACE=arial SIZE=1>9 </TD>
<TD><FONT FACE=arial SIZE=1>HOST CABINET 6 </TD>
<TD ALIGN=RIGHT><FONT FACE=arial SIZE=1>16 </TD>
<TD ALIGN=RIGHT><FONT FACE=arial SIZE=1>10 </TD>
<TD ALIGN=LEFT><IMG SRC=greenbar.gif HEIGHT=11
WIDTH=32><IMG SRC=yellobar.gif HEIGHT=11 WIDTH=92></TD>
</TR>
<TR>
<TD ALIGN=RIGHT><FONT FACE=arial SIZE=1>10 </TD>
<TD><FONT FACE=arial SIZE=1>HOST CABINET 7 </TD>
<TD ALIGN=RIGHT><FONT FACE=arial SIZE=1>7 </TD>
<TD ALIGN=RIGHT><FONT FACE=arial SIZE=1>4 </TD>
<TD ALIGN=LEFT><IMG SRC=greenbar.gif HEIGHT=11
WIDTH=14><IMG SRC=yellobar.gif HEIGHT=11 WIDTH=90></TD>
</TR>
<TR>
<TD ALIGN=RIGHT><FONT FACE=arial SIZE=1>11 </TD>
<TD><FONT FACE=arial SIZE=1>HOST CABINET 7 </TD>
<TD ALIGN=RIGHT><FONT FACE=arial SIZE=1>11 </TD>
<TD ALIGN=RIGHT><FONT FACE=arial SIZE=1>7 </TD>
<TD ALIGN=LEFT><IMG SRC=greenbar.gif HEIGHT=11
WIDTH=22><IMG SRC=yellobar.gif HEIGHT=11 WIDTH=62></TD>
</TR>
<TR>
<TD ALIGN=RIGHT><FONT FACE=arial SIZE=1>23 </TD>
<TD><FONT FACE=arial SIZE=1>HOST CABINET 19 </TD>
<TD ALIGN=RIGHT><FONT FACE=arial SIZE=1>0 </TD>
<TD ALIGN=RIGHT><FONT FACE=arial SIZE=1>0 </TD>
<TD ALIGN=LEFT><IMG SRC=greenbar.gif HEIGHT=11
WIDTH=1><IMG SRC=yellobar.gif HEIGHT=11 WIDTH=34></TD>
</TR>
<TR>
<TD ALIGN=RIGHT><FONT FACE=arial SIZE=1>24 </TD>
<TD><FONT FACE=arial SIZE=1>HOST CABINET 19 </TD>
<TD ALIGN=RIGHT><FONT FACE=arial SIZE=1>5 </TD>
<TD ALIGN=RIGHT><FONT FACE=arial SIZE=1>3 </TD>
<TD ALIGN=LEFT><IMG SRC=greenbar.gif HEIGHT=11
WIDTH=10><IMG SRC=yellobar.gif HEIGHT=11 WIDTH=60></TD>
</TR>
<TR>
<TD ALIGN=RIGHT><FONT FACE=arial SIZE=1>32 </TD>
<TD><FONT FACE=arial SIZE=1>HOST CABINET 27 </TD>
<TD ALIGN=RIGHT><FONT FACE=arial SIZE=1>3 </TD>
<TD ALIGN=RIGHT><FONT FACE=arial SIZE=1>2 </TD>
<TD ALIGN=LEFT><IMG SRC=greenbar.gif HEIGHT=11
WIDTH=6><IMG SRC=yellobar.gif HEIGHT=11 WIDTH=80></TD>
</TR>
<TR>
<TD ALIGN=RIGHT><FONT FACE=arial SIZE=1>12 </TD>
<TD><FONT FACE=arial SIZE=1>HOST CABINET 28 </TD>
<TD ALIGN=RIGHT><FONT FACE=arial SIZE=1>19 </TD>
<TD ALIGN=RIGHT><FONT FACE=arial SIZE=1>12 </TD>
<TD ALIGN=LEFT><IMG SRC=greenbar.gif HEIGHT=11
WIDTH=38><IMG SRC=yellobar.gif HEIGHT=11 WIDTH=62></TD>
</TR>
<TR>
<TD ALIGN=RIGHT><FONT FACE=arial SIZE=1>13 </TD>
<TD><FONT FACE=arial SIZE=1>HOST CABINET 29 </TD>
<TD ALIGN=RIGHT><FONT FACE=arial SIZE=1>19 </TD>
<TD ALIGN=RIGHT><FONT FACE=arial SIZE=1>12 </TD>
<TD ALIGN=LEFT><IMG SRC=greenbar.gif HEIGHT=11
WIDTH=38><IMG SRC=yellobar.gif HEIGHT=11 WIDTH=62></TD>
</TR>
<TR>
<TD ALIGN=RIGHT><FONT FACE=arial SIZE=1>14 </TD>
<TD><FONT FACE=arial SIZE=1>BETHUNE </TD>
<TD ALIGN=RIGHT><FONT FACE=arial SIZE=1>0 </TD>
<TD ALIGN=RIGHT><FONT FACE=arial SIZE=1>0 </TD>
<TD ALIGN=LEFT><IMG SRC=greenbar.gif HEIGHT=11
WIDTH=1><IMG SRC=yellobar.gif HEIGHT=11 WIDTH=34></TD>
</TR>
<TR>
<TD ALIGN=RIGHT><FONT FACE=arial SIZE=1>25 </TD>
<TD><FONT FACE=arial SIZE=1>KALAMAZOO </TD>
<TD ALIGN=RIGHT><FONT FACE=arial SIZE=1>5 </TD>
<TD ALIGN=RIGHT><FONT FACE=arial SIZE=1>14 </TD>
<TD ALIGN=LEFT><IMG SRC=greenbar.gif HEIGHT=11
WIDTH=28><IMG SRC=yellobar.gif HEIGHT=11 WIDTH=76></TD>
</TR>
<TR>
<TD ALIGN=RIGHT><FONT FACE=arial SIZE=1>26 </TD>
<TD><FONT FACE=arial SIZE=1>KALAMAZOO </TD>
<TD ALIGN=RIGHT><FONT FACE=arial SIZE=1>6 </TD>
<TD ALIGN=RIGHT><FONT FACE=arial SIZE=1>16 </TD>
<TD ALIGN=LEFT><IMG SRC=greenbar.gif HEIGHT=11
WIDTH=32><IMG SRC=yellobar.gif HEIGHT=11 WIDTH=64></TD>
</TR>
<TR>
<TD ALIGN=RIGHT><FONT FACE=arial SIZE=1>27 </TD>
<TD><FONT FACE=arial SIZE=1>KALAMAZOO </TD>
<TD ALIGN=RIGHT><FONT FACE=arial SIZE=1>6 </TD>
<TD ALIGN=RIGHT><FONT FACE=arial SIZE=1>17 </TD>
<TD ALIGN=LEFT><IMG SRC=greenbar.gif HEIGHT=11
WIDTH=34><IMG SRC=yellobar.gif HEIGHT=11 WIDTH=64></TD>
</TR>
<TR>
```

APPENDIX 16-continued

Mic1load.htm

```
<TD ALIGN=RIGHT><FONT FACE=arial SIZE=1>28 </TD>
<TD><FONT FACE=arial SIZE=1>SAGINAW </TD>
<TD ALIGN=RIGHT><FONT FACE=arial SIZE=1>9 </TD>
<TD ALIGN=RIGHT><FONT FACE=arial SIZE=1>24 </TD>
<TD ALIGN=LEFT><IMG SRC=greenbar.gif HEIGHT=11
WIDTH=48><IMG SRC=yellobar.gif HEIGHT=11 WIDTH=102></TD>
</TR>
<TR>
<TD ALIGN=RIGHT><FONT FACE=arial SIZE=1>29 </TD>
<TD><FONT FACE=arial SIZE=1>SAGINAW </TD>
<TD ALIGN=RIGHT><FONT FACE=arial SIZE=1>12 </TD>
<TD ALIGN=RIGHT><FONT FACE=arial SIZE=1>32 </TD>
<TD ALIGN=LEFT><IMG SRC=greenbar.gif HEIGHT=11
WIDTH=64><IMG SRC=yellobar.gif HEIGHT=11 WIDTH=82></TD>
</TR>
<TR>
<TD ALIGN=RIGHT><FONT FACE=arial SIZE=1>30 </TD>
<TD><FONT FACE=arial SIZE=1>SAGINAW </TD>
<TD ALIGN=RIGHT><FONT FACE=arial SIZE=1>8 </TD>
<TD ALIGN=RIGHT><FONT FACE=arial SIZE=1>22 </TD>
<TD ALIGN=LEFT><IMG SRC=greenbar.gif HEIGHT=11
WIDTH=44><IMG SRC=yellobar.gif HEIGHT=11 WIDTH=70></TD>
</TR>
<TR>
<TD ALIGN=RIGHT><FONT FACE=arial SIZE=1>31 </TD>
<TD><FONT FACE=arial SIZE=1>SAGINAW </TD>
<TD ALIGN=RIGHT><FONT FACE=arial SIZE=1>1 </TD>
<TD ALIGN=RIGHT><FONT FACE=arial SIZE=1>3 </TD>
<TD ALIGN=LEFT><IMG SRC=greenbar.gif HEIGHT=11
WIDTH=6><IMG SRC=yellobar.gif HEIGHT=11 WIDTH=86></TD>
</TR>
<TR>
<TD ALIGN=RIGHT><FONT FACE=arial SIZE=1>17 </TD>
<TD><FONT FACE=arial SIZE=1>SOUTHFIELD </TD>
<TD ALIGN=RIGHT><FONT FACE=arial SIZE=1>7 </TD>
<TD ALIGN=RIGHT><FONT FACE=arial SIZE=1>20 </TD>
<TD ALIGN=LEFT><IMG SRC=greenbar.gif HEIGHT=11
WIDTH=40><IMG SRC=yellobar.gif HEIGHT=11 WIDTH=44></TD>
</TR>
<TR>
<TD ALIGN=RIGHT><FONT FACE=arial SIZE=1>18 </TD>
<TD><FONT FACE=arial SIZE=1>SOUTHFIELD </TD>
<TD ALIGN=RIGHT><FONT FACE=arial SIZE=1>6 </TD>
<TD ALIGN=RIGHT><FONT FACE=arial SIZE=1>17 </TD>
<TD ALIGN=LEFT><IMG SRC=greenbar.gif HEIGHT=11
WIDTH=34><IMG SRC=yellobar.gif HEIGHT=11 WIDTH=42></TD>
</TR>
<TR>
<TD ALIGN=RIGHT><FONT FACE=arial SIZE=1>19 </TD>
<TD><FONT FACE=arial SIZE=1>SOUTHFIELD </TD>
<TD ALIGN=RIGHT><FONT FACE=arial SIZE=1>6 </TD>
<TD ALIGN=RIGHT><FONT FACE=arial SIZE=1>23 </TD>
<TD ALIGN=LEFT><IMG SRC=greenbar.gif HEIGHT=11
WIDTH=46><IMG SRC=yellobar.gif HEIGHT=11 WIDTH=46></TD>
</TR>
<TR>
<TD ALIGN=RIGHT><FONT FACE=arial SIZE=1>20 </TD>
<TD><FONT FACE=arial SIZE=1>SOUTHFIELD </TD>
<TD ALIGN=RIGHT><FONT FACE=arial SIZE=1>6 </TD>
<TD ALIGN=RIGHT><FONT FACE=arial SIZE=1>16 </TD>
<TD ALIGN=LEFT><IMG SRC=greenbar.gif HEIGHT=11
WIDTH=32><IMG SRC=yellobar.gif HEIGHT=11 WIDTH=58></TD>
</TR>
<TR>
<TD ALIGN=RIGHT><FONT FACE=arial SIZE=1>21 </TD>
<TD><FONT FACE=arial SIZE=1>SOUTHFIELD </TD>
<TD ALIGN=RIGHT><FONT FACE=arial SIZE=1>5 </TD>
<TD ALIGN=RIGHT><FONT FACE=arial SIZE=1>15 </TD>
<TD ALIGN=LEFT><IMG SRC=greenbar.gif HEIGHT=11
WIDTH=30><IMG SRC=yellobar.gif HEIGHT=11 WIDTH=68></TD>
</TR>
<TR>
<TD ALIGN=RIGHT><FONT FACE=arial SIZE=1>22 </TD>
<TD><FONT FACE=arial SIZE=1>SOUTHFIELD </TD>
<TD ALIGN=RIGHT><FONT FACE=arial SIZE=1>4 </TD>
<TD ALIGN=RIGHT><FONT FACE=arial SIZE=1>13 </TD>
<TD ALIGN=LEFT><IMG SRC=greenbar.gif HEIGHT=11
WIDTH=26><IMG SRC=yellobar.gif HEIGHT=11 WIDTH=64></TD>
</TR>
</TABLE>
</CENTER>
</BODY>
</HTML>
```

What is claimed is:

1. A method for providing status information of one or more automatic call distributors (ACDs) in a network of ACDs, the method comprising:

retrieving traffic load information from an ACD, wherein the traffic load information includes data for an inbound trunk group connected to the ACD, data for an outbound trunk group connected to the ACD, and data for inter-machine trunk (IMT) that interconnects the ACD with a second ACD;

calculating percent occupancy rates for the inbound and outbound trunk groups, based on the traffic load information from the ACD;

generating graphical representations of respective traffic loads for the inbound and outbound trunk groups, based on the percent occupancy rates;

presenting graphical representation of traffic loads for the IMT, the inbound trunk group, and the outbound trunk group in the graphical user interface;

displaying a first hyperlink for a trunk group in the graphical user interface near the graphical representation of traffic load for the trunk group;

in response to selection of the first hyperlink by a user, presenting additional status information pertaining to the trunk group, the additional information including identifiers for multiple trunk groups, identifiers for multiple integrated service digital network (ISDN) lines within each of the trunk group, and status information for each of the ISDN lines within each trunk groups;

in response to selection of the first hyperlink by the user, presenting a second hyperlink associated with the trunk group in the graphical user interface; and in response to selection of the second hyperlink by the user, presenting local circuit assignments for circuits within the trunk group in the graphical user interface, based on trunk inventory record keeping system (TIRKS) data that relates to the trunk group;

determining whether a predetermined alarm condition has occurred, based on data retrieved from the ACD; and in response to determining that the predetermined alarm condition has occurred, paging an administrator to notify the administrator that the predetermined alarm condition has occurred.

2. A method for providing status information of one or more automatic call distributors (ACDs) in a network of ACDs, the method comprising:

retrieving traffic load information form an ACD, wherein the traffic load information includes data for multiple trunk groups connected to the ACD;

generating graphical representations of respective traffic loads for the multiple trunk groups, based on the traffic load information from the ACD;

presenting the graphical representations of respective traffic loads for the multiple trunk groups in a graphical user interface; and calculating percent occupancy rates for the trunk groups, based on the traffic load information from the ACD; and generating the graphical representations of respective traffic loads for the multiple trunk groups, based on the percent occupancy rates.

3. A method according to claim 2, wherein the operation of retrieving traffic load information from an ACD comprises:

retrieving traffic load information for an inbound trunk group connected to the ACD; and retrieving traffic load information for an outbound trunk group connected to the ACD.

4. A method according to claim 3, wherein the operation of retrieving traffic load information from an ACD comprises:

retrieving traffic load information for an inter-machine trunk (IMT) that interconnects the ACD with a second ACD.

5. A method according to claim 4, wherein the operation of presenting the graphical representations in a graphical user interface comprises:

presenting a graphical representation of traffic load for the inbound trunk group in the graphical user interface;

presenting a graphical representation of traffic load for the outbound trunk group in the graphical user interface; and presenting a graphical representation of traffic load for the IMT in the graphical user interface.

6. A method according to claim 2, wherein:

the operation of generating graphical representations of respective traffic loads comprises generating multiple bar graphs to depict respective traffic loads for the multiple trunk groups, based on the traffic load information from the ACD; and the operation of presenting the graphical representations in a graphical user interface comprises presenting the multiple bar graphs in the graphical user interface.

7. A method according to claim 2, further comprising:

displaying information pertaining to a call center in the graphical user interface, wherein the information pertaining to the call center comprises:

agent staffing levels; and call answering time.

8. A method according to claim 2, further comprising:

presenting a graphical representation of traffic load for an interactive voice response (IVR) unit in the graphical user interface.

9. A method according to claim 2, further comprising:

presenting data pertaining to an expansion port network (EPN) on a display device.

10. A method for providing status information of one or more automatic call distributors (ACDs) in a network of ACDs, the method comprising:

retrieving traffic load information from an ACD on a periodic basis, wherein the traffic load information includes data for multiple trunk groups connected to the ACD;

generating graphical representations of respective traffic loads for the multiple trunk groups, based on the traffic load information from the ACD;

presenting the graphical representations of respective traffic loads for the multiple trunk groups in a graphical user interface;

displaying a hyperlink for a trunk group in the graphical user interface near the graphical representation of traffic load for the trunk group; and in response to selection of the first hyperlink by a user, presenting additional status information pertaining to the trunk group, the additional status information pertaining to the trunk group.

11. A method according to claim 10, wherein the operation of presenting additional status information pertaining to said trunk group comprises:

presenting identifiers for multiple trunk groups;

presenting identifiers for multiple integrated service digital network (ISDN) lines within each of the trunk groups; and presenting status information for each of the ISDN lines within each trunk groups.

12. A method according to claim 10, wherein the operation of presenting additional status information pertaining to said trunk group comprises:

presenting identifiers for multiple lines within the trunk group; and presenting status information for each of the multiple lines.

13. A method according to claim 10, wherein the hyperlink comprises a first hyperlink, the method further comprising:

in response to selection of the first hyperlink by the user, presenting a second hyperlink associated with the trunk group in the graphical user interface; and in response to selection of the second hyperlink by the user, presenting trunk inventory record keeping system (TIRKS) data that relates to the trunk group in the graphical user interface.

14. A method according to claim 13, wherein the operation of presenting TIRKS data that relates to the trunk group in the graphical user interface comprises:

presenting local circuit assignments for circuits within the trunk group in the graphical user interface.

15. A method for providing status information of one or more automatic call distributors (ACDs) in a network of ACDs, the method comprising:

retrieving traffic load information from an ACD on a periodic basis, wherein the traffic load information includes data for multiple trunk groups connected to the ACD;

generating graphical representations of respective traffic loads for the multiple trunk groups, based on the traffic load information from the ACD;

presenting the graphical representations of respective traffic loads for the multiple trunk groups in a graphical user interface;

determining whether a predetermined alarm condition has occurred, based on data retrieved from the ACD; and in response to determining that the predetermined alarm condition has occurred, paging an administrator to notify the administrator that the predetermined alarm condition has occurred.

16. A method according to claim 15, further comprising:

calculating percent occupancy rates for the trunk groups, based on the traffic load information from the ACD; and generating the graphical representations of respective traffic loads for the multiple trunk groups, based on the percent occupancy rates.

17. A method according to claim 15, wherein the operation of retrieving traffic load information from an ACD comprises:

retrieving traffic load information for an outbound trunk group connected to the ACD.

18. A method according to claim 17, wherein the operation of retrieving traffic load information from an ACD comprises:

retrieving traffic load information for an inter-machine trunk (IMT) that interconnects the ACD with a second ACD.

19. A method according to claim 18, wherein the operation of presenting the graphical representations in a graphical user interface comprises:

presenting a graphical representation of traffic load for the inbound trunk group in the graphical user interface;

presenting a graphical representation of traffic load for the outbound trunk group in the graphical user interface; and presenting a graphical representation of traffic load for the IMT in the graphical user interface.

20. A method according to claim 15, wherein:

the operation of generating graphical representations of respective traffic loads comprises generating multiple bar graphs to depict respective traffic loads for the multiple trunk groups, based on the traffic load information from the ACD; and the operation of presenting the graphical representations in a graphical user interface comprises presenting the multiple bar graphs in the graphical user interface.

21. A program product for providing status information of one or more automatic call distributors (ACDs) in a network of ACDs, the program product comprising:

a computer-usable medium; and computer instructions encoded in the computer-usable medium, wherein the computer instructions, when executed, perform operations comprising:

retrieving traffic load information from an ACD on a periodic basis, wherein the traffic load information includes data for multiple trunk groups connected to the ACD;

generating graphical representations of respective traffic loads for the multiple trunk groups, based on the traffic load information from the ACD;

presenting the graphical representations of respective traffic loads for the multiple trunk groups in a graphical user interface;

calculating percent occupancy rates for the trunk groups, based on the traffic load information from the ACD; and generating the graphical representations of respective traffic loads for the multiple trunk groups, based on the percent occupancy rates.

22. A program product according to claim 21, wherein the operation of retrieving traffic load information from an ACD comprises:

retrieving traffic load information for an inter-machine trunk (IMT) that interconnects the ACD with a second ACD.

23. A program product according to claim 22, wherein the operation of presenting the graphical representations of respective traffic loads for the multiple trunk groups in a graphical user interface comprises:

presenting a graphical representation of traffic load for the inbound trunk group in the graphical user interface;

presenting a graphical representation of traffic load for the outbound trunk group in the graphical user interface; and presenting a graphical representation of traffic load for the IMT in the graphical user interface.

24. A program product according to claim 21, wherein the operations performed by the computer instructions further comprise:

displaying a hyperlink for a trunk group in the graphical user interface near the graphical representation of traffic load for the trunk group; and in response to selection of the hyperlink by a user, presenting additional status information pertaining to the trunk group, wherein the additional status information pertaining to said trunk group comprises:

identifiers for multiple trunk groups;

identifiers for multiple integrated service digital network (ISDN) lines within each of the trunk group; and status information for each of the ISDN lines within each trunk groups.

25. A program product for providing status information of one or more automatic call distributors (ACDs) in a network of ACDs, the program product comprising:

a computer-usable medium; and computer instructions encoded in the computer-usable medium, wherein the computer instructions, when execute, perform operations comprising:

retrieving traffic load information from an ACD on a periodic basis, wherein the traffic load information includes data for multiple trunk groups connected to the ACD;

generating graphical representations of respective traffic loads for the multiple trunk groups, based on the traffic load information from the ACD;

presenting the graphical representations of respective traffic loads for the multiple trunk groups in a graphical user interface;

determining whether a predetermined alarm condition has occurred, based on data retrieved from the ACD; and in response to determining that the predetermined alarm condition has occurred, paging an administrator to notify the administrator that the predetermined alarm condition has occurred.

26. A program product according to claim 25, wherein the operations performed by the computer instructions further comprises:

displaying a hyperlink for a trunk group in the graphical user interface near the graphical representation of traffic load for the trunk group; and in response to selection of the hyperlink by a user, presenting additional status information pertaining to the trunk group.

27. A program according to claim 26, wherein the additional status information pertaining to said trunk group comprises:

identifiers for multiple trunk groups;

identifiers for multiple integrated service digital network (ISDN) lines within each of the trunk group; and status information for each of the ISDN lines within each trunk groups.

* * * * *